United States Patent

Taylor et al.

[15] 3,702,986

[45] Nov. 14, 1972

[54] TRAINABLE ENTROPY SYSTEM

[72] Inventors: Fredrick James Taylor, Richardson; William C. Choate, Dallas, both of Tex.

[73] Assignee: Texas Instruments Incorporated, Dallas, Tex.

[22] Filed: July 6, 1970

[21] Appl. No.: 52,611

[52] U.S. Cl. ....................340/172.5
[51] Int. Cl. ....................G06f 15/18
[58] Field of Search ....................340/172.5, 146.3 T

[56] References Cited

UNITED STATES PATENTS

| | | | |
|---|---|---|---|
| 3,358,271 | 12/1967 | Marcus et al. | 340/172.5 |
| 3,284,780 | 11/1966 | Clapper | 340/172.5 |
| 3,309,674 | 3/1967 | Lemay | 340/172.5 |
| 3,327,291 | 6/1967 | Lee | 340/172.5 |
| 3,333,249 | 7/1967 | Clapper | 340/172.5 |
| 3,370,292 | 2/1968 | Deerfield | 340/172.5 X |

*Primary Examiner*—Paul J. Henon
*Assistant Examiner*—Sydney R. Chirlin
*Attorney*—Samuel M. Mims, Jr., James O. Dixon, Andrew M. Hassell, Harold Levine, Melvin Sharp, Rene E. Grossman and James T. Comfort

[57] ABSTRACT

A system is comprised of a series of trainable non-linear processors in cascade. The processors are trained in sequence as follows. In a first phase of the sequence, a set of input signals comprising input information upon which the system is to be trained and a corresponding set of desired responses to these input signals are introduced into the first processor. When the first processor has been trained over the entire set, a second phase commences in which a second set of input signals along with the output of the first processor and corresponding set of desired responses are introduced into the second processor. During this second phase the input signals to the first and second processors are in sequential correspondence. In one embodiment of the invention the set of input signals to the first processor comprises the same set of input signals being introduced into the second processor delayed by a fixed time interval.

The training sequence continues until all processors in the series have been trained in a similar manner. The input to the $k^{th}$ or last processor will comprise a set of input signals, the desired output responses to those input signals and the output of the $(k-1)^{the}$ processor. The input to each preceding processor will th separate sets of input signals which in one embodiment are the set of input signals to the $k^{th}$ processor, retrogressively, delayed in time by one additional time interval and the output of the previous processor. The system may be looked upon as a minimum entropy system in which the entropy or measure of uncertainty is decreased at each stage. When all of the processors have been trained, the system is ready for execution and the actual output of the last stage is a minimum entropy approximation of a proper desired output when an input signal, without a corresponding desired response, is introduced into the completed system of cascaded processors.

26 Claims, 30 Drawing Figures

Figure 1:
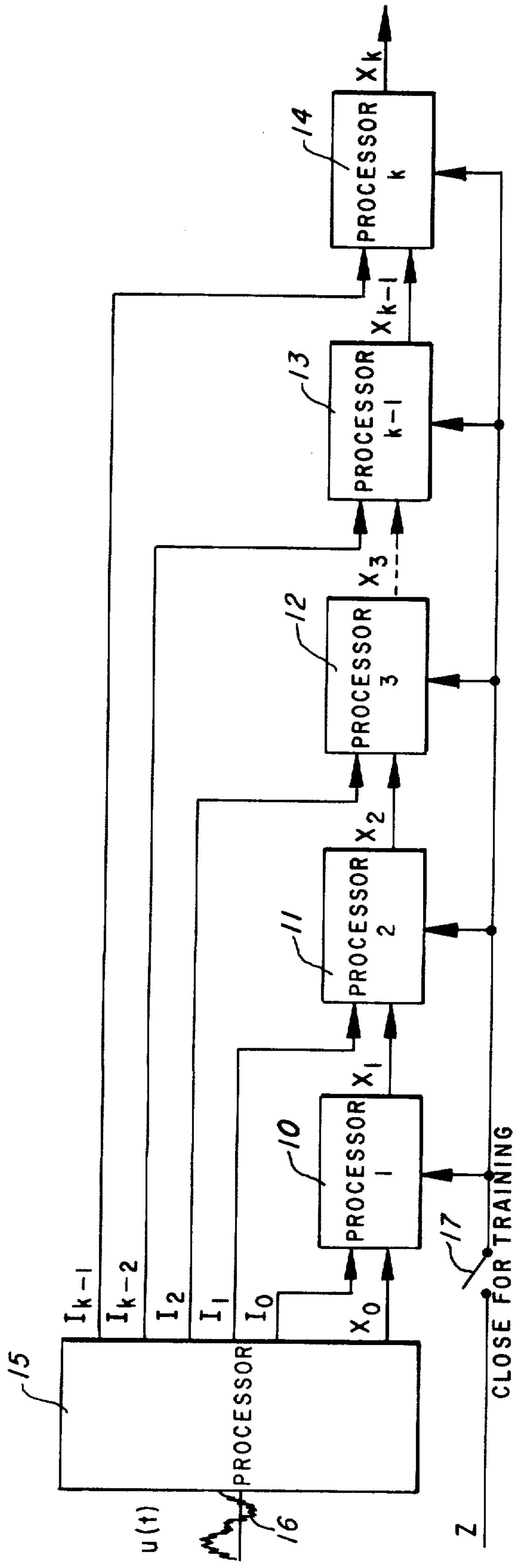

INVENTORS
Fredrick James Taylor
William Clay Choate
BY
Jim Comfort
ATTORNEY
Steph Sadowa
WITNESS

TRAINABLE ENTROPY SYSTEM

This invention relates to trainable nonlinear processor methods and systems for identification, classification, filtering, smoothing, prediction and modeling, and more particularly, to a system in which a plurality of nonlinear processors are cascaded to produce a minimum entropy or minimum uncertainty actual output signal most closely approximating a desired response for any input signal introduced into the cascaded processors after a training phase has been completed.

This invention further relates to the nonlinear processors disclosed in Bose, U.S. Pat. No. 3,265,870, which represents an application of the nonlinear theory discussed by Norbert Wiener in his work entitled *Fourier Integral and Certain of Its Applications*, 1933, Dover Publications, Inc., and to the trainable signal processor system described in co-pending patent application Ser. No. 732,152 for "Feedback Minimized Optimum Filters and Predictors", filed on May 27, 1968, and assigned to the assignee of the present invention.

Nonlinear processors are generally employed for identification, classification, filtering, smoothing, prediction and modeling where the characteristics of a signal or noise are nongaussian, where it is necessary to remove nonlinear distortions, or where a nonlinear response is desired (e.g., classification). It is important to note at the onset that linear behavior is not excluded. In fact, the nonlinear processor will adapt to a linear configuration whenever the latter is truly optimal (e.g., in the case of estimating a signal in the presence of additive Gaussian noise). Linear behavior implies that the law of superposition is valid. That is, if inputs $u(t)$ and $v(t)$ produce responses $x(t)$ and $y(t)$, respectively, then input $\alpha u(t) + \beta v(t)$, where $\alpha$ and $\beta$ are scalers, will produce output $\alpha x(t) + \beta y(t)$. Conversely, the failure of superposition implies nonlinear behavior. For the most part however, the optimum processor will be nonlinear. One reason is that linear processors are unable to utilize any a priori information regarding the amplitude characteristics of the signal or noise. Another is that they are unable to remove nonlinear distortions or provide nonlinear responses to the signal. Stated differently, the law of superposition implies that linear processors can separate signals only on the basis of their power spectral density function, calculable from secondorder statistics, whereas nonlinear processors can make use of higher-order statistics. Thus, while a linear processor would be worthless in separating signals with proportional power spectra, a proper nonlinear processor could be very effective.

A trainable processor is a device or system capable of receiving and digesting information in a training mode of operation and subsequently operating on additional information in an execution mode of operation in the manner determined or learned during training.

The process of receiving and digesting information comprise the training mode of operation. Training is accomplished by subjecting the processor to typical input signals together with desired response or desired output to those signals. The input and desired output signals used to train the processor are called training functions. During training the processor determines and stores cause-effect relationships between input signals and corresponding desired outputs. The cause-effection relationships determined during training are called trained responses.

The post training process of receiving additional information via input signals and operating on it in some desired manner to perform useful tasks is called execution. More explicitly, for the system considered herein, one purpose of execution is to produce from the input signal an output, called the actual output, which is the best, or optimal, estimate of the desired output signal. There are a number of useful criteria defining "optimal estimate". One is minimum mean squared error between desired and actual output signals. Another, particularly useful in classification applications, is minimum probability of error.

The cascaded nonlinear processors of the present invention may be either of the Bose type or of the feedback type described in patent application Ser. No. 732,152, referenced above. For convenience, however, the processors described herein will be of the former type.

In a system identification problem, it is desired to determine a working model which has the same input-output relationship as the system being identified, hereinafter called the plant. In identification the same input is introduced into the system of cascaded processors and the plant during training. In addition, the output of the plant is fed into the system of cascaded processors as the desired output. Thus, in an execution mode of operation, the actual output of the system of the system of cascaded processors is a minimum entropy approximation of the output which would have been obtained from the plant had the same input signal been applied to it.

Knowing how it is desired to have a plant operate, in a control problem, it is desired to fabricate a control system which will operate the plant in that desired fashion. Thus, in operation, the desired output is fed into the controller, the output of the controller is fed into the plant to obtain an actual output from the plant corresponding to the desired output. In general terms, the inverse $S^{-1}$ of a system S has the property that, when cascaded with the system, the output of the cascaded combination is equal to the input. This is precisely what is required of the controller. An important property of $S^{-1}$ when it exists is that it commutes with S, that is, the order of the cascaded combination is immaterial. This allows the controller to be determined as follows. The input to the plant is the same as the desired output signal fed into the system of cascaded processors during training. The input to the system of cascaded processors then becomes the output of the plant, and the system of cascaded processors is required to estimate the input to the plant from its output. The system of cascaded processors now meets the definition of the inverse of the plant and by the commutivity property, may be installed as the controller.

Filtering is of importance in communications systems, tracking of airborne vehicles, navigation, secure communications, and many other applications. The objective is to estimate the present value of a signal from an input which is a function of both signal and noise. In this problem then, during training a signal without the noise is introduced into the system of cascaded processors as the desired output while the input to the system of cascaded processors is the same signal combined with noise. The actual output of the system of cascaded processors during an execution phase is then a minimum entropy approximation of the signal with the noise removed.

Smoothing finds wide use in trajectory analysis, instrumentation, and in the estimation of an originating event from succeeding events (e.g., the estimation of the firing site of a mortar from radar tracking data of shell trajectory). It differs from filtering in that the objective is to estimate a past value of the signal from the input rather than the current value. Thus, the training phase for smoothing is the same as that of filtering except that now a pure time delay is required between the signal and the desired output being fed into the system of cascaded processors. The desired output at time $t$ is signal $s(t-\Delta)$. The delay time delta ($\Delta$) may be fixed or variable. As an illustration of a variable delay, $\Delta=t$ yields an estimate of the initial value of the signal which then becomes more refined as additional data is used. This technique would be utilized in the mortar firing site detection problem mentioned above.

To realize the potential importance of prediction, one need only consider the stock market, the weather, the economic and political trends of a country, inventory levels or the consumption of natural resources. To obtain the minimum entropy predictor, the system of cascaded processors is trained in much the same manner as for filtering. In this case, however, a future, rather than a current value of the signal is to be estimated from the input. Therefore, a pure time advance between the input signal and desired output being fed into the system of cascaded processors is indicated. But, as a pure time advance is physically unrealizable, it is necessary to use an alternate approach: The desired result can be achieved by delaying the input to the system of cascaded processors relative to an undelayed signal employed as the desired output signal. The prediction estimator can be updated continually with future events, as such events become present events. The output of the predictor is a minimal entropy estimate of $s(t+\Delta)$, where, in analogy to smoothing, the lead time $\Delta$ can be either fixed or variable. As an illustration of a variable $\Delta$, consider for example the case in which the choice $\Delta$ being equivalent to the difference between the future time and the present time yielding an estimate of $s(t+\Delta)$ which becomes more redefined as additional data becomes available (i.e., as the time of the predicted event approaches the present.)

Inasmuch as the training phase is concerned, modeling is identical to identification. The distinction between the two is made on the use of the identified model. In modeling, the primary purpose is to gain analytical insight into the process being studied. This insight can be derived in several ways. One is to ascertain the critical inputs. To do this, one can hypothesize that certain inputs to the system being modeled are critical to the certain outputs of interest. By using the system of cascaded processors to identify the process while employing these inputs and outputs as training functions, the hypothesis can be tested. If the identification succeeds as measured by execution, hypothesis is proven. If the identification yields a poor representation of the physical system as measured by execution, a poor (or incomplete) selection of inputs is indicated. Another way is to assume that certain inputs and outputs act independently. This assumption can be forced upon the system of cascaded processors; again, successful identification would be the measure of the correctness of the hypothesis. Still another way is to assume that the other system can be described by a differential equation of order less than a certain preassigned value. This constraint can be forced on the nonlinear entropy system and the hypothesis tested as before. Once a satisfactory model has been obtained through identification, it is possible to obtain a mathematical description of the system by "looking into the black box" defining the adapted nonlinear entropy system.

The practical applications of modeling are vast and include the study of mechanical systems such as airframe or satellite configurations as well as chemical processors, weather models, diurnal effects on communication channels, and cause-effect functional relationships implicit in health survey date. Even the modeling of complex political and economic systems is possible.

Classification differs from filtering in that the objective is not to recover the signal but to derive a decision based on the estimated signal. Thus, the signal and desired output of the system of cascaded processors will not be proportional, but rather, the output will be some discrete valued function of the signal representing the class to which it belongs. In the problem of alpha-numeric character recognition, for example, the input signal might correspond to the class of video signals obtained from a scan of the character which assumes various physical orientations. In addition, during training, the desired output is an identification code designating the alpha-numeric character to which the video signal corresponds (A,B,C . . . 1,2,3, etc.). Therefore, the actual output, during execution, is a minimum entropy estimate of the character represented by the video signal at the input.

Speech (verbal word) recognition or interpretation is a classification problem of considerable importance. The system of cascaded processors operates on an analog speech input (which may be preprocessed into digital form) to produce a series of outputs which constitute a code identifying the particular word which has been spoken. This code could be used as an input to a computer thereby greatly enhancing man-computer communications. Language translation is another closely related problem. For example, the time sequence constituting the input language could be classified and converted into a time sequence of code symbols which designates the meaning of words in the output language.

Although other nonlinear processors generally are useful in solving the above kind of problems, the system of cascaded processors disclosed herein has several advantages for which it is the object of the present invention to provide. Specifically, the system of cascaded processors of the present invention is comprised of a series of smaller well trained nonlinear processors which interact with one another and which may be trained over a relatively short sequence of information which is necessary for the training of one large processor. Taken another way, the system of cascaded processors will be better trained if sequences of data of the same length are applied to it as compared to a single nonlinear processor of the same capability. Furthermore, each stage is feedforward, so that training of a single stage requires at most one pass of the training data. Therefore, the data is employed $k$ times to train all $k$ stages.

Another desirable attribute of the system of cascaded processors is that it defines in a probabilistically optimum way a series of paths through a large group of processors to generate an output signal which is based on a statistically significant sample of training functions. Once a partial path is chosen through the single nonlinear processor, it is necessary to continue along a path emanating from that partial path and all future decisions must be based thereupon. This dichotomy of the input space may limit the amount of training information available for defining the subsequent path to a statistically insignificant level. When a path has been chosen through one of the cascaded processors, the choice of paths through subsequent processors may be precursed by a number of paths in that processor and thus this difficulty circumvented. In the case of an untrained path through one of the processors, that is, an input condition for which no path has previously been defined, errors resulting from the response chosen by that processor does not propagate as a component of future input signals. In fact, a valid untrained path policy is to ignore instants at which untrained paths occur; no such option exists in the case of a single feedback nonlinear processor for example. Furthermore, untrained paths are rare with the system of cascaded processors since each processor stage of the system may be less complex in nature and since the full set of training information is available for training it. That is, since each path is based on a statistically significant sample, the probability that an input condition will occur in execution which did not occur during training is small.

Put another way, the system of cascaded processors of the present invention involves Markovian decision making, that is, a decision is made probabilistically at each stage considering only the information derived from an estimate made by the immediately preceding stage; a single nonlinear processor in non-Markovian in nature and makes its decisions based on all past history.

These and other objects and advantages of the invention are accomplished by providing a trainable system comprised of a series of cascaded trainable nonlinear processors. The processors are trained in sequence with the inputs to each processor being trained comprising a sequence of information provided by peripheral equipment, the output of the previous processor and a desired output signal corresponding, for example, to the class to which the particular sequence belongs. Thus, in a first phase of the training sequence, the input signals upon which the first stage is to be trained are introduced into the first processor along with a corresponding sequence of desired responses. After the first processor has been trained over the entire input sequence, the second phase commences in which a second sequence of input signals and corresponding desired responses is introduced into the second processor along with the output of the first processor in proper synchronism. The second sequence, in one embodiment of the invention is the same as the sequence used to train the first processor but displaced or translated relative to the first sequence. During this second phase, the input signal to the first processor is yet another sequence of information, which, in one embodiment comprises the same set of input signals being introduced into the second processor delayed by one time interval.

Training cycles continue until all processors in the series have been trained in a like manner. For example, the input to the last processor comprises a sequence of information originating externally, a corresponding set of desired responses or desired output signals and the output of the preceding or next to last processor.

The structure of each of the cascaded processors is generically identical to that of each of the others. Generally, the trained responses for each processor are stored in registers of a memory array wherein the location or memory address bears a definite relation to the digital or quantized analog value of the input signal. This value which associates the input signal with a memory address is called a "Key". Training functions are provided by the input signals and corresponding desired output signals. From such training functions are derived a set of key functions and for each unique value thereof, a trained response is determined which bears a definite relation to the desired output signal being fed into the processor. The key functions and associated trained responses are then stored as information in a partial direct address, partial tree-allocated memory array serving as the information file. In one embodiment, the key has only two components; the first component is used to access the direct address portion of the memory array, and the second component is used to access the tree portion of the memory array which extends as branches from such direct address portion. In such embodiment, the input signal to the first processor comprises two sequences of information from the outside world, each sequence corresponding to one of the two key components. Each subsequent processor then has only one sequence of information from the outside world forming the first key component and the output of the previous processor forming second key component.

When all of the processors in the series have been trained as indicated above, the system is ready for execution. In execution the entropy is decreased at each stage as the probability of finding a correct response increases and the actual output of the last stage is then a minimum entropy approximation of such correct response when an input signal, without a corresponding desired output signal, is introduced into the completed series of cascaded processors.

Figure 2:
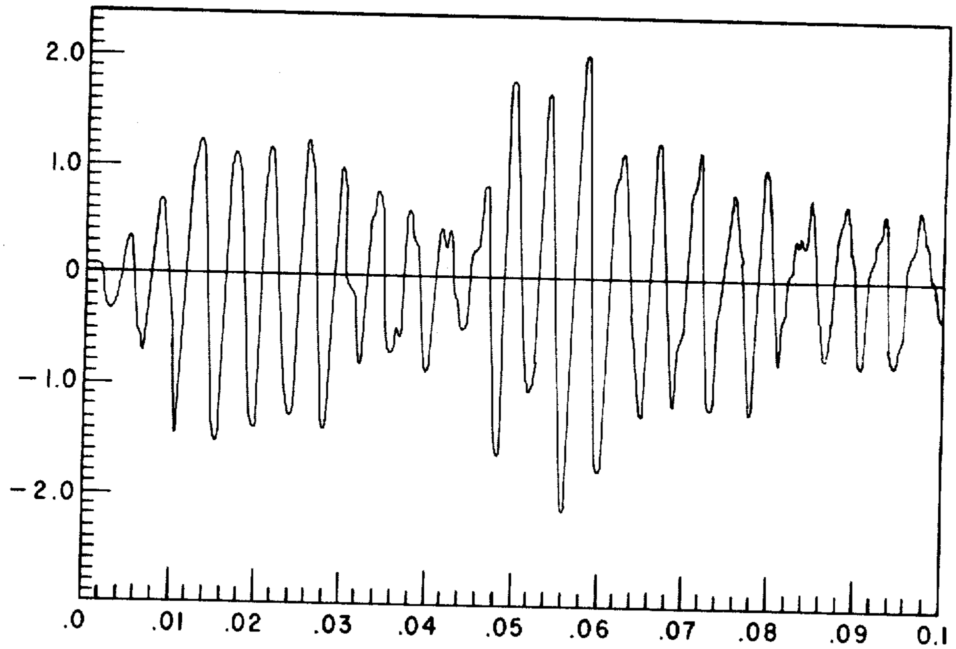
Figure 3:
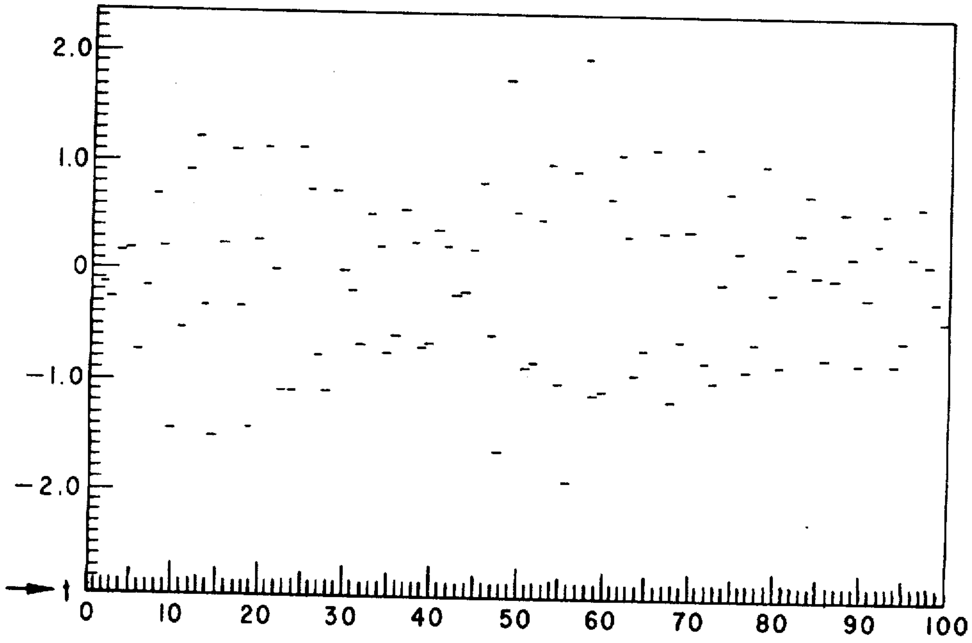
Figure 4:
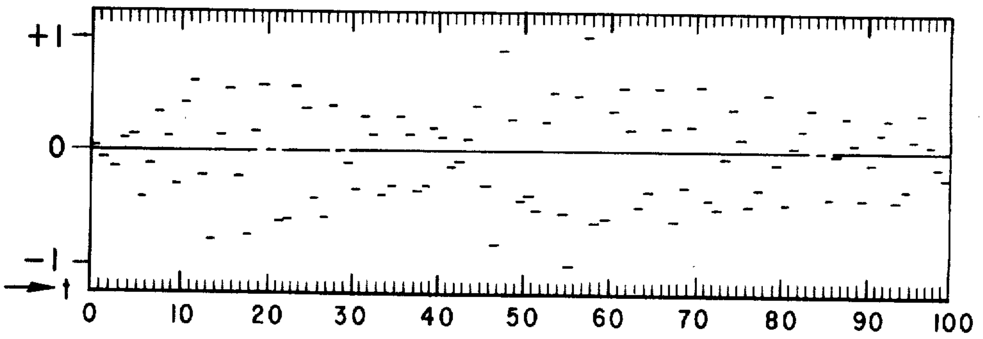
Figure 5:
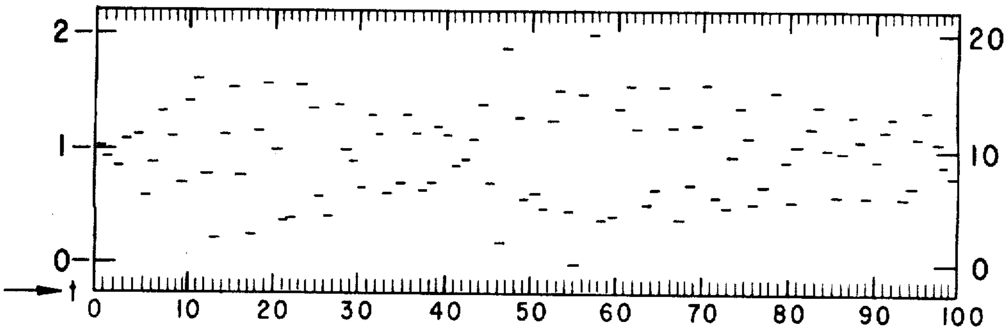
Figure 6:
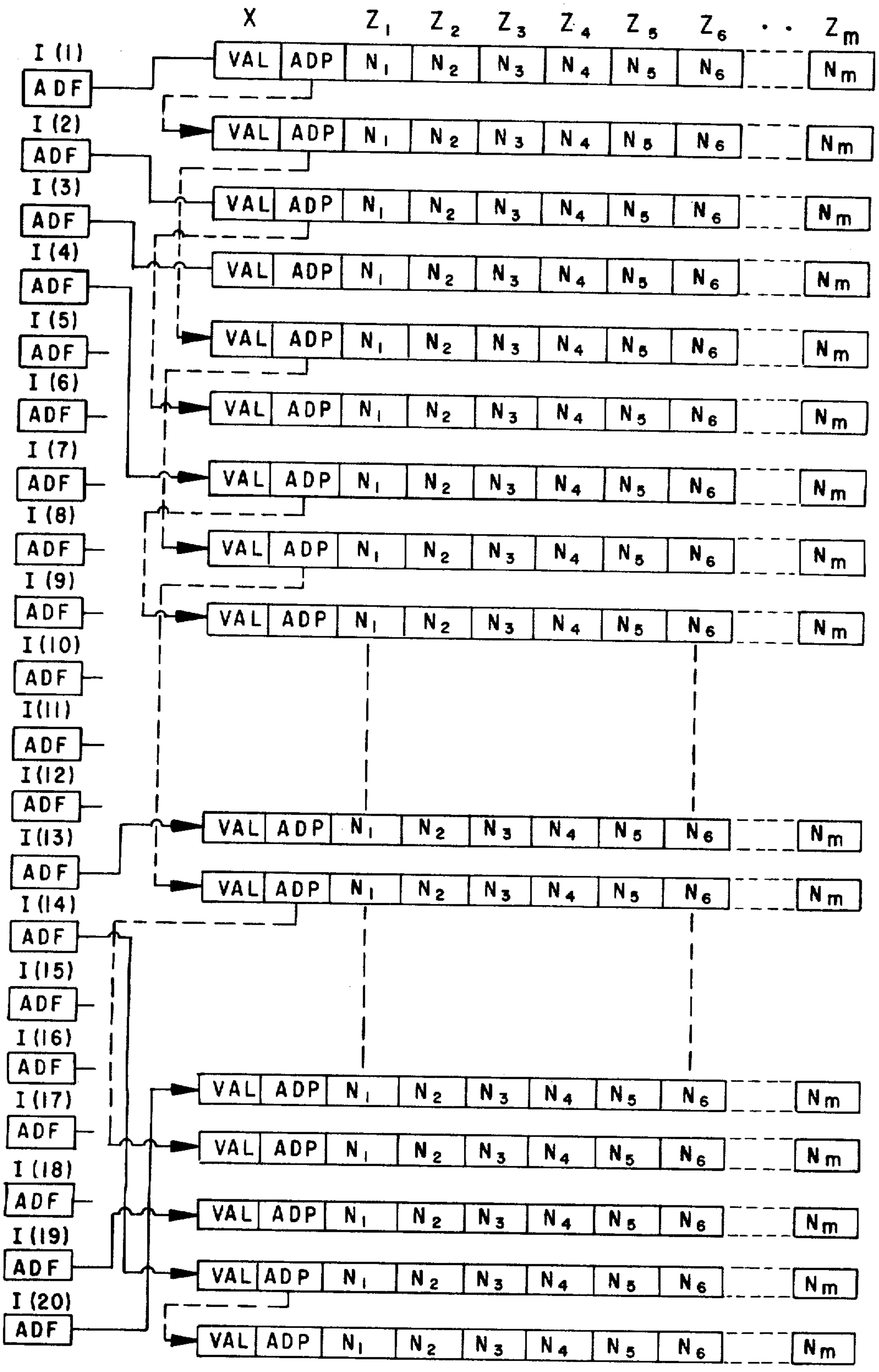
Figure 10:
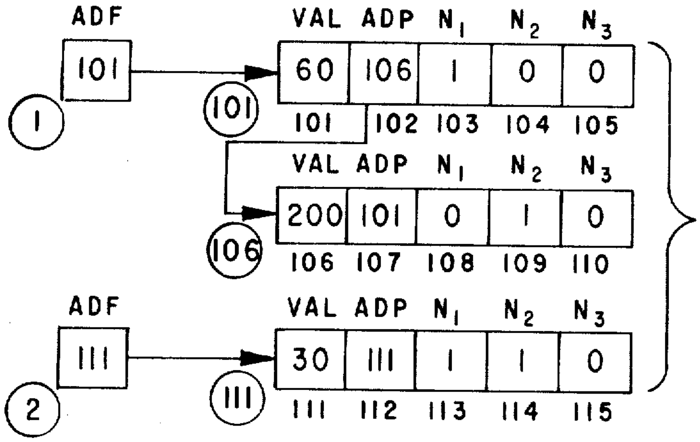
Figure 11:
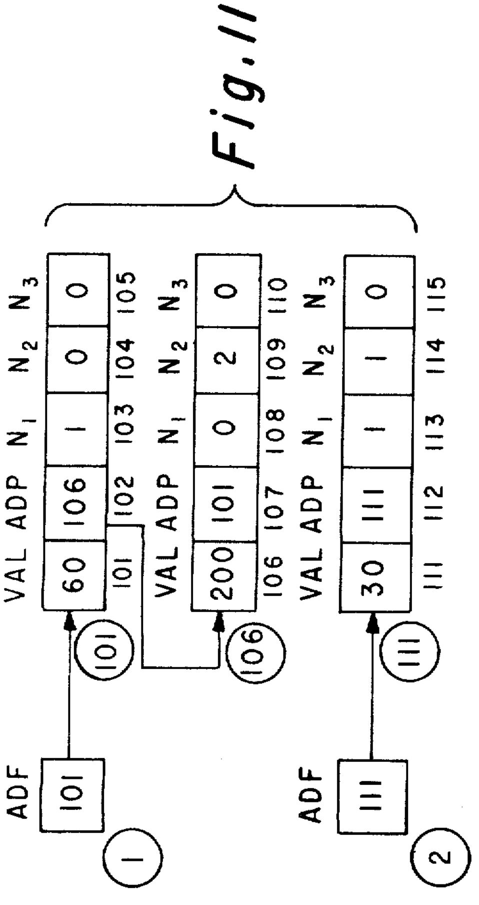
Figure 15:
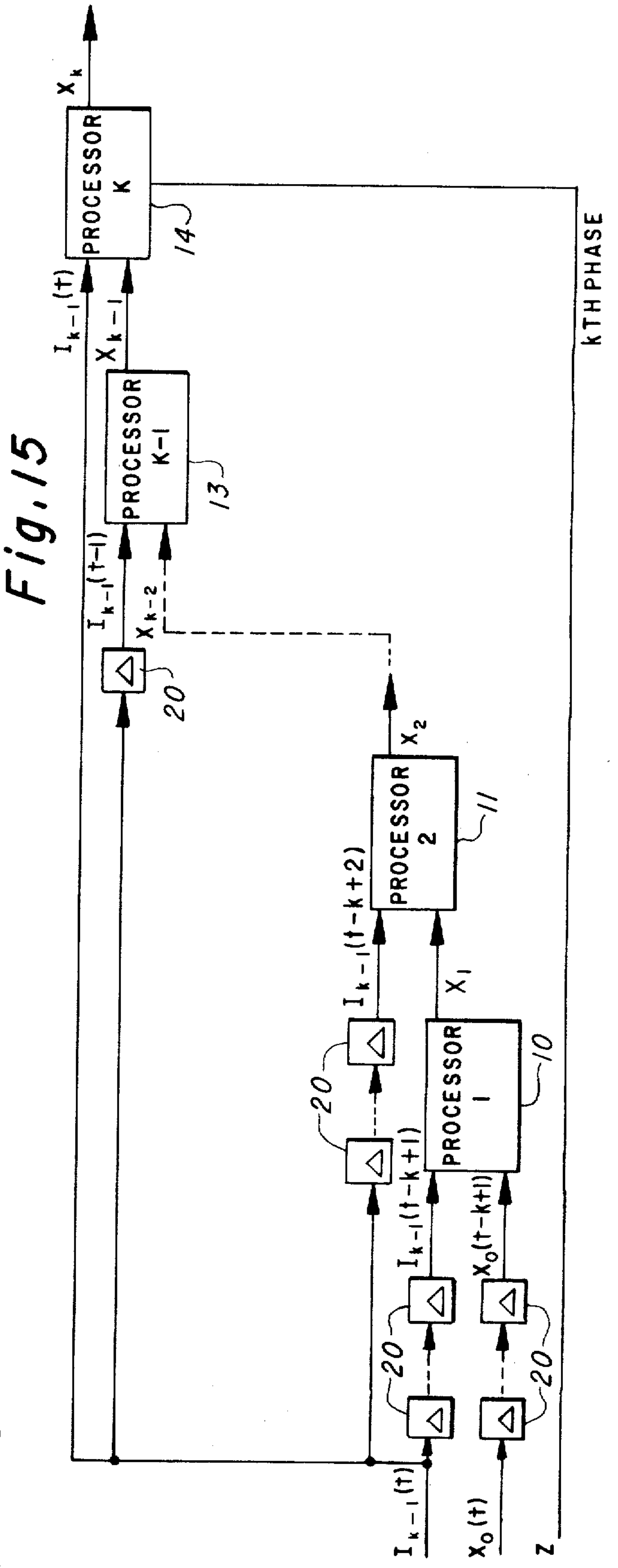
Figure 12:
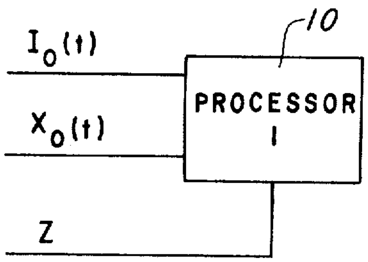
Figure 13:
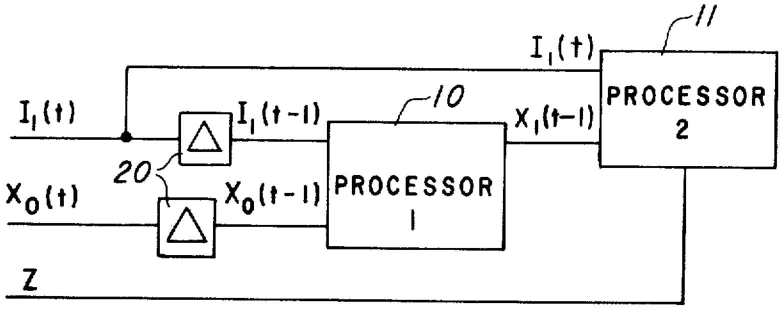
Figure 14:
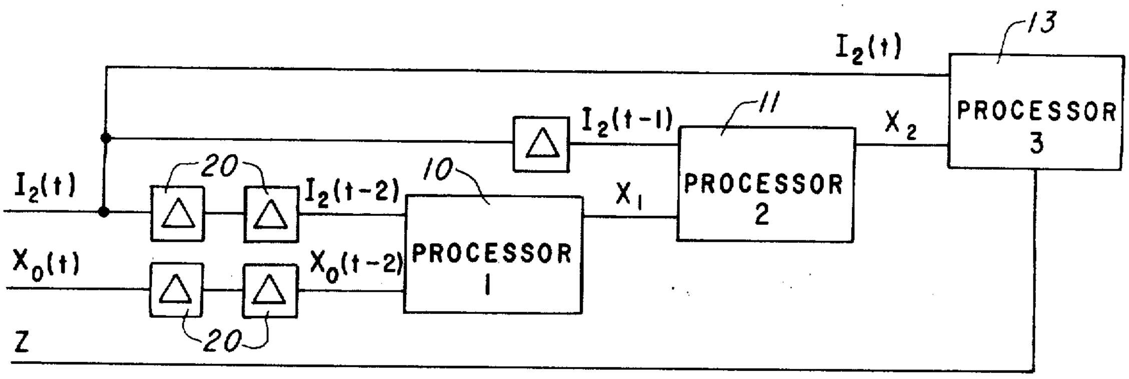
Figure 16:
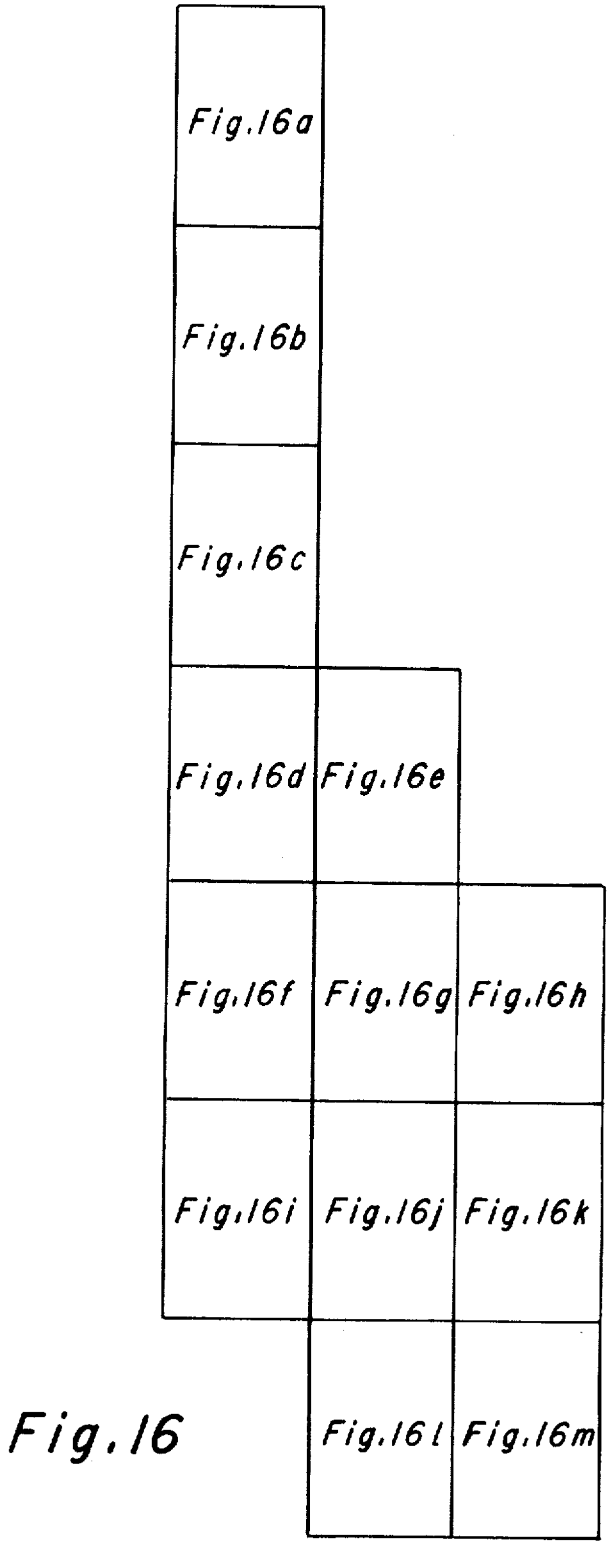
Figure 16A:
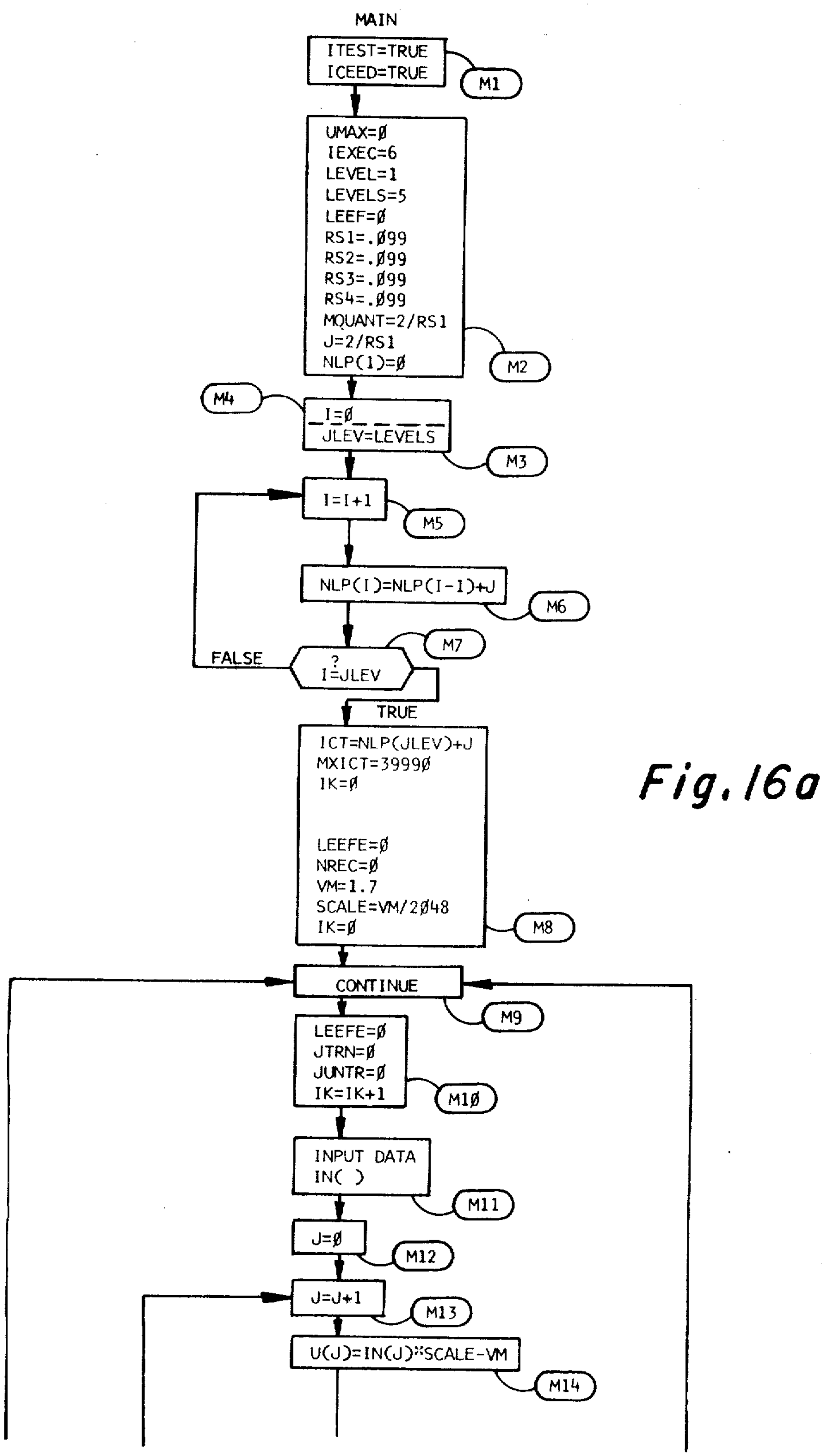
Figure 16B:
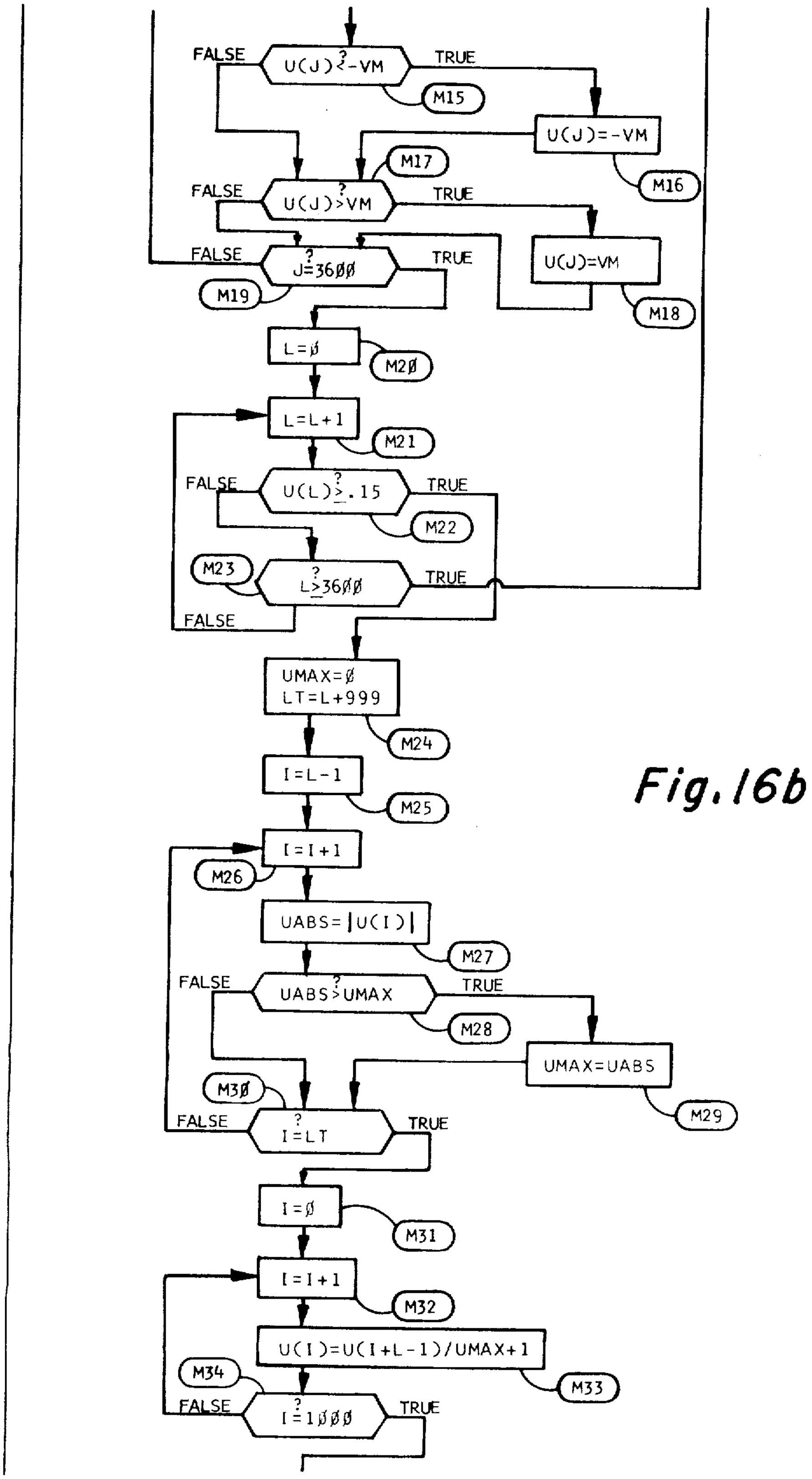
Figure 16C:
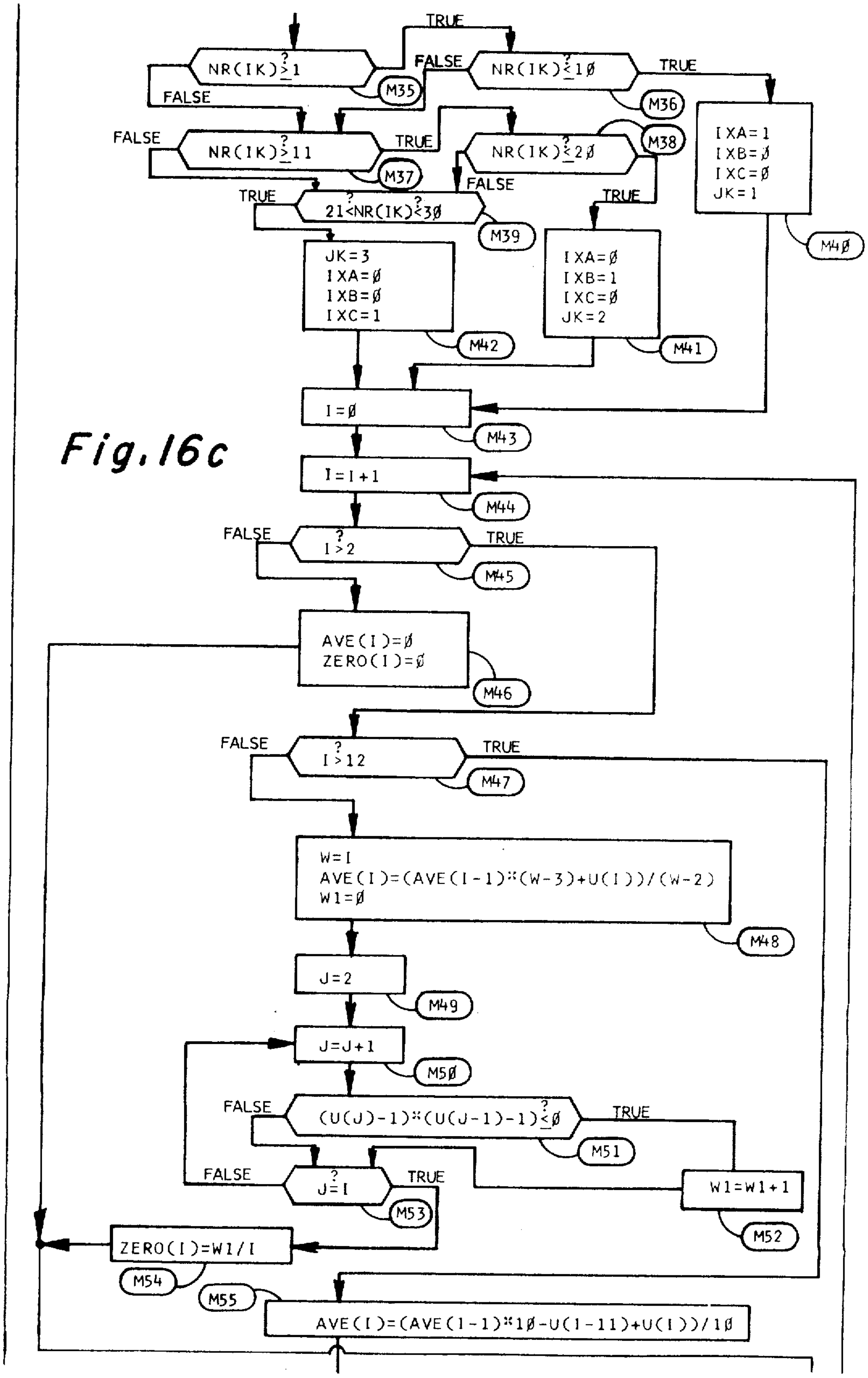
Figure 16D:
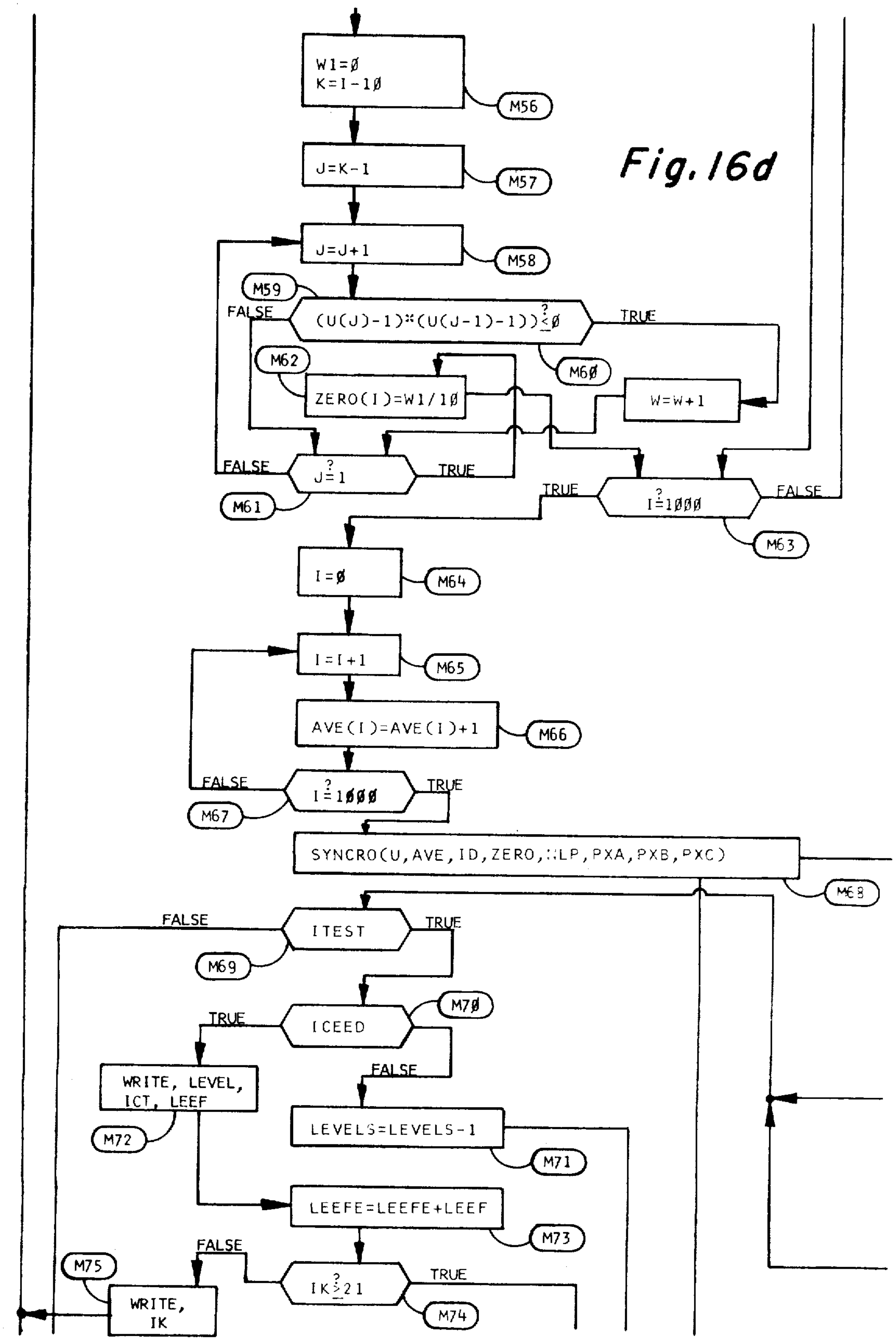
Figure 16E:
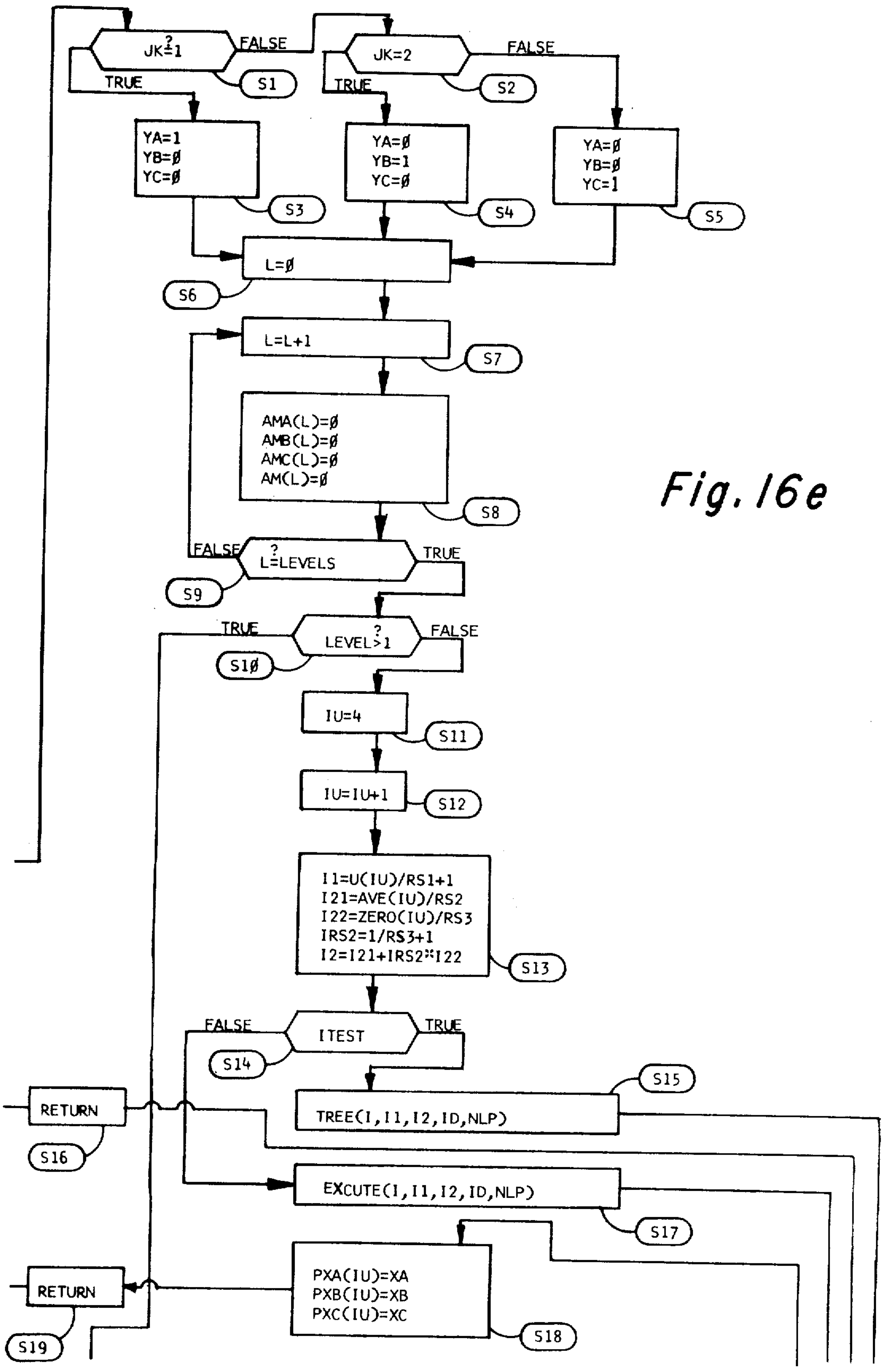
Figure 16F:
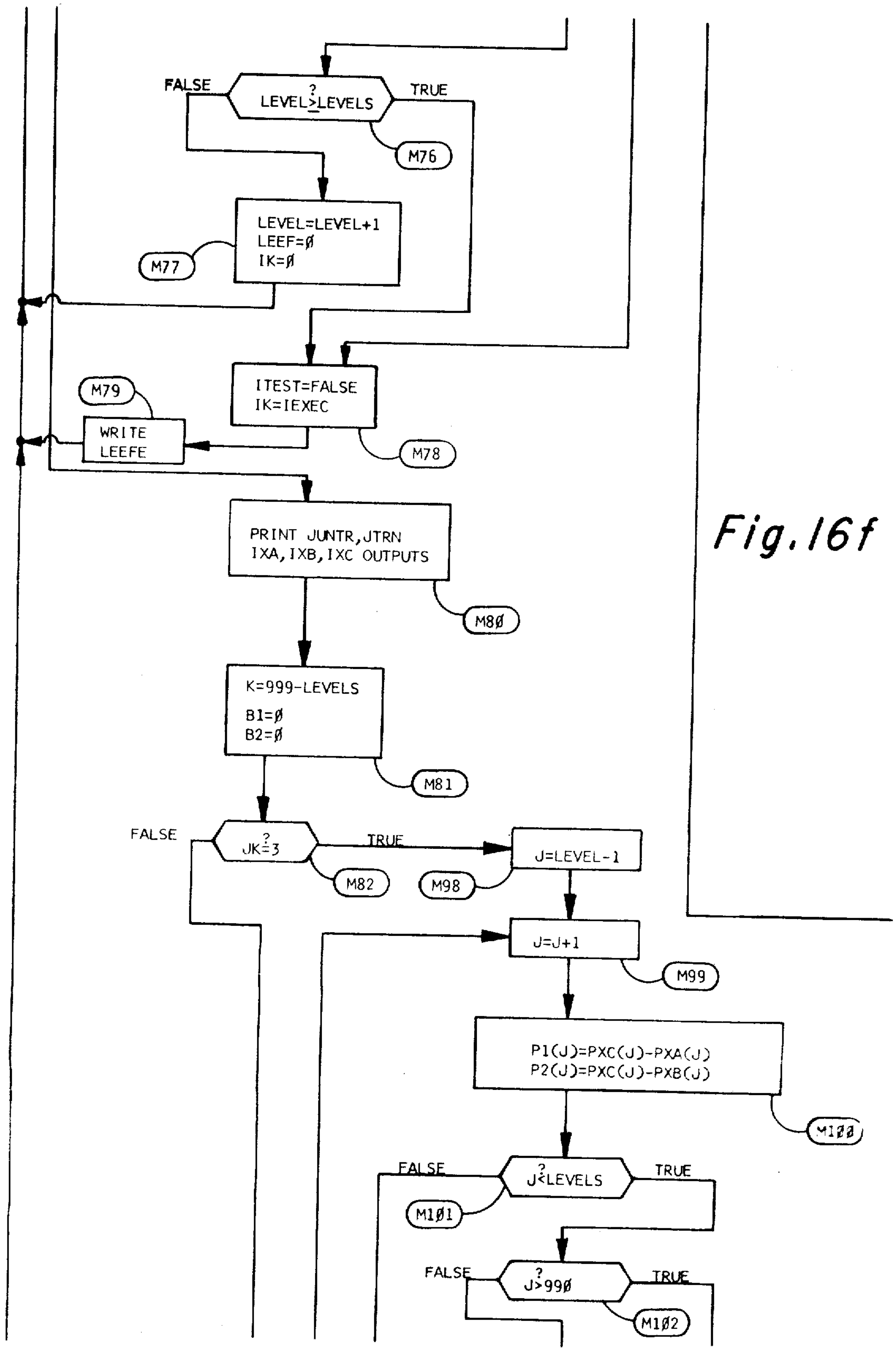
Figure 16G:
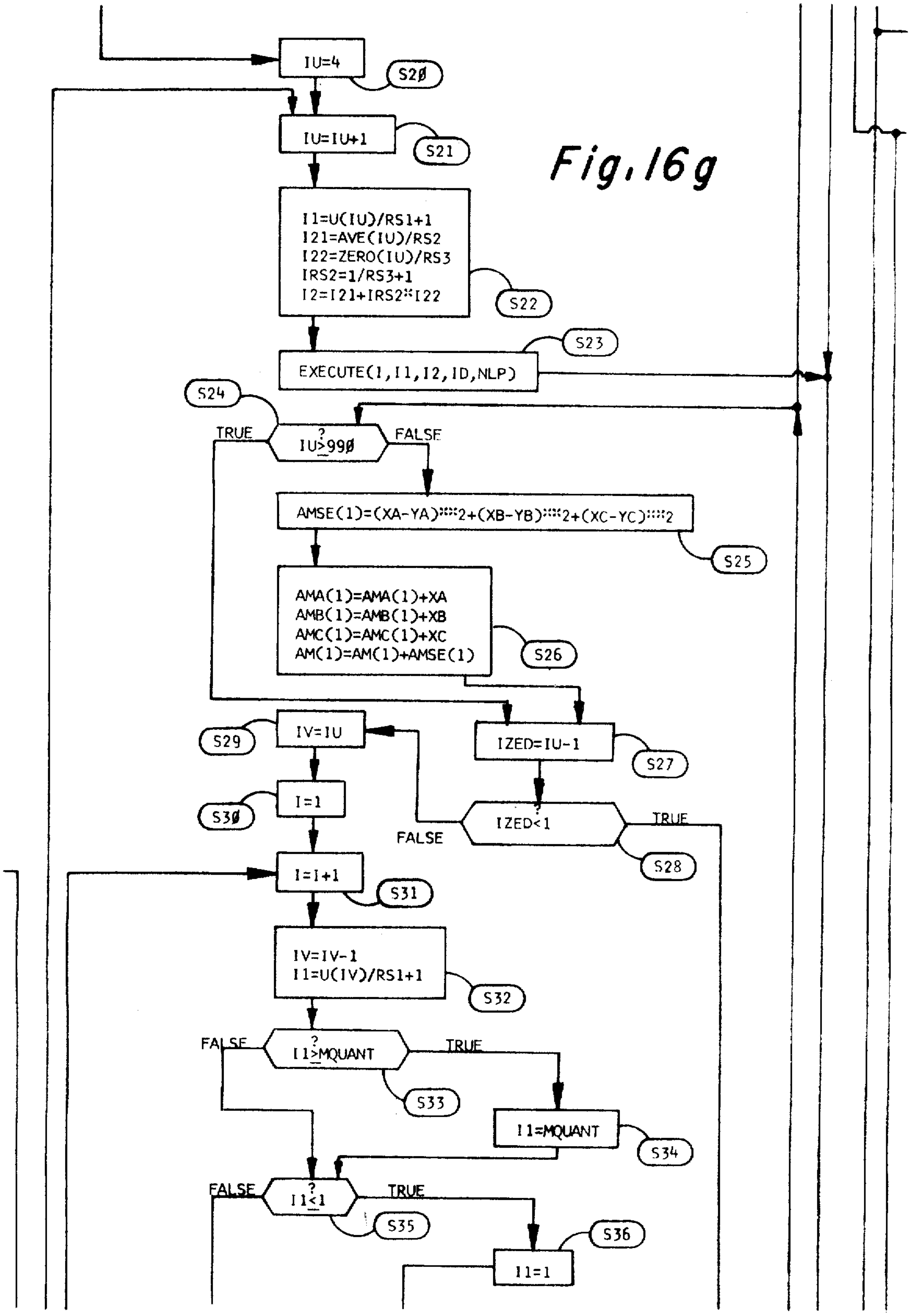
Figure 16H:
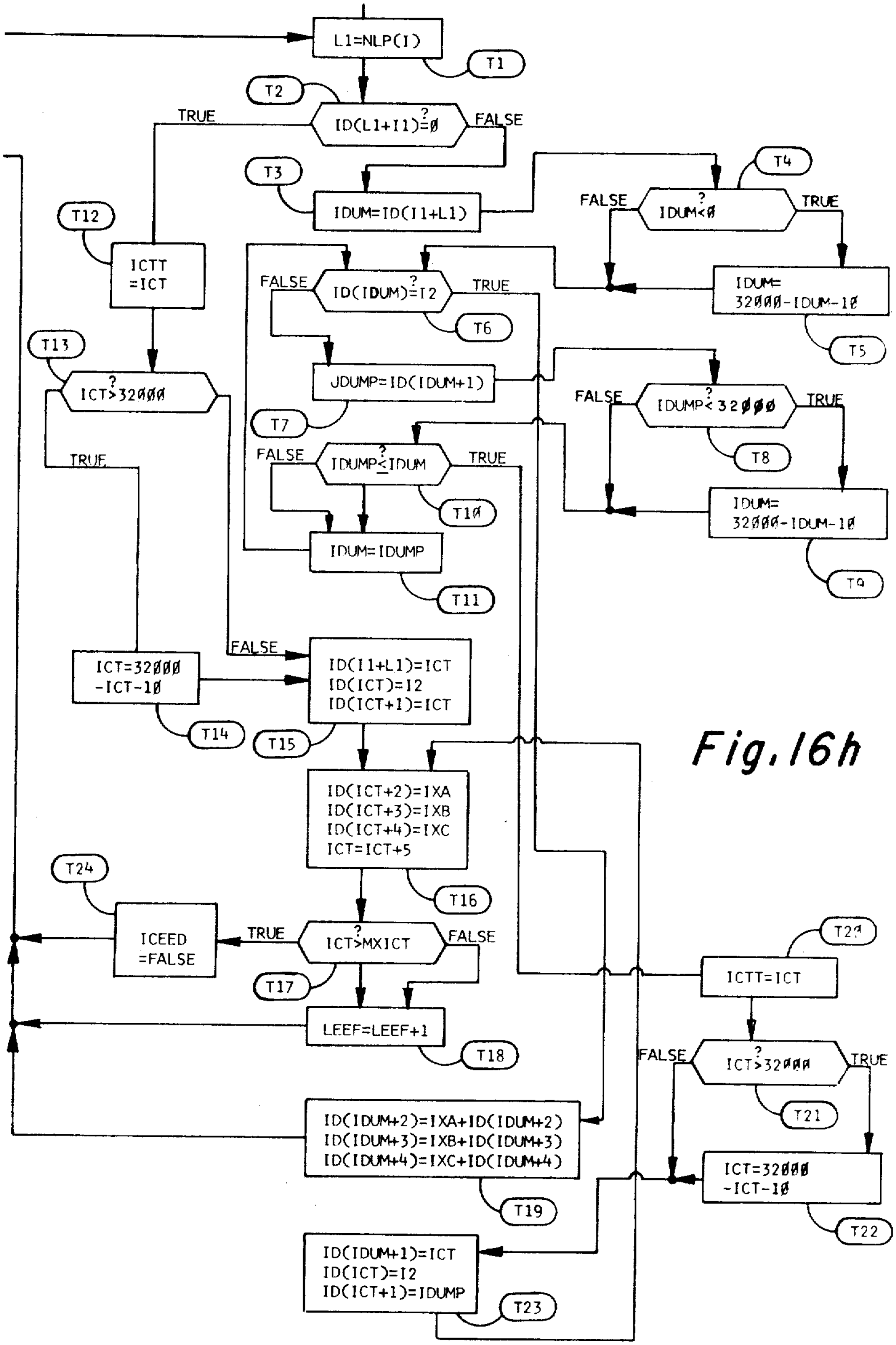
Figure 16I:
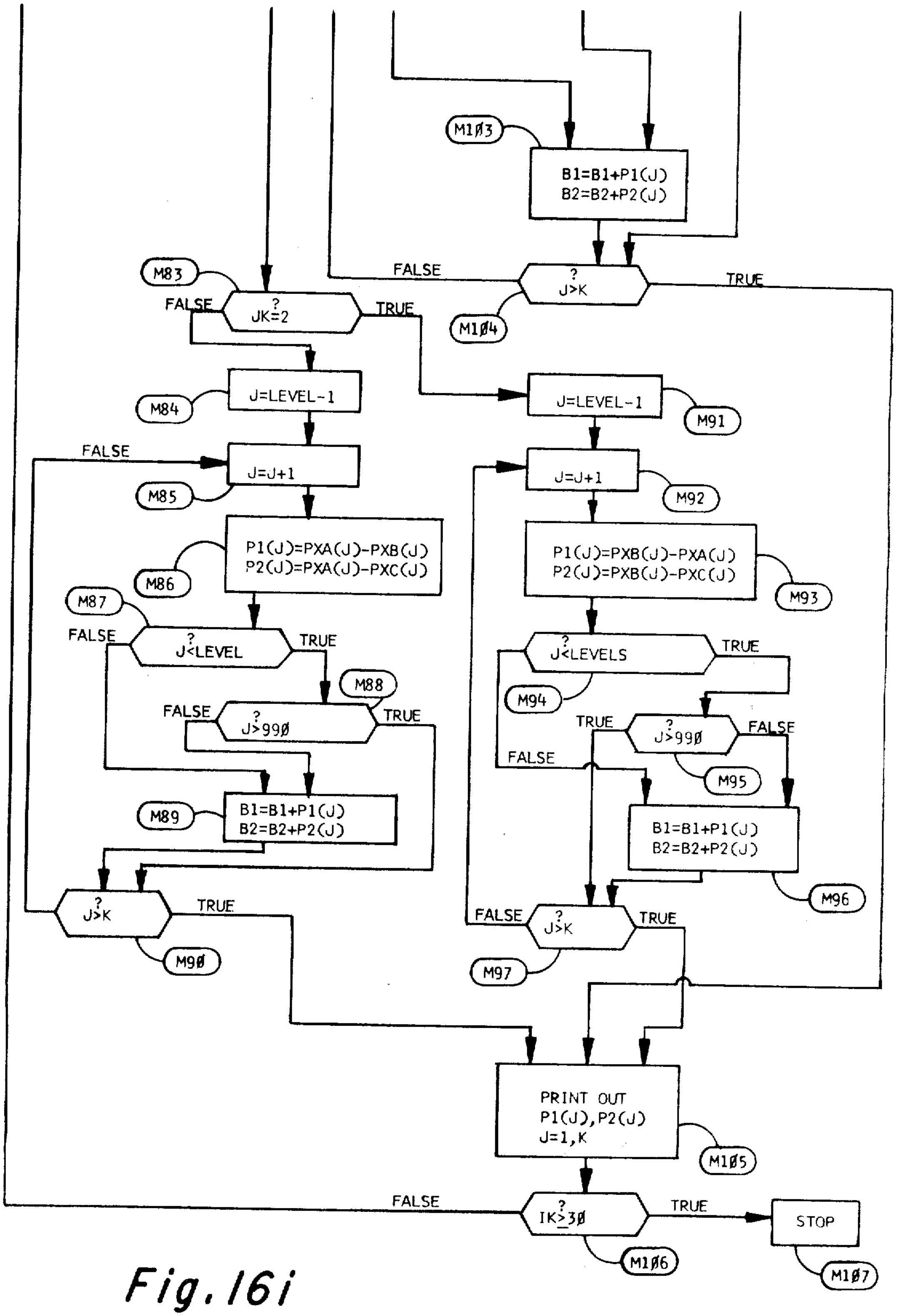
Figure 16J:
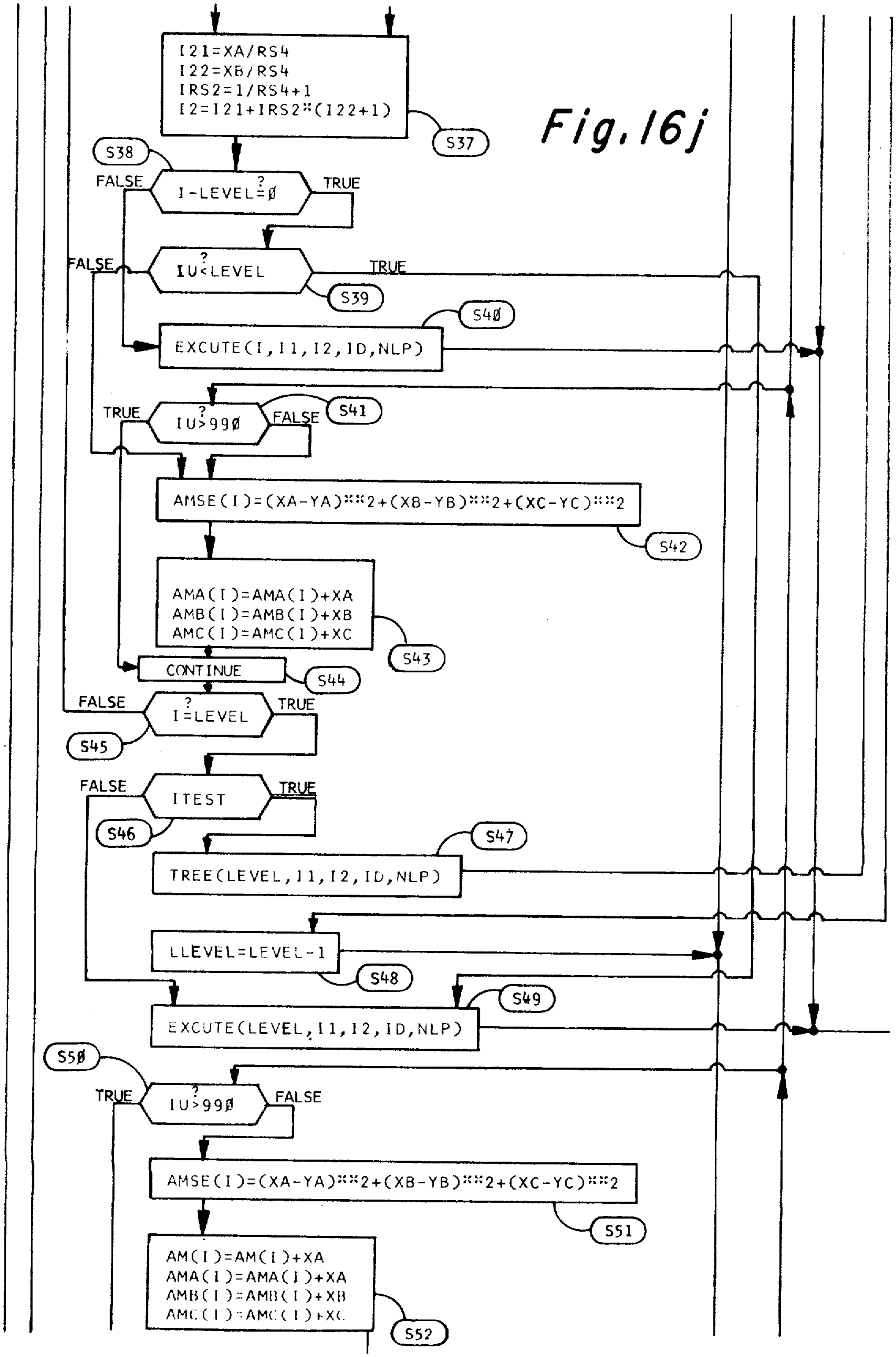
Figure 16K:
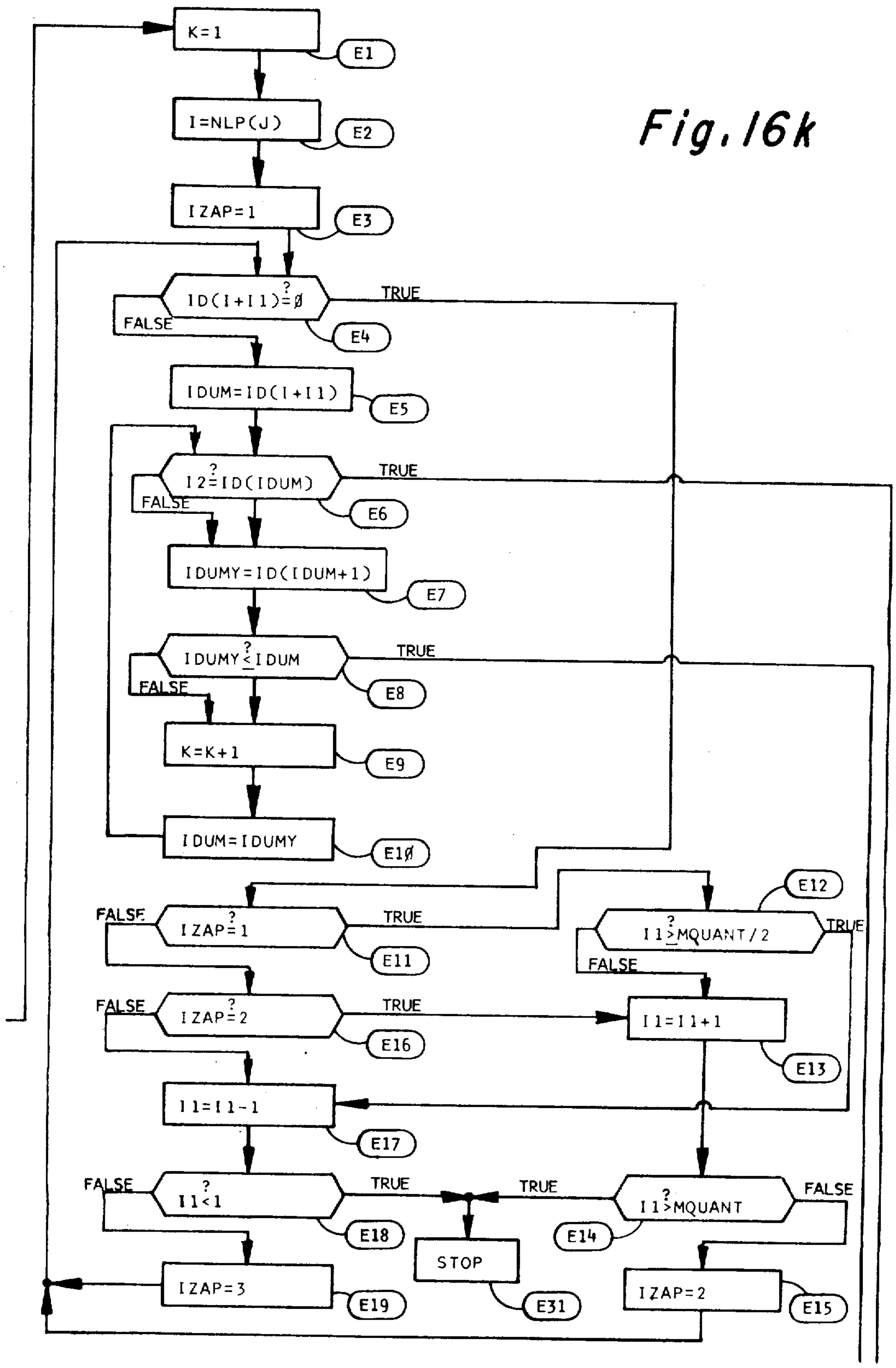
Figure 16L:
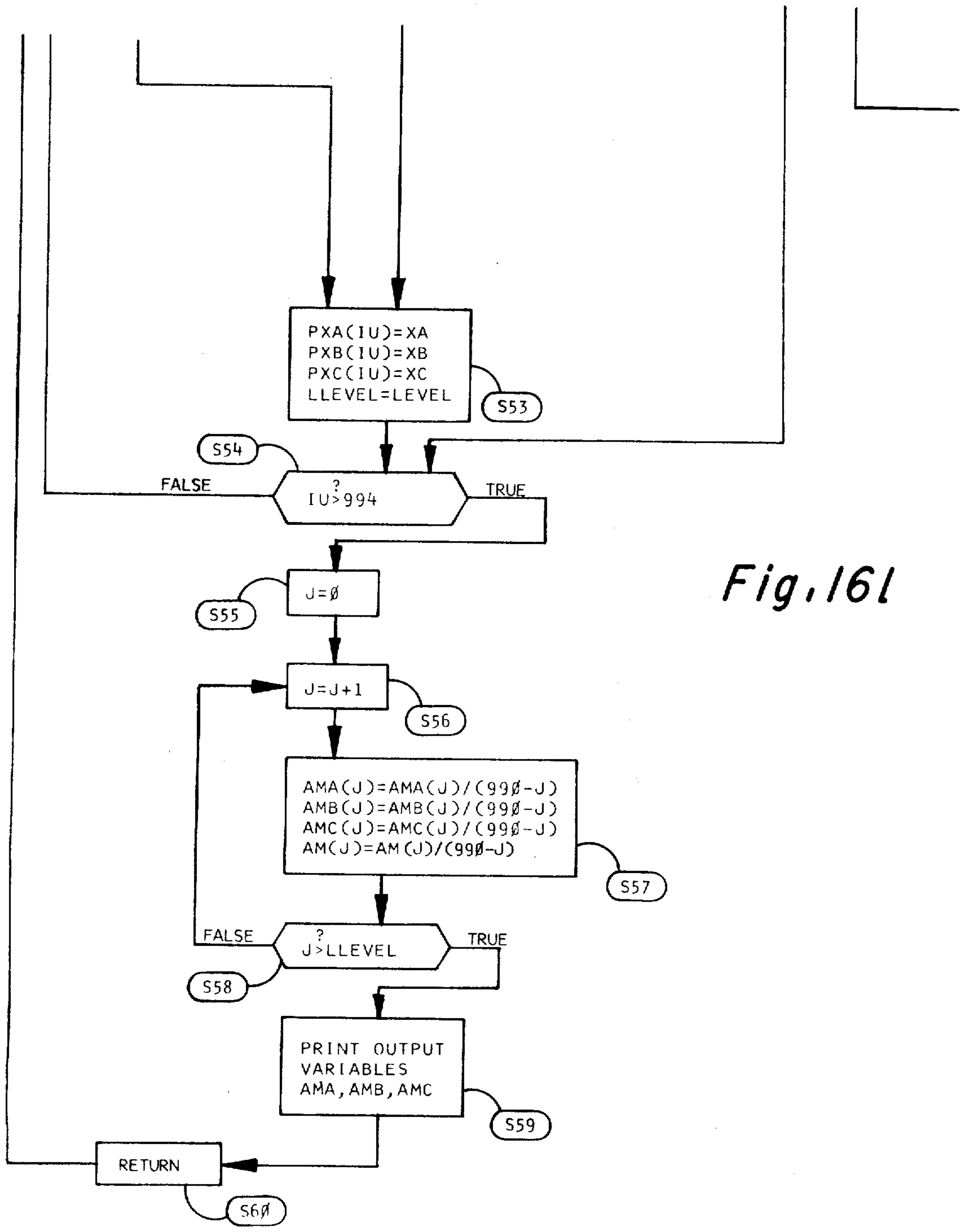
Figure 16M:
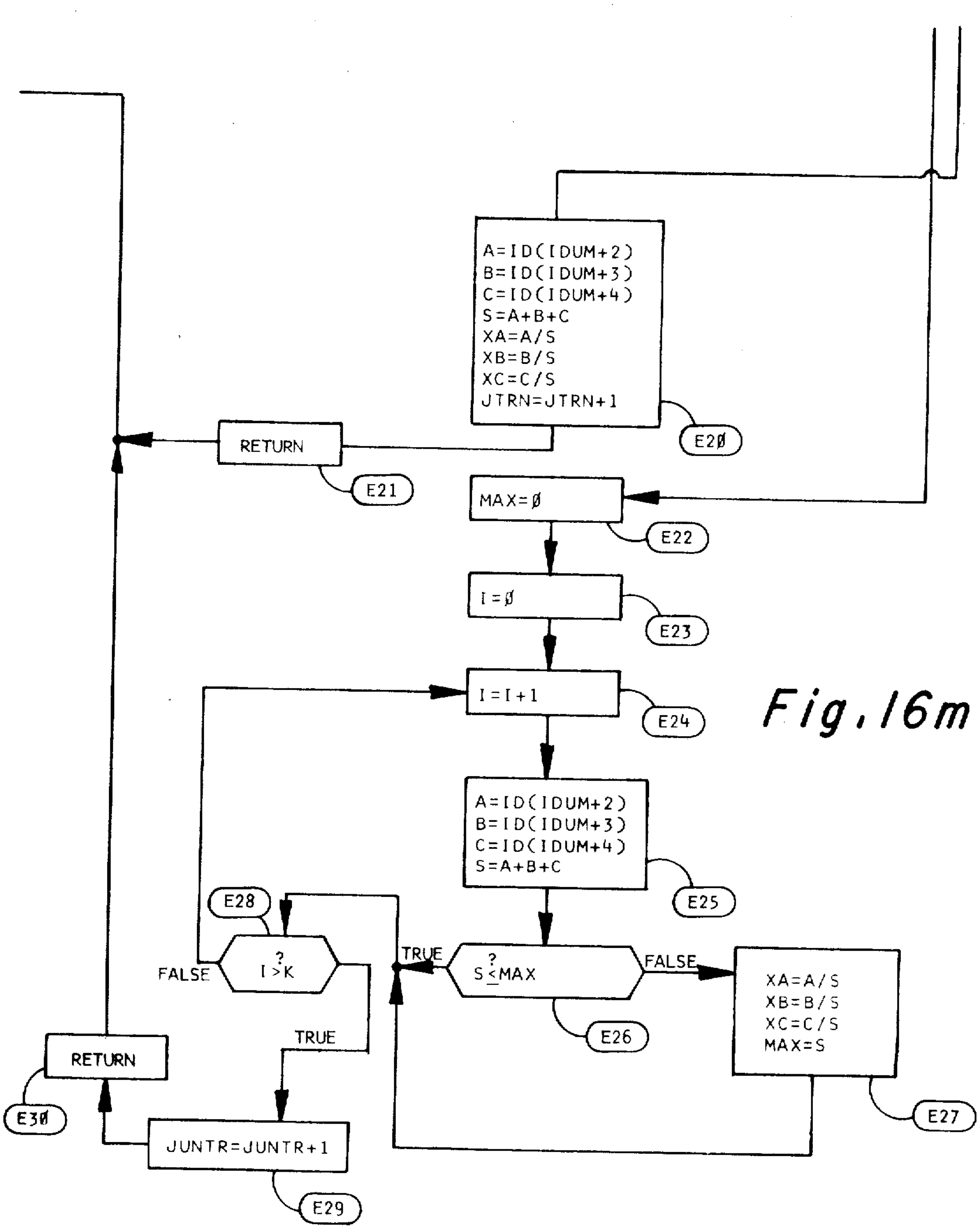
Figure 17:
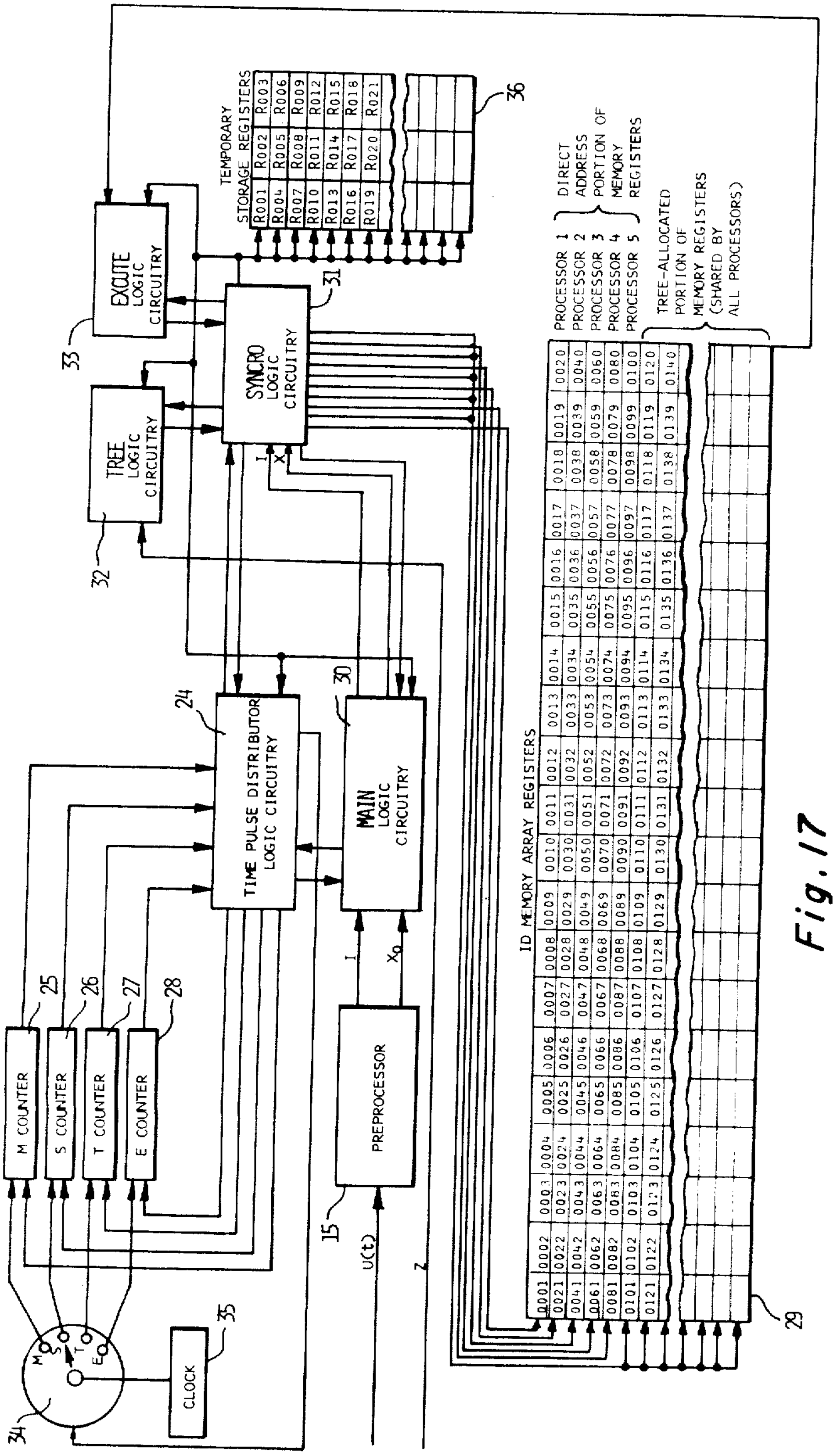

Still further objects and advantages of the invention will be apparent from the following detailed description and claims and from the accompanying drawings illustrative of the invention wherein:

FIG. 1 illustrates the system of the invention,

FIG. 2 illustrates an example of a typical spoken word input signal for which an embodiment of the invention may be utilized to classify, FIGS. 3–5 illustrate the operation of a preprocessor in preparing the signal of FIG. 2 for the series of cascaded processors, FIG. 6 illustrates an example of the internal structure of each signal processor utilized in one embodiment of the system comprising a multi-level tree-arranged storage array, FIGS. 7–11 illustrate the formation of an example of the tree arranged storage of one processor utilized in an embodiment of the invention during a plurality of training cycles, FIGS. 12–14 illustrate the training and cascading of the first three processors comprising an embodiment of the system, FIG. 15 illustrates the training and cascading of the $k^{th}$ or last processor completing the embodiment of the system of FIGS. 12–14 and execution thereupon, FIG. 16, consisting of 13 sections, 16*a*–16*m* which are put together as illustrated in FIG. 16, illustrate the operation of an embodiment of the entropy system of the invention, and FIG. 17 illustrates a special purpose hardware embodiment for implementation of the system of the invention.

Referring now to the drawings, in simplest form, the cascaded processors comprising the trainable system of the invention are as shown in FIG. 1. There are a total of *k* processors of which five, first processor 10, second processor 11, third processor 12, $k-1^{th}$ processor 13 and $k^{th}$ processor 14, are represented in the figure. The actual number of processors utilized to solve any given problem is determined by the complexity of the signals being operated on and the accuracy desired; the only limitation being that there be at least two such processors cascaded together. There are two inputs to the system, U(*t*) and Z, and one output $X_k$. The signals transmitted to the Z input and from the $X_k$ output may comprise a plurality of signals, or digital or binary components of a single signal, in which case such input and output represent a set. U(*t*) corresponds to the normal input which is usually an analog signal such as a function of time, but which may be digital or binary data. Z corresponds to the desired output (or response) to input U(*t*). $X_k$ is the system's estimate of Z and will be referred to as the "actual output" of the system to distinguish it from the "desired output" Z. Operation of the processor involves two phases: a training phase and an execution phase. During the training phase switch 17 is closed, and the signals U(*t*) and Z are applied.

In general, U(*t*) is an analogue signal 16 which contains information or information plus noise and is first digitized and otherwise processed by preprocessor 15 to produce a set of one or more signals I and a signal $X_o$. Many U(*t*) signals are introduced into preprocessor 15 during the training phase of the system, thereby providing many corresponding sets of I signals and $X_o$ signals.

Processors 10–14 are trained in a sequence as follows: first, processor 10 is trained to store therein first statistical data based upon an applied input signal comprising signals $I_o$ and $X_o$ and an applied desired response Z corresponding to the U(*t*) signal to preprocessor 15. When processor 10 has been trained on the signals $I_o$ and $X_o$, a second step in the sequence commences in which a second input signal consisting of another $I_o$ and $X_o$ signal, generated by preprocessor 15 for a second U(*t*) signal is applied to processor 10. Processor 10 is now operated in an execution mode to generate from the stored first statistical data contained therein, a probabilistic signal $X_1$ which is a best statistical estimate for processor 10 of a desired response to such second U(*t*) input signal. As a third step, second processor 11 is now operated in a training mode to store therein second statistical data based upon a third input signal consisting of the signal $I_1$ generated by preprocessor 15 from the second U(*t*) signal, the probabilistic signal $X_1$ generated by first processor 10 during its execution for the second U(*t*) signal and desired response Z corresponding to the second U(*t*) signal. In one embodiment, hereinafter described in detail, the $I_o$ signal utilized in the execution of processor 10 to generate an $X_1$ signal for the training of processor 11 is the input signal $I_1$ on which processor 11 is to be trained, delayed by one unit of time. As training progresses over the entire training cycle, the internal structure of each processor adapts so that the actual output X of each most nearly approximates, in a statistical sense, the desired response Z for any given input signal U(*t*).

The training phase continues until all processors in the series have been trained in a similar fashion. The input signal to the last or $k^{th}$ processor 14 consists of the input signals $I_{k-1}$, the desired response Z to the U(*t*) signal from which the $I_{k-1}$ signal is generated, and the output $X_{k-1}$ of the $(k-1)^{th}$ processor 13. The inputs to each preceding processor consists of separate I and X signals which in the one embodiment of the invention referred to above is the $I_{k-1}$ signal being applied to the $k^{th}$ processor 14 succeedingly delayed in time by one time unit and the X output of the previous processor.

When all of the *k* processors 10–14 have been trained, the system is ready for execution, that is, the use of the system of cascaded processors to solve a real life problem. Now, a U(*t*) signal to be tested becomes the input to preprocessor 15, and again, a set of I signals and an $X_o$ signal is generated therefrom. First processor 10 is again operated in an execution mode, this time to generate from the statistical data stored therein, a probabilistic signal $X_1$ which is a statistical estimate of the desired response to the U(*t*) signal being tested when the $I_o$ and $X_o$ signals, generated by preprocessor 15 for such U(*t*) signal, are applied thereto. Then, second processor 11 is operated in an execution mode to generate from the statistical data stored therein a second probabilistic signal which is a better statistical estimate of a desired response to the U(*t*) signal being tested when the $I_2$ and $X_1$ signals corresponding to such U(*t*) signal are applied thereto. The remaining processors in the series are executed upon in a similar manner, the input signal to each processor consisting of an I signal provided by preprocessor 15 and a probabilistic signal X provided by the subsequent processor in the series. The probabilistic signal generated by *k*th processor 14 when the $I_{k-1}$ signal and the output signal $X_{k-1}$ provided by the $(k-1)^{th}$ processor, may then be converted to an actual output signal which is a minimum entropy or uncertainty estimate for the entire cascaded system of a proper desired response to the U(*t*) signal being tested. In the one embodiment referred to above the input to $k^{th}$ processor 14 during execution consists of the $I_{k-1}$ signal and the output signal $X_{k-1}$ of the $(k-1)^{th}$ processor, while the I and X signals applied to the remainder of the processors are the same as the $I_k$ signal, retrogressively delayed in time by one additional time unit and the output of the previous processor in the series, respectively.

As mentioned previously, the trainable system of cascaded processors is applicable to problems of classification, identification, filtering, smoothing, prediction and modeling. Since the internal structure of the system of cascaded processors is generically identical in each instance, however, it is believed both impractical and unnecessary to discuss each and every environment in which the system may be embodied. Thus, only a classification embodiment, and more particularly, a system for verbal word recognition will be described in detail herein.

Referring then to FIG. 2, a typical verbal word pattern is illustrated graphically. The amplitude of the signal (on the vertical axis) is plotted against real time (on the horizontal axis).

The preprocessor utilized in conjunction with the present embodiment, first digitizes the analog signal by dividing the time length of the signal into a fixed number of segments $n$ (100, for example, although 100 are shown for purposes of illustration) and measuring the amplitude value for each of the n segments as illustrated in FIG. 3. The input signal U then forms a set of $n$ discrete amplitude values $$\{U_{t_1}, U_{t_2}, U_{t_3} \ldots U_{t_{n-1}}, U_{t_n}\}$$

Next, the preprocessor is utilized in applying a threshold test to each member of the set in order to distinguish a signal containing information from a signal which is merely noise. Thus, when the value of any member of the set is less than a threshold value such as 0.1, for example, the signal is assumed to be only noise and such member of the set is ignored by the system. In addition, the signal amplitudes are normalized to range from values of one to negative one as shown in FIG. 4. This is accomplished by dividing the amplitude value of each segment by the absolute value of the segment having the greatest (either positive or negative) amplitude value. An essential feature of the normalization process is that the pattern becomes independent of the volume at which the words are spoken. That is, if the speaker uses variable volumes in pronouncing the same word, the resulting normalized signals are approximately the same and therefore more easily recognizable.

As a next step in the operation of the preprocessor, an amplitude value of one is added to the signal so that the signal now ranges from a value of "0" to "2", as illustrated in FIG. 5, rather than from −1 to 1.

In the embodiment of the invention considered herein, two components comprising the key function are provided to each of the cascaded processors in the series. One component, "I", is merely a digital signal which is equal to the amplitude value at each time segment normalized from "0" to "2" and thereafter quantized by the preprocessor to range from "0" to "20".

For the second and subsequent processors, the second or "X" component is some probabalistic value defined and provided by each previous processor in the series. The X component ($X_o$) which is utilized by the first processor, however, must be provided by the preprocessor. $X_o$ is defined so that it contains the mean value of the input signal amplitude over each consecutive ten time segments and also has some connotation of frequency as follows:

$$X_o = \left[ \sum_{t=T-10}^{t=T} U(t)/10 \right] + 20 \times (\text{ZERO})$$

"ZERO" is equal to the number of times the signal has crossed the "0" amplitude axis of FIG. 4 or the "1" amplitude axis of FIG. 5 for the particular sample of 10 time segments being tested.

The preprocessor thus provides the key function for the first processor ($I_o$, $X_o$) and the first key component $I_1$ to $I_k$ for each subsequent processor.

The basic internal structure of each of the processors is identical to each of the others as they all operate on the same principle. The actual structure of each processor is formed in the training of such processor and therefore each processor will in fact have a different structure from the others and completed systems of cascaded processors, trained on different data sets, will most likely have internal structures which differ from one another.

The basic internal structure of each processor and an example of the method utilized in the formation of one structure of a memory array comprising a nonlinear processor utilized in conjunction with an embodiment of the present invention will now be discussed in detail with reference to FIGS. 6–11. As previously mentioned, the internal structure of each processor is comprised of a storage array which is partially directly addressable and partially tree-allocated, the tree-allocated portion extending as branches from such directly addressable portion.

A graph comprises a set of nodes and a set of unilateral associations specified between pairs of nodes. If node r is associated with node $s$, the associated is called a branch from initial node $r$ to terminal $s$. A path is a sequence of branches such that the terminal node of each branch coincides with the initial node of the succeeding branch. Node $s$ is reachable from node $r$ if there is a path from node $r$ to node $s$. The number of branches in a path is the length of the path. A circuit is a path in which the initial node coincides with the terminal node.

A tree is a graph which contains no circuits and has at most one branch entering each node. A root of a tree is a node which has no branches entering it, and a leaf is a node which has no branches leaving it. A root is said to lie on the first level of the tree, and a node which lies at the end of a path of length (s−1) from a root is on the $s^{th}$ level. When all leaves of a tree lie at only one level, it is meaningful to speak of this as the leaf level. Such uniform trees have been found widely useful and, for simplicity, are solely considered herein. It should be noted, however, that nonuniform trees may be accommodated as they have important applications in optimum nonlinear processing. The set of nodes which lie at the end of a path of length one from node m comprises the filial set of node $m$, and $m$ is the parent node of that set. A set of nodes reachable from node $m$ is said to be governed by *m* and comprises the nodes of the subtree rooted at *m*. A chain is a tree, or subtree, which has at most one branch leaving each node.

In the present system, a node is realized by a portion of storage consisting of at least two components, a node value stored in a VAL register associated with the node and an address component designated ADP. The node value serves to distinguish a node from all other nodes of the filial set of which it is a member and corresponds directly with the key component which is associated with the level of the node. The ADP component serves to identify the location in memory of another node belonging to the same filial set. Thus, all nodes of a filial set are linked together by means of their ADP components. These linkages commonly take the form of a "chain" of nodes constituting the filial set, and it is therefore meaningful to consider the first member of the chain the entry node and the last member the terminal node. The terminal node may be identified by a distinctive property of its ADP. In addition, a node may commonly contain an address component ADF plus other information. The ADF links a given node to its filial set at a next level of the tree.

In operation, the nodes of the tree are processed in a sequential manner with each operation in the sequence defining in part a path through the tree which corresponds to the key function and provides access to the appropriate trained response. This sequence of operations, in effect, begins with the directly addressed portion, then searches the tree allocated portion extending therefrom to determine if a component of the particular key function is contained therein. If during training the component cannot be located, the existing tree structure is augmented so as to incorporate the missing item into the file. Every time such a sequence is initiated and completed, the processor is said to have undergone a training cycle.

In the present embodiment, as illustrated in FIG. 6, the first twenty registers of the storage or memory array are reserved for the directly addressable portion of the tree. Each register I(1) - I(20) corresponds to one of twenty values 1 to 20, respectively, which the I key component can be. Contained in each of these first twenty registers is the ADF or memory address of a register in the tree-allocated portion of the storage array, such address being inserted into the register during training as the tree is being formed. Since the directly addressable registers contain ADF addresses of registers in the tree-allocated portion of the storage array, such directly addressable registers may be considered as the root level of a tree-arranged storage array even through there is no ADP link between the registers of such root level.

The actual tree portion of the memory array, having both VAL and ADP registers to link nodes in the same level, corresponds to the X component of the key function. Considering the directly accessible I registers as the root level of the tree, this second level is then the leaf level of the tree. In other embodiments of the invention, additional key components may be utilized and corresponding intermediate levels are added therefore.

The leaf level of the tree then, contains a plurality of registers including a first VAL register and second ADP register as previously noted. In addition, m registers, one of which is associated with each node in this level are reserved for each one of the desired outputs of the system $Z_1 - Z_m$. Such registers are utilized to store the number of times N that each of such desired outputs has been associated with the key function defining a path to such leaf node.

Figure 7:
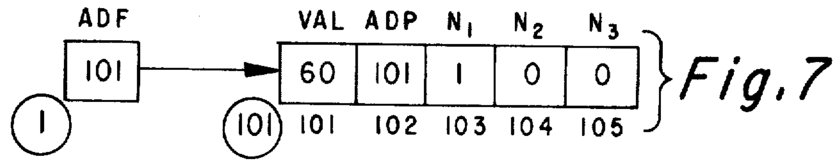

The operations of the processor during training can be made more concrete by considering a specific example of several training cycles. Referring to FIG. 7, assume that the key function (I,X) for the first training cycle is, for example, (1,60) with an associated desired response of $Z_1$. The blocks represent the one or more registers comprising each node of the tree structure and the circled number associated with each of such blocks identifies the first register of the node (referred to as the node number) and corresponds to its location in the memory array. Prior to the first training cycle all registers are blank. In the first or root level iteration, the I value of 1 directly addresses node 1. In this embodiment node numbers 21–100 are skipped so that the first available register address for the second or leaf level iteration is 101. As previously discussed, the ADF of a node links it to a node of its filial set at the next level of the tree. The number 101 is therefore stored in the ADF register comprising node 1. In the embodiment illustrated in FIGS. 7–10, nodes of the second level are comprised of a VAL and an ADP register as well as three N registers $N_1$, $N_2$ and $N_3$ which accumulate the number of times that each of three desired outputs $Z_1$, $Z_2$ and $Z_3$ representing three words have been associated with the node. In the second level iteration then, second key component 60 is stored in the VAL register (memory address 102) of node 101. When there are no further nodes linked in the second level, the number of the entry node is placed in the ADP register of the last linked node in that level. Thus, since there are no further nodes in the second level linked to node 101, the number 101 is stored in the ADP register of node 101. The key component (1,60) has been associated with desired output $Z_1$, thus a 1 is placed in the $N_1$ register (memory address 103) of node 101.

Figure 8:
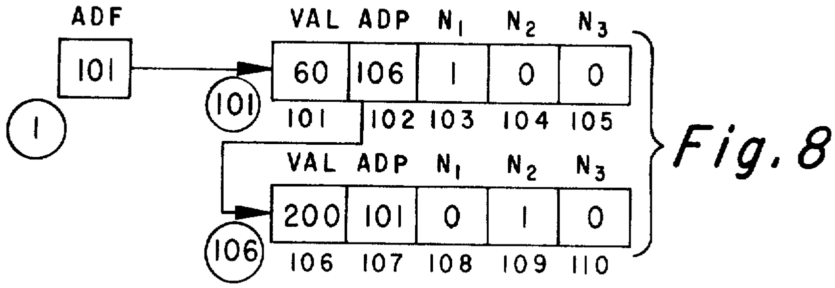

The key function for the second training cycle is (1,200) with an associated desired response of $Z_2$. Referring then to FIG. 8, the first key component 1 again directly addresses node 1. The ADF of node 1 (101) next leads to node 101 of the second level where the second key component 200 is compared with the number 60 stored in the VAL register of that node. The key component 200 does not match the number 60 and, as there are no other nodes in the filial set, indicated by the ADP (101) not being greater than the node number 101; another node is created. The next available register has the address 106 which becomes the next node number. The ADP of node 101 is therefore changed to 106 in order to link the new node to the last node of its filial set and the ADP of node 106 is set to 101, indicating that node 101 is the entry node of the filial set with which it is associated. In addition, as the key function (1,200) has been once associated with $Z_2$, the $N_2$ register (memory address 109) of node 106 is set equal to 1.

Figure 9:
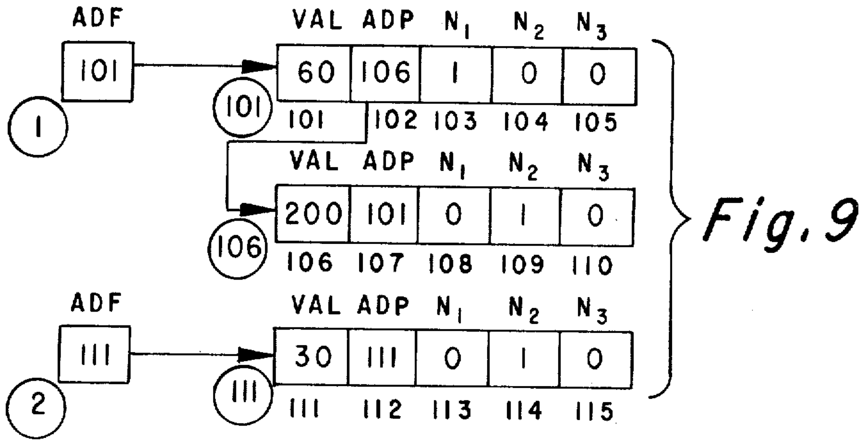

Referring now to FIG. 9, the key function for the third training cycle is (2,30) for a desired output of $Z_2$. Node number 2 is directly addressed by the first key component 2. As there are no previous nodes in the second level extending from node 2, the address number of the next available register, namely 111, becomes the node address for the filial set extending from node 2. The second key component 30 is stored in VAL register (memory address 111) and since there are no other nodes in the filial set ADP register (memory address 112) of node 111 is set equal to 111. This key function has been associated with a desired output of $Z_2$ so that a 1 is stored in the $N_2$ register (memory address 114) of node 111.

In the fourth training cycle, as illustrated in FIG. 10, the key function is again (2,30) but this time associated with a desired output of $Z_1$. The I component of 2 directly addresses node 2 in the first level. The contents of the ADF register comprising node 2 then leads to memory address 111 where the second X key component 30 is compared to the contents of the VAL register of that node, namely 30. There is a match, so that a 1 is placed in the $N_1$ register of node 111 (memory address 113) representing the association of key function (2,30) with desired output $Z_1$.

Referring to FIG. 11, in the fifth training cycle a desired output of $Z_2$ is again associated with the key function (1,200). The first key component 1 directly addresses node 1 containing the ADF memory address 101 of register 101 in the second level. The second key component 200 is then compared with the contents (60) of the VAL register (memory address 101) of node 101. The numbers 200 and 60 do not match and as the contents (106) of the ADP register (memory address 102) of node 101 is greater than 101, there are further nodes in the filial set to be tested. Therefore, the ADP register of node 101 leads to node 106. X key component 200 is now compared with the 200 stored in the VAL register (memory address 106) of node 106. There is a match, and as this is the second time a $Z_2$ has been associated with the key function (1,200) a 1 is added to the contents of the $N_2$ register (memory address 109) of node 106 giving a sum of 2.

The training process continues, as illustrated above, until the processor which is being operated upon has been sufficiently trained. It is obvious that sufficiency, however, is going to be only a small percentage of all possible combinations of input signals and corresponding key functions. If too many input signals are examined during training, it costs additional training time, execution time and memory space. If too few signals are examined, on the other hand, the probability that the system will make an error in classification increases. Optimum systems must therefore be chosen with the above criteria in mind, with reference to the particular problem to be solved and with reference to the particular degree of accuracy required.

During an execution phase, key functions derived from data sets which do not have corresponding desired outputs are run through the processor. The tree structure is searched in the same manner as it is during the training phase when the tree is searched to determine whether a key function has been previously encountered. In execution, however, it is the N values, that is, the number of occurrences of each Z generated at the leaf level of the tree which are sought.

It has been noted that the key function for the embodiment of the invention being described herein has two key components, an I component and an X component. As previously discussed, the key function for the first processor ($I_0$, $X_0$) and the first key component $I_1$ to $I_k$ for each subsequent processor are provided by the preprocessor. The second key component $X_1$ to $X_k$ for each of the subsequent processors is some probabalistic value provided by the prior processor in the series. Thus, the output $X_1$ of the first processor becomes the X input to the second processor, the output $X_2$ of the second processor becomes the X input to the third processor and so forth, the $X_{k-1}$ output from the $(k-1)^{th}$ processor becoming the input to the $k^{th}$ processor.

When the first processor has been trained utilizing the key function ($I_0$, $X_0$), a plurality of nodes in the leaf level of the memory array of that processor will have been created. Each of such nodes has three registers in which the number of times each of three possible desired outputs $Z_1$, $Z_2$ and $Z_3$ has been associated with the key function it represents during the processor's training. The output of the first and subsequent processors which may be called $X_i$, in general (forming the input to the second and subsequent processors) is defined in terms of the probabilities of the number occurrences of desired outputs $Z_1$, $Z_2$ or $Z_3$. Thus, the probability that a new key function being introduced into a trained processor is a $Z_1$ is $N_1/(N_1+N_2+N_3)$, the probability that it is a $Z_2$ is $N_2/(N_1+N_2+N_3)$ and the probability that is a $Z_3$ is $N_3/(N_1+N_2+N_3)$. The sum of the three probabilities $(N_1/(N_1+N_2+N_3)+N_2/(N_1+N_2+N_3)+N_3/(N_1+N_2+N_3))$ must be equal to unity and therefore, if any two of the above probabilities are known, the third is determinable therefrom. Thus, for example $N_3/(N_1+N_2+N_3)$ is equal to $1-[N_1/(N_1+N_2+N_3))+N_2/(N_1+N_2+N_3)]$.

Two of the probabilities are thus utilized in the formation of the X key component for the 2nd through $k^{th}$ processors. The two probabilities selected are first quantized and then transmitted to the next processor in the series as a vector quantity. For the present embodiment $X_i$ is defined as:

$$X_i = [N_1/(N_1+N_2+N_3) + 11((N_2/N_1+N_2+N_3)+1)]_i$$

The method of providing input information to each processor and the internal structuring of the memory array for each nonlinear processor utilized in various embodiments of the invention has now been discussed in detail. At this point, with reference to FIGS. 12–15, the method of interconnecting the various processors comprising the system of one embodiment during a training phase and then, during an execution phase will next be described.

In the embodiment now to be described, however, the same data set $$\{U_{t_1}, U_{t_2}, U_{t_3} \ldots U_{t_{n-1}}, U_{t_n}\}$$

is utilized in training each of the processors. This is accomplished by introducing a delayed I component into each previous processor of the series. The delay is increased by one time segment, retrogressively, with the I component having the greatest delay going to the first processor in the series.

As illustrated in FIG. 12, first processor 10 is trained over the entire data set, with key functions of ($I_0(t)$, $X_o(t)$) for $t = 0$ to n being provided by a preprocessor (not shown in this figure).

Referring to FIG. 13, once first processor 10 has been trained over the entire data set, it is utilized in providing the $X_1$ components of the key functions for second processor 11. This is accomplished by rerunning the data set in an execution phase, delayed by one time segment, through processor 10. The delay is provided by digital delay means (denoted generally by numeral 20) such as a shift register. The delayed input to processor 10 is therefore the key functions ($I_1(-)$, $X_o(-1)$) where $I_1(t) = I_o(t)$. $X_1$ key components provided by processor 10 and $I_1(t)$ key components provided by the preprocessor then form key functions ($I_1(t)$, $X_1$) from $t = 1$ to $n$ which are then utilized in the training of second processor 11.

In training third processor 12, as illustrated in FIG. 14, the same data set is again utilized by the preprocessor to provide key functions ($I_2(t)$, $X_o(t)$) for $t = 0$ to $n$. Since the same data set is being used, $I_2(t) = I_0(t)$. These sequences of I and X key components are transmitted to first processor 10 after now being delayed by two time segments. Processor 10 is run in an execution phase for the entire data set to generate output $X_1$ for time segments $t = 0$ to $n$. Next, second processor 11 is run through an execution phase with the $I_2(t)$ key component provided by the preprocessor this time delayed by one time segment. Thus, the key functions provided for second processor 11 in the training of third processor 12 are ($I_2(t-1)$, $X_1$), for $t = 1$ to $n$. Processor 11 is operated in an execution phase to generate output $X_2$ for time segments $t = 1$ to $n$. Now the key functions utilized to train third processor 12 are ($I_2(t)$, $X_2$) for time segments $t = 2$ to $n$, where $I_2(t)$ is provided directly by the preprocessor and $X_2$ is provided by second processor 11.

Each processor in the series is trained in a similar manner. The I key component to the processor being trained is $I(t)$ and the I input to each previous processor being executed upon is the same I input ($I(t)$, retrogressively, delayed by one additional time segment. As illustrated in FIG. 15 then, $k^{th}$ processor 14 is trained by first utilizing key function ($I_k(t-k+1)$, $X_o(t-k+1)$) on first processor 10 in an execution phase to generate output $X_1$ for second processor 11. Next, processor 11 is operated on in an execution phase utilizing key function ($I_k(t-k+2)$, $X_1$) to generate output $X_2$ for third processor 12. The process continues progressively. $(k-1)^{th}$ processor !13 is provided with key function ($I_k(-1)$, $X_{k-2}$) and executed produce output $X_{k-1}$for $k^{th}$processor 14. Processor 14 is then trained on key function ($I_k(t)$, $X_{k-1}$) for time segments $1-k$ to $n$.

Interconnection of the processors for execution is identical to the system described above with reference to the training of $k^{te}$ processor 14. As processor 14 has now been trained, however, it is put through an execution phase rather than a training phase. The output $X_k$ of processor 14 contains the probabilities of the input signal representing $Z_1$, $Z_2$ and $Z_3$. In some embodiments $X_k$itself is the output of the total system. In other embodiments the Z with the highest probability at the last processor is selected, rather than a probability, which is the output of the system.

The system of the invention has now been generally described. One embodiment of the system illustrated in FIG. 17 is comprised of specialized digital circuitry to provide the hardware thereof. In such embodiment a time pulse distributor subsystem comprised of logic gates 24 resettable counters 25–28 provide the control circuitry for the system. The memory array comprising each nonlinear processor is provided by a plurality of randomly accessed read-write memory registers 29, which are addressed by proper quantization of the key components to correspond with built-in selection means utilized in conjunction with the logic of the accessing portion of the memory. Additional temporary storage registers 36 and logic circuits divided into four subsystems (MAIN 30, SYNCRO 31, TREE 32 and EXCUTE 33) are also provided.

It has been recognized, however, that a general-purpose digital computer may be regarded as a storeroom of electrical parts and when properly programmed, becomes a special-purpose digital computer or specific electrical circuit. Therefore, other embodiments of the invention will employ a properly programmed general-purpose digital computer to replace some or all of the above specific digital circuitry. The method of operating both a general-purpose computer embodiment of the invention and such specialized digital circuitry embodiment will henceforth be described in detail.

The flow diagram of FIG. 16 applies to operations performed by a general purpose digital computer as well as operation of the special purpose digital system illustrated in FIG. 17. FIG. 16 consists of FIGS. 16*a* to 16*m* which are put together as illustrated in FIG. 16. The special purpose digital computer will carry out the kind of operations represented in the flow diagrams automatically. A FORTRAN IV program comprising TABLES II*a–d* will allow the operations of the flow diagram to be carried out on any general purpose digital computer having a corresponding FORTRAN IV compiler.

In the special purpose digital circuitry embodiment of the system, illustrated in FIG. 17, two or more operations may occur simultaneously if different non-interfering portions of the circuitry are utilized. These sets of operations are denoted in the flow diagram of FIG. 16 by statements enclosed in numbered boxes, each box or block representing one set of operations. As mentioned above, the special purpose circuitry is controlled by a time pulse distributor subsystem which transmits an electrical signal from one of four decimal counters; M or MAIN counter 25, S or SYNCRO counter 26, T or TREE counter 27, or E or EXCUTE counter 28 to other sub-portions of the system during each clock pulse. The encircled number associated with each block of FIG. 16 is representative of the generation of a signal from time pulse distributor logic circuitry 24 to logic circuitry 30, 31, 32 or 33 when such number has been reached by the proper counter. Such number is called the "Control State" of the system for the operations listed in the block.

There are a total of 222 control states: M1–M107 provided by counter 25, S1–S60 provided by counter 26, T1–T24 provided by counter 27 and E1–E31 provided by counter 28. The actual sequence of control states does not necessarily follow in numerical order. Switch 34 controls which one of counters 25, 26, 27 or 28 provides the contemporary control state, and is operated by a signal from either MAIN logic circuits 30, SYNCRO logic circuits 31, TREE logic circuits 32 or EXCUTE logic circuits 33. Normally, a clock pulse transmitted from clock 35 via switch 34 to one of counters 25–28 will advance it to the next consecutive decimal number. Sometimes, however, it is necessary to reset the counter to a particular desired control state on the next clock pulse to that counter rather than continue in its consecutive sequence. Most often, the resetting of the counter providing the next control state will occur when, at a particular control state, certain conditions which will hereinafter be discussed in detail with reference to the description of the operation of the system during each control state. Other times, one of the counters is reset at the end of a sequence of control states in order to begin an entirely new set of operations and hence a new corresponding sequence of control states.

The entire operation of the time pulse distributor is shown in TABLE I. All counters are initially set at zero. The first clock pulse will set counter 25 of the time pulse distributor at control state M1. The following states are normally the next consecutive control state in the M sequence unless, at a certain control state, a condition occurs which resets counter 25 to a selected control state or switch 34 is operated to select a control state provided by counter 26, 27 or 28. The present state, reset conditions and next state are shown on the table for each of control states M1–M107, S1–S60, T1–T24 and E1–E31.

TABLE I

| Control State | Condition | Next Control State |
|---|---|---|
| | MAIN | |
| M1 | | M2 |
| M2 | | M3 |
| M3 | | M4 |
| M4 | | M5 |
| M5 | | M6 |
| M6 | | M7 |
| M7 | If $I = JLEV$ | M8 |
| | Otherwise | M5 |
| M8 | | M9 |
| M9 | | M10 |
| M10 | | M11 |
| M11 | | M12 |
| M12 | | M13 |
| M13 | | M14 |
| M14 | | M15 |
| M15 | If $U(J) < -VM$ | M16 |
| | Otherwise | M17 |
| M16 | | M17 |
| M17 | If $U(J) > VM$ | M18 |
| | Otherwise | M19 |
| M18 | | M19 |
| M19 | If $J = 3,600$ | M20 |
| | Otherwise | M13 |
| M20 | | M24 |
| M21 | | M22 |
| M22 | If $U(L) \geq .15$ | M24 |
| | Otherwise | M23 |
| M23 | If $L \geq 3,600$ | M9 |
| | Otherwise | M21 |
| M24 | | M25 |
| M25 | | M26 |
| M26 | | M27 |
| M27 | | M28 |
| M28 | If $UABS >$ UMAX | M29 |
| | Otherwise | M30 |
| M29 | | M30 |
| M30 | If $I = LT$ | M31 |
| | Otherwise | M26 |
| M31 | | M32 |
| M32 | | M33 |
| M33 | | M34 |
| M34 | If $I = 1,000$ | M35 |
| | Otherwise | M32 |
| M35 | If $NR(IK) \geq 1$ | M36 |
| | Otherwise | M37 |
| M36 | If $NR(IK) \leq 10$ | M40 |
| | Otherwise | M37 |
| M37 | If $RN(IK) \geq 11$ | M38 |
| | Otherwise | M39 |
| M38 | If $NR(IK) \leq 20$ | M41 |
| | Otherwise | M39 |
| M39 | | M42 |
| M40 | | M43 |
| M41 | | M43 |
| M42 | | M43 |
| M43 | | M44 |
| M44 | | M45 |
| M45 | If $I > 2$ | M47 |
| | Otherwise | M46 |
| M46 | | M63 |
| M47 | If $I > 12$ | M55 |
| | Otherwise | M48 |
| M48 | | M49 |
| M49 | | M50 |
| M50 | | M51 |
| M51 | If $(U(J)-1) \times (U(J-1)-1) \leq 0$ | M52 |
| | Otherwise | M53 |
| M52 | | M53 |
| M53 | If $J = I$ | M54 |
| | Otherwise | M50 |
| M54 | | M63 |
| M55 | | M56 |
| 56 | | M57 |
| M57 | | M58 |
| M58 | | M59 |
| M59 | If $(U(J)-1) \times (U(J-1)-1) \leq 0$ | M60 |
| | Otherwise | M61 |
| M60 | | M61 |
| M61 | If $J = I$ | M62 |
| | Otherwise | M58 |
| M62 | | M63 |
| M63 | If $I = 1,000$ | M64 |
| | Otherwise | M44 |
| M64 | | M65 |
| M65 | | M66 |
| M66 | | M67 |
| M67 | If $I = 1,000$ | M68 |
| | Otherwise | M65 |
| M68 | SUBROUTINE SYNCRO | S1 |
| | Return to | M69 |
| M69 | If ITEST is TRUE | M70 |
| | Otherwise | M80 |
| M70 | If ICEED is TRUE | M72 |
| | Otherwise | M71 |
| M71 | | M78 |
| M72 | | M73 |
| M73 | | M74 |
| M74 | If $IK \geq 21$ | M76 |
| | Otherwise | M75 |
| M75 | | M9 |
| M76 | If LEVEL LEVELS | M78 |
| | Otherwise | M77 |
| M77 | | M9 |
| M78 | | M79 |
| M79 | | M9 |
| M80 | | M81 |
| M81 | | M82 |
| M82 | If $JK = 3$ | M98 |
| | Otherwise | M83 |
| M83 | If $JK = 2$ | M91 |
| | Otherwist | M84 |
| M84 | | M85 |
| M85 | | M86 |
| M86 | | M87 |
| M87 | If $J <$ LEVEL | M88 |
| | Otherwise | M89 |
| M88 | If $J > 990$ | M90 |
| | Otherwise | M89 |
| M89 | | M90 |
| M90 | If $J > K$ | M105 |
| | Otherwise | M85 |
| M91 | | M92 |
| M92 | | M93 |
| M93 | | M94 |
| M94 | $J <$ LEVELS | M95 |
| | Otherwise | M96 |
| M95 | If $J > 990$ | M97 |
| | Otherwise | M96 |
| M96 | | M97 |
| M97 | If $J > K$ | M105 |
| | Otherwise | M92 |
| M98 | | M99 |
| M99 | | M100 |
| M100 | | M101 |

| | | |
|---|---|---|
| M101 | If J < LEVELS | M102 |
| | Otherwise | M103 |
| M102 | If J > 990 | M104 |
| | Otherwise | M013 |
| M103 | | M104 |
| M104 | If J > K | M105 |
| | Otherwise | M99 |
| M105 | | M106 |
| M106 | If IK ≥ 30 | M107 |
| | Otherwise | M9 |
| | SYNCRO | |
| S1 | If JK = 1 | S3 |
| | Otherwise | S2 |
| S2 | If JK = 2 | S4 |
| | Otherwise | S5 |
| S3 | | S6 |
| S4 | | S6 |
| S5 | | S6 |
| S6 | | S7 |
| S7 | | S8 |
| S8 | | S9 |
| S9 | If L = LEVELS | S10 |
| | Otherwise | S7 |
| S10 | If LEVEL > 1 | S20 |
| | Otherwise | S11 |
| S11 | | S12 |
| S12 | | S13 |
| S13 | | S14 |
| S14 | If ITEST is TRUE | S15 |
| | Otherwise | S17 |
| S15 | SUBROUTINE TREE | T1 |
| | Return to | S16 |
| S16 | | M69 |
| S17 | SUBROUTINE EXCUTE | E1 |
| | Return to | S18 |
| S18 | | S19 |
| S19 | | M69 |
| S20 | | S21 |
| S21 | | S22 |
| S22 | | S23 |
| S23 | SUBROUTINE EXCUTE | E1 |
| | Return to | S24 |
| S24 | If IU ≥ 990 | S27 |
| | Otherwise | S25 |
| S25 | | S26 |
| S26 | | S27 |
| S27 | | S28 |
| S28 | If IZED < 1 | S54 |
| | Otherwise | S29 |
| S29 | | S30 |
| S30 | | S31 |
| S31 | | S32 |
| S32 | | S33 |
| S33 | If I1 ≥ MQUANT | S34 |
| | Otherwise | S35 |
| S34 | | S35 |
| S35 | If I1 ≤ 1 | S36 |
| | Otherwise | S37 |
| S36 | | S37 |
| S37 | | S38 |
| S38 | If I − LEVEL = 0 | S39 |
| | Otherwise | S40 |
| | If IU < LEVEL | S49 |
| S39 | Otherwise | S42 |
| S40 | SUBROUTINE EXCUTE | E1 |
| | Return to | S41 |
| S41 | If IU > 990 | S44 |
| | Otherwise | S42 |
| 42 | | S43 |
| S43 | | S44 |
| S44 | | S45 |
| S45 | If I = LEVEL | S46 |
| | Otherwise | S31 |
| S46 | If ITEST is TRUE | S47 |
| | Otherwise | S49 |
| S47 | SUBROUTINE TREE | T1 |
| | Return to | S48 |
| S48 | | S54 |
| S49 | SUBROUTINE EXCUTE | E1 |
| | Return to | S50 |
| S50 | If IU > 990 | S53 |
| | Otherwise | S51 |
| S51 | | S52 |
| S52 | | S53 |
| S53 | | S54 |
| S54 | If IU > 994 | S55 |
| | Otherwise | S21 |
| S55 | | S56 |
| S56 | | S57 |
| S57 | | S58 |
| S58 | If J > LLEVEL | S59 |
| | Otherwise | S56 |
| S59 | | S60 |
| S60 | | M69 |
| | TREE | |
| T1 | | T2 |

| | | |
|---|---|---|
| T2 | If ID(L1 + I1) = 0 | T12 |
| | Otherwise | T3 |
| T3 | | T4 |
| Tr | If IDUM < 0 | T5 |
| | Otherwise | T6 |
| T5 | | T6 |
| T6 | If ID(IDUM) = T2 | T19 |
| | Otherwise | T7 |
| T7 | | T8 |
| T8 | If IDUMP < 0 | T9 |
| | Otherwise | T10 |
| T9 | | T10 |
| T10 | If IDUMP ≤ IDUM | T20 |
| | Otherwise | T11 |
| T11 | | T6 |
| T12 | | T13 |
| T13 | If ICT > 3,2000 | T14 |
| | Otherwise | T15 |
| T14 | | T15 |
| T15 | | T16 |
| T16 | | T17 |
| T17 | If ICT > MXICT | T24 |
| | Otherwise | T18 |
| | If entered from control state S15 | |
| T18 | Return to | S16 |
| | If entered from control state S17 | |
| | Return to | S48 |
| | If entered from control state S15 | |
| T19 | Return to | S16 |
| | If entered from control state S47 | |
| | Return to | S48 |
| T20 | | T21 |
| T21 | If ICT > 3,2000 | T22 |
| | Otherwise | T23 |
| T22 | | T23 |
| T23 | | T16 |
| | If entered from control state S15 | |
| T24 | Return to | S16 |
| | If entered from control state S47 | |
| | Return to | S48 |
| | EXCUTE | |
| E1 | | E2 |
| E2 | | E3 |
| E3 | | E4 |
| E4 | If ID(I + I1) = 0 | E11 |
| | Otherwise | E5 |
| E5 | | E6 |
| E6 | If I2 = ID(IDUM) | E20 |
| | Otherwise | E7 |
| E7 | | E8 |
| E8 | If IDUMY ≤ IDUM | E22 |
| | Otherwise | E9 |
| E9 | | E10 |
| E10 | | E6 |
| E11 | If IZAP = 1 | E12 |
| | Otherwise | E16 |
| E12 | If I1 ≥ MQUANT/2 | E17 |
| | Otherwise | E13 |
| E13 | | E14 |
| E14 | If I1 > MQUANT | E31 |
| | Otherwise | E15 |
| E15 | | E4 |
| E16 | If IZAP = 2 | E13 |
| | Otherwise | E17 |
| E17 | | E18 |
| E18 | If I1 < 1 | E31 |
| | Otherwise | E19 |
| E19 | | E4 |
| E20 | | E21 |
| | If entered from control state S17 | |
| | Return to | S18 |
| | If entered from control state S23 | |
| E21 | Return to | S24 |
| | If entered from control state S40 | |
| | Return to | S41 |
| | If entered from control state S49 | |
| | Return to | S50 |
| E22 | | E23 |
| E23 | | E24 |
| E24 | | E25 |
| E25 | | E26 |
| E26 | If S ≤ MAX | E28 |
| | Otherwise | E27 |
| E27 | | E28 |
| E28 | If I > K | E29 |
| | Otherwise | E24 |
| E29 | | E30 |
| | If entered from control state S17 | |
| | Return to | S18 |
| | If entered from control state S23 | |
| E30 | Return to | S24 |
| | If entered from control state S40 | |
| | Return to | S41 |
| | If entered from control state S49 | |
| | Return to | S50 |

The time pulse distributor then operates the remainder of the system as follows:

Control state M1:

A logical storage register of memory 36, designated ITEST, is utilized as a switch to control the system in either a training mode of operation or an execute mode of operation. When the contents of the ITEST register is equal to a logical TRUE, the system is in a training mode. When the contents of the ITEST register is equal to a logical FALSE, on the other hand, the system is to operate in an execute mode. During this control state the ITEST register is initially set equal to a logical TRUE.

A second logical storage register of memory 36, designated the ICEED register, is utilized to signal the system when the storage capacity of memory 29 has been exceeded and no further registers are therefore available for further growth of the tree-allocated portion of the memory array. The ICEED register is initially set equal to a logical TRUE, indicating that the storage capacity of memory 29 has not been exceeded. Then, however, during the operation of the system, the ICEED registers is set equal to a logical FALSE, this will be an indication that the storage capacity of memory 29 has been exceeded and the training phase will terminate.

Control state M2:

During this control state several of the registers of memory 36 are set to initial parameters. A UMAX register, an IEXEC register and a first NLP register are set equal to a decimal zero. The purpose of these registers will be discussed later. Four registers, an RS1 register, an RS2 register, an RS3 register and an RS4 register, which are utilized to store quantizing variables, are initially set equal to 0.099.

An MQUANT register which is utilized to store the maximum number of direct address entry points, in this embodiment 20 per processor or a total of 100 for the five processors, is set equal to a decimal 2 divided by the contents of the S 1 register. A J register, which is used for counting purposes, is also set equal to the quantity 2 divided by the contents of the RS1 register.

In addition, during this control state a LEVEL register which designates which of the five cascaded processes is presently being operated on, is initially set equal to a 1 representing the first processor. A LEVELS register is utilized to store the total number of processes in the series. In this embodiment five processes are cascaded together; therefore, the LEVELS register is set equal to five during this control state.

Control state 3:

A dummy variable JLEV register of memory 36 is set equal to the contents of the LEVELS register during this control state.

Control state M4:

An I register, which is utilized to store an indexing variable, is initialized to a value of zero.

Control state M5:

During this control state, a decimal 1 is added to the contents of the I register, and the resulting sum is then stored in the I register.

Control state M6:

There are five NLP registers in memory 36, each corresponding to one of the five processors. During this control state one of the five NLP registers is set equal to the first direct address location in ID memory array 29 for its corresponding processor. The first NLP register has been set equal to zero. Now, one of the NLP registers, in particular, the Ith NLP register, where I represents the contents of the I register, is set equal to the contents of the (I−1)th NLP register plus the contents of the J register.

Control state M7:

During this control state a decision is made determining the next control state. The contents of the I register is compared to the contents of the JLEV register. When the contents of both registers are equal, all of the NLP registers will have been set and the system may continue to control state M8. Thus, the first NLP register will have been set equal to 0, corresponding to the address of the first direct address register for the first processor; the second NLP register will have been set equal to 20, corresponding to the first address location for the direct address portion for the second processor; the third NLP register will have inset equal to 40 corresponding to the first address of the direct address portion for the third processor; the fourth NLP register will have inset equal to 60, corresponding to the first address of the direct address portion for the fourth processor; and the fifth NLP register will have inset equal to 80, corresponding to the first address of the direct address portion for the fifth processor. The first 100 registers of ID memory 29 are thus utilized as the direct address potions for the memory arrays of all five processors.

When the contents of the I register is not equal to the contents of the JLEV register, this indicates that not all of the five NLP registers have been set, and therefore a signal will be sent from MAIN logic circuitry 30 to time pulse distributor logic 24 to reset E counter 25 to return to control state M5.

Control state M8:

The 101th through the last register of ID memory 29 are common registers for the tree-allocated portions of all five processors. An ICT register of memory 36 is utilized to keep track of the next address which may be used in the formation of the leaf level of the tree for the processor presently being trained. During this control state, therefore, the ICT register is set equal to the contents of the JLEVth NLP register plus the contents of the J register, thereby setting the contents of ICT register to address 100. A MXICT register of memory 36 is set equal to the address of the last register of ID memory 29. During the operation of the system, the address of the ICT register will be compared with the contents of this MXICT register to see if the number of registers utilized to form the tree-allocated portion of the memory array has been exceeded and, if so, set the ICEED register equal to a logical FALSE. In this embodiment there are 40,000 ID memory registers and MXICT register is set equal to a value of 39,990, allowing 10 spare registers in ID memory array 29.

An IK register and a LEEFE register of memory 36, which are utilized for the storage of counting variables, are initialized during this control state to zero. During the training phase of the processors, many input signals U($t$), each representing one spoken word will be utilized. An NREC register of memory 36 is used to keep track of which one of the signals in the complete training set is being studied by the system at the present time. During this control state, the NREC register is initially set equal to zero.

It might be desirable to have the digitized signal U(*t*) recorded on magnetic tape prior to presentation of such signal to preprocessor 15. If such is the case, the data must be rescaled from the coding tape to its original amplitude values. If such is the case, a scaling parameter is necessary to accomplish this task. Therefore, a VM register of memory 36 is utilized for the storage of such scaling parameter, and a second SCALE register is utilized for the actual scaling of the data. During this control state, then, the VM and the SCALE registers are set to proper parameters for this purpose.

Control state M9:

This control state is merely a joining state to which various future control states may return. From here, we merely advance to the next control state.

Control state M10:

During an execution cycle, a JTRN register of memory 36 keeps track of the number of trained paths traveled by the processor during each execution cycle, and a JUNTR register keeps track of the number of paths which could not be completed traveled because the processor had not been trained on the particular key function being fed into the processor. Both the JTRN and the JUNTR registers are initialized to zero during this control state. In addition, the LEEFE register is set equal to zero and the contents of the IK register is increased by 1.

Control state M11:

During this control state, the input signal data is read into processor 15 and stored in a plurality of IN registers of memory 36.

Control state M12:

The J register of memory 36 is set equal to zero.

Control state M13:

The contents of the J register is increased by 1 during this control state.

Control state M14:

When the input signal data has been stored on magnetic tape, as indicated with reference to Control state M8, the actual scaling of the data is done during this control state for one data point (or time segment). This scaled data point is then stored in one of a plurality of U registers of memory 36.

Control states M15 and M16:

During these control states those data points having an amplitude value below the contents of the VM register multiplied by a negative 1, are set equal to the value stored in the VM register multiplied by a negative 1 for scaling purposes.

Control states M18:

During these the U register containing those data points having an amplitude value above the contents of the VM register are stored VM register scaling purposes.

Control state M19:

In order to determine whether or not all data points have been stored in the plurality of U registers and have been checked with respect to Control states M15 and M16 and Control states M17 and M18, the contents of the J register is compared to a value of 3600 which is the total number of U registers available. When the contents of the J register is equal to 3600, all data points will have been scaled, all U registers will have been filled, all U registers will have been checked against the maximum and minimum allowable amplitude values and the next control state will be M20. When the contents of the J register is not equal to 3,600, this indicates that there are further points to be scaled, stored, and checked. Therefore, time-pulse distributor logic circuitry 24 will reset M counter 25 to control state M13, so that the indexing variable stored in the J register may be advanced by 1 and the next data point operated upon.

Control state M20:

An L register of memory 36 is utilized to store another indexing variable. During this control state the L register is initially set equal to zero.

Control state M21:

During this control state the contents of the indexing L register is increased by 1.

Control state M22:

During this control state the threshold test is performed on a data point or amplitude value stored in the U registers. This is accomplished by comparing the amplitude value stored in the Lth U register with a set decimal value of 0.15. An amplitude value of less than 0.15 is assumed to be noise; however, once this value has been exceeded, the input data is assumed to contain information as well as noise and may be utilized in forming key functions.

Control state M23:

As data points are looked at, one at a time, during Control state M22, this control state is utilized to make sure that all of the 3,600 data points which have been read in the U registers have been checked. When all of such 3600 points have been checked, but none exceeds 0.15, this indicates that no word is contained in the set of data points, and time-pulse distributor logic circuitry 24 will reset M counter 25 so that another word may be read into preprocessor 15. When the number of points checked utilizing the threshold test of Control state M22 is less than all of the 3,600 registers stored, time-pulse distributor logic circuitry will reset M counter 25 to Control state M21, thereby increasing the indexing variable stored in the L register by 1 and performing the threshold test on the data point stored in the next U register.

Control state M24:

The UMAX register of memory 36 which is to be utilized for the storage of the maximum data point, is again set equal to a decimal zero during this control state.

The Lth U register now contains the first amplitude value of the signal which is considered to contain information. As it is desired in this embodiment to study only 1,000 data points of the digitized signal representing each spoken word, the last data point will be the contents of the L register plus 999. An LT register of memory 36, which is utilized to store the value of the last U register to be studied, is therefore set to the contents of the L register plus 999 during this control state. The LTth U register is therefore known to contain the last of the 1,000 samples to be studied.

Control state M25:

An indexing variable stored in the I register of memory 36 is set equal to 1 less than the contents of the L register.

Control state M26:

During this control state the indexing variable stored in the I register is increased by 1.

Control state M27:

During this control state the absolute value of each of the 1,000 data points stored in the Lth to LTth U register is computed.

Control states M28 and M29:

The contents of the UMAX register is set equal to the larger of either the absolute value of the amplitude of each data point stored in the Lth to LTth U register or the contents of the UMAX register. The contents of the UMAX register will then contain the maximum amplitude value among all of the 1,000 data points being studied whether it is positive or negative.

Control state M30:

Control state M30 will advance the system to Control state M31 when all 1,000 points have been checked. Otherwise, time-pulse distributor logic circuitry 24 resets M counter 25 to Control state M26 so that any remaining data points may be checked.

Control state M31:

Indexing register I is again initialized by setting it to a decimal zero.

Control state M32:

During this control state the contents of the I register is increased by 1.

Control state M33:

During this control state the data points are normalized to range from amplitude values of 0 to +2.

Control state M34:

This control state is utilized to make sure than all 1,000 data points which are to be studied have been normalized. This is accomplished by comparing the present contents of the I register with the number 1,000. When I is not equal to 1,000, time pulse distributor logic circuitry 24 sets M counter 25 to control state 32 so that the I indexing register is advanced to the U register containing the next data point. Otherwise, we may proceed to the next control state.

Control states M35 – M42:

A plurality of NR registers, each corresponding to a separate one of the input signals upon which the system is to be trained, are utilized to keep track of such input signals. IK register of memory 36 is utilized to index the NR registers. For training purposes, the input signals are arranged in a predetermined fashion which in this embodiment is as follows: input signals having corresponding NR values between 1 and 10 represent a spoken word with a desired output of $z_1$. Input signals having corresponding NR values between 11 and 20 represent a spoken word with a desired output of $Z_2$. Input signals having NR values between 21 and 30 represent a spoken word with a desired output of $Z_3$.

During Control states M35 and M36 the NR value of the input signal is tested to determine whether it is between 1 and 10 inclusively; if so, the next control state will be M40. During Control states M37 and M38 the NR value of the input signal is tested to determine whether it is between 11 and 20 inclusively; if so, the next control state will be M41. During control state M39 the NR value of the input signal is tested to determine whether it is between 21 and 30 inclusively; if so, the next control state will be M42.

When the input signal corresponds to a desired output of $Z_1$, an IXA register and a JK register of memory 36 are set equal to 1. This occurs during Control state M40. When the input signal corresponds to a desired output of $Z_2$, an IXB register of memory 36 is set equal to 1 and the JK register is set equal to 2. This takes place during Control state M41. When the input signal corresponds to a desired output of $Z_3$, an IXC register of memory 36 is set equal to 1 and the JK register is set equal to 3. This occurs during Control state M42.

Control state M43 and M44:

The I indexing register is initialized to 0 during control state M43. Then during Control state M44 the I indexing register is increased by 1. The value stored in the I register will now indicate the number of data points studied.

Control state M45 – M61:

A plurality of AVE registers are utilized for the computation of the average amplitude value over a number of data point samples and a plurality of ZERO registers are utilized for the computation of the number of times the input signal has crossed the zero axis for these same data points which is a measure of the frequency of the signal. At Control state 45, then, if the number of data points which have been studied is 2 or less, the average amplitude and number of zero crossings is insignificant. So at Control state M46 the th AVE register and the Ith ZERO register are set equal to zero.

If the number of data points which have been tested are between 2 and 12, determined during Control state M47, the average is computed with respect to the actual number I of points studied during Control state M48. The number of zero crossings is computed for the I samples tested during Control state M51. This is accomplished by comparing the present data point with the previous data point to see if the unnormalized amplitude values have undergone a change in sign, i.e. the signal has gone through zero. The total number of zero crossings is counted and the total stored in a W1 register of memory 36. The contents of the Ith ZERO register is then set equal to the contents of the W1 register divided by I.

If the number of data points tested is 13 or greater, then the average is taken over a 10-sample set of data during Control state M55. The number of zero crossings for the same 10-sample set is computed during Control states M59 and M62.

When all 1,000 samples have been averaged and tested for zero crossings in this manner, as indicated by comparing the contents of the I indexing register with the number 1,000 during Control state M63, the operation continues with Control state M64. Otherwise, time-pulse distributor logic circuitry 24 will reset M counter 25 to Control state M47, advancing the I indexing register to the next data point and hence taking the average for that data point plus the subsequent nine data points, for example, if the contents of the I register has reached a value of at least 13.

Control state M64:

The I indexing register is again initialized to a value of zero.

Control state M65:

During this control state the contents of the I indexing register is increased by 1.

Control state M66:

The contents of the Ith AVE register (determined by the contents of the I register) is increased by a decimal 1 during this control state.

Control state M67:

The operation during Control state M66 is continued for all 1,000 samples. When during this control state it is determined that a decimal 1 has been added to all 1,000 AVE registers, the operation proceeds to Control State M68. Otherwise, time-pulse distributor logic circuit 24 resets M counter 25 to Control state M65 and the operation of Control state M66 is repeated for the next AVE register.

Control state M68:

During this control state a signal is sent from MAIN logic circuitry 30 to the control mechanism of switch 34. Switch 34 is then reset so that the next clock pulse generated by clock 35 is applied to S counter 26. The next control state after M68 will then be S1. The operations during the sequence of S control states will be subsequently discussed.

Control state M69:

When during this control state, the contents of the ITEST register is a logical TRUE, there is an indication to the system that it is operating in a training mode, and M counter 25 will merely advance to the next control state M70. Otherwise, if the ITEST register contains a logical FALSE, time-pulse distributor logic circuitry 24 will reset M counter to Control state M80.

Control states M70 and M71:

The contents of the ICEED register is examined during Control state M70 and if such contents are equal to a logical FALSE, indicating that the total number tree-allocated portion of memory registers 29 have been exceeded, the last processor is eliminated from the system. That is, the fifth processor would be eliminated and only the first four cascaded processors would comprise the system of the present embodiment. Elimination of the last processor takes place during Control state M71. If the number of registers is again exceeded, the fourth processor would then be eliminated, and so forth.

Control state M72:

During this control state the contents of the LEVEL register, the contents of the ICT register and the contents of the LEEF register may be displayed by the system for test purposes if such feature is desired.

Control state M73:

During this control state the total number of nodes utilized in the leaf level of the processor which has just undergone training, stored in the LEEF register, is added to the present contents of the LEEFE counting register.

Control states M74 and M75:

When during Control state M74, the contents of the IK indexing register has reached 21, the processor continues its operation with Control state M76. Otherwise, if desired, the contents of the IK register may be displayed by the system indicating the current word under consideration during Control state M75 and then continue the operations of the system with Control state M9 when time-pulse distributor logic circuitry 24 resets M counter 25 to that control state because a determination has thereby been made that a complete training set has been passed through the system.

Control state M76:

During this control state the LEVEL counting register is compared with the contents of the LEVELS register to determine whether all five processors have been trained. If all processors have not been trained, M counter 25 will proceed to Control state M77. Otherwise, time-pulse distributor logic circuitry 24 will reset M counter 25 to Control state 79.

Control state M77:

During this control state a 1 is added to the present contents of the LEVEL register so that the system may train the next processor when all five processors have not as yet been trained. In addition, the LEEF register is set equal to zero, indicating that there are no nodes in the leaf level of such next processor and the IK register is set equal to zero, indicating that the input signal corresponding to the first spoken work will again be utilized in training such next processor.

Control state M78:

If all five processors have been trained, during this control state the contents of the ITEST register is set equal to a logical FALSE, indicating that the system is now ready for an execution phase. In addition, the IK register is set equal to the contents of an IEXEC register of memory 36.

Control state M79:

If desired, at this point, the contents of the LEEFE register (total number of leaves used in growing the tree) may be displayed by the system for test purposes before returning to Control state M9.

Control state M80:

During this control state the contents of the JUNTR (untrained point), JTRN (trained point), IXA, IXB, IXC registers may be either displayed by or transmitted as an output from the system.

Control state M81:

The K register is now set to 999 minus the contents of the LEVELS register and two other registers of memory 36, namely, the B1 and B2 registers, are set equal to zero.

Control states M82 and M83:

During these control states, a transfer to other control states by time-pulse distributor logic circuitry 24 is determined and made, based on the desired output of the signal studied as indicated by the contents of the JK register. That is, the desired output is $Z_1$ when the contents of the JK register is 1, $Z_2$ when the contents of the JK register is 2, or $Z_3$ when the contents of the JK register is 3.

Control state M84:

The J indexing register is again initialized by setting it to a value when is 1 less than the present contents of the LEVEL register.

Control state M85:

During the control state the contents of the J indexing register is increased by 1.

Control State M86:

The output X for the processor which has just been executed upon is computed and the probabilities stored in a plurality of P1 and P2 registers when such output is based on a $Z_1$ classification.

Control state M87 and M88:

During these control states a determination is made as to whether an execution phase has been completed at all processors and for all samples. If not, time pulse distributor logic circuitry 24 will reset M counter 25 to Control state M85.

Control state M89:

A B1 and B2 register of memory 36 are utilized for storing accumulated probabilities contained in the P1 and P2 registers, respectively. During this control state, the present value of the Jth P1 register is added to the present contents of the B1 register and the contents of the Jth P2 register is added to the present contents of the B2 register.

Control state M90:

When the contents of the J register is greater than the contents of the K register, the entire set of X key components for all data points of the digitized signal have been generated and time-pulse distributor logic circuitry 24 will reset M counter 25 to Control state M105 for transmission of such output. Otherwise, if the entire set of X key components has not yet been completely generated, time-pulse distributor logic circuitry 24 will reset M counter 25 to Control state M85 so that the J indexing register can be advanced by 1 and the operations during Control states M85–M89 repeated for the next data point.

Control states M91 – M97:

These control states correspond identically to the operations carried out during Control states M84 – M89, with the one difference being that the X output is based upon a desired output of a $Z_2$ classification rather than a $Z_1$ classification. Thus, Control state M91 corresponds to Control state M84, Control state M92 corresponds to Control state M85, Control state M93 corresponds to Control state M86, Control state M94 corresponds to Control state M87, Control state M95 corresponds to Control state M88, Control state M96 corresponds to Control state M89 and Control state M97 corresponds to Control state M90.

Control states M98 – M104:

These control states are also identical to the operations carried out during Control states M83 – M90, with the one exception being that the X output is based upon a $Z_3$ word classification. Thus, Control state M98 corresponds to Control state M84, Control state M99 corresponds to Control state M85, Control state M100 corresponds to Control state M86, Control state M101 corresponds to Control state M87, Control state M102 corresponds to Control state M88, Control state M103 corresponds to Control state M89 and Control state M104 corresponds to Control state M90.

Control state M105:

During this control state the entire set of X key components generated by the processor which has just been executed upon is transmitted from that processor.

Control state M106 and M107:

During Control state M106 a determination is made as to whether all training and execution words have been passed through the system. If all training and execution words have been passed through the system, the machine comes to a stop when Control state M107 is reached. Otherwise, time-pulse distributor logic circuitry 24 resets M counter 25 to Control state M9 so that the digitized input signal of another spoken word may be introduced into preprocessor 15.

Control states S1 and S2:

All of the above logic and arithmetic operations, with reference to Control states M1 through M106, have for the most part taken place in MAIN logic circuitry 30. Control states S1 and S2 and the following S control states occur when switch 34 is operated in the S position allowing clock 35 to operate S counter 26. As may be noted, the operation of switch 34 to the S position occurred during Control State M68. When the S counter is thereby controlling time-pulse distributor logic circuitry 24, arithmetic and logic operations take place in SYNCRO logic circuitry 31. During Control states S1 and S2 the contents of the JK register is examined to determine whether the desired output is a $Z_1$, $Z_2$ or $Z_3$. Thus, the contents of the JK register is a 1 corresponding to a $Z_1$, the next control state will be S3. When the contents of the JK register is equal to 2, the next control state generated by S counter 26 will be Control state S4. Otherwise, the contents of the JK register must be 3 and the next control state will be S5.

Control states S3 – S5:

Three registers of memory 36 are utilized to store a code representative of the three possible desired outputs. A YA register, a YB register and a YC register, each containing either a 1 or a 0, are utilized for this purpose. Thus, when the YA register is equal to 1 and the YB and YC registers are both equal to 0, this corresponds to a desired output of $Z_1$. When the YA register is equal to 0, the YB register is equal to 1 and the YC register is equal to 0, a corresponding desired output of $Z_2$ is thereby represented. When the contents of the YA and YB registers are both equal to 0 and the contents of the YC register is equal to 1, this corresponds to a desired output of $Z_3$.

The YA, YB and YC registers are set equal to the code 100 corresponding to a $Z_1$ during Control state S3, to a 010 corresponding to a $Z_2$ during Control state S4, and to a code of 001 corresponding to a $Z_3$ during Control state S5.

Control state S6:

An L indexing register of memory 36 is initialized to a value of 0 during this control state.

Control state S7:

During this control state the contents of the L indexing register is advanced by 1.

Control state S8:

During this control state 5 AMA, AMB, AMC and AM registers, one of each of such registers corresponding to one of the five processors, are set initialized by setting them to 0.

Control state S9:

The operation during Control state S8 is performed for each of the five processors individually. When during this control state, the number contained in the L indexing register is equal to the contents of the LEVELS register (5 in this embodiment), S counter 26 proceeds to Control state S10. Otherwise, time-pulse distributor logic circuitry 24 resets S counter 26 to Control state S7 so that the contents of the L indexing register may be increased by 1 and the AMA, AMB, AMC, and AM registers corresponding to the next processor may be set.

Control state S10:

The contents of the LEVEL register is examined during this control state to determine which of the five processors is presently in operation. When the first processor is in operation, S counter 26 merely advances to Control State S11. Otherwise, time-pulse distributor logic circuitry 24 resets S counter 26 to Control State S20.

Control state S11:

An IU indexing register of memory 36 is initialized during this control state to a value of 4.

Control state S12:

During this control state the contents of the IU indexing register is increased by 1.

Control state S13:

The input values $I_o$ and $X_o$ for the first processor are computed during this control state. The $I_o$ key component for the input signal being operated on is computed and stored in an I1 register of memory 36. The $X_o$ key component is computed and stored in an I2 register.

Control state S14:

The ITEST register is examined, and when the contents are equal to a logical TRUE, signifying that the system is in a training mode of operation, S counter 26 will continue to Control state S15. Otherwise, time-pulse distributor logic circuitry 24 will reset S counter 26 to Control state S17 for an execute mode of operation.

Control state S15:

This control state is used as a transitional state so that SYNCRO logic circuitry 31 may operate switch 34 into the T position, thereby allowing the next clock pulse to be transferred to T counter 27 providing Control state T1 to time-pulse distributor logic circuitry 24. The operations of TREE logic circuitry 32 will then be taken over by counter 27.

After the operations performed by TREE logic circuitry 32 have been completed, switch 34 is again operated to the S position so that S counter 26 may again take over control of the system. When such operation occurs during Control states T18, T19 or T24, and the original transfer was made during Control state S15, S counter 26 will be set to Control state S16 as the next state.

Control state S16:

During this control state a transfer is made from operation of SYNCRO logic circuitry 31 to operation of MAIN logic circuitry 30. This is accomplished when switch 34 is transferred to the M position so that clock 35 may operate M counter 25 to Control state M69 on the next clock pulse.

Control state S17:

This control state is used as a transitional state so that SYNCRO logic circuitry 31 may operate switch 34 into the E position, thereby allowing the next clock pulse to be transferred to E counter 28, providing Control state E1 to time-pulse distributor logic circuitry 24. The operations of EXCUTE logic circuitry 33 will then be taken over by counter 28.

After the operations performed by EXCUTE logic circuitry 33 have been completed, switch 34 is again operated to the S position so that S counter 26 may again take over control of the system. When this operation occurs during Control states E21 or E30, and the original transfer was made during Control state S17, S counter 26 will be set to Control state S18 as the next state.

Control state S18:

The contents PXA, PXB, and PXC registers, utilized in the operations of MAIN logic circuitry 30 during Control states M86, M93 and M100, are computed during this control state for the IUth data point the contents of XA, XB and XC registers of memory 36.

Control state S19:

During this control state a transfer is made from operation of SYNCRO logic circuitry 31 to operation of MAIN logic circuitry 30. This is accomplished when switch 34 is transferred to the M position so that clock 35 may operate M counter 25 to Control state M69 on the next clock pulse.

Control state S20:

During this control state the IU indexing register is again initialized; this time to a value of 4.

Control state S21:

During this control state the contents of the IU indexing register is increased by 1.

Control state S22:

The input values $I_o$ and $X_o$ for execution of the first processor are computed during this control state. The $I_o$ key component for the input signal being operated on is computed and stored in an I1 register of memory 36. The $X_o$ key component is computed and stored in an I2 register.

Control state S23:

This control state is used as a transitional state so that SYNCRO logic circuitry 31 may operate switch 34 into the E position, thereby allowing the next clock pulse to be transferred to E counter 28, providing Control state E1 to time-pulse distributor logic circuitry 24. The operations of EXCUTE logic circuitry 33 will then be taken over by counter 28.

After the operations performed by EXCUTE logic circuitry 33 have been completed, switch 34 is again operated to the S position so that S counter 26 may again take over control of the system. When this operation occurs during Control states E21 or E30, and the original transfer was made during Control state S23, S counter 26 will be set to Control state S24 as the next state.

Control states S24 and S25:

When the contents of the IU indexing register is less than 990 during Control state 24, The mean squared error based on the word classification or desired output known exactly is computed and stored in an AMSE register of memory 36 at Control state S25.

Control state S26:

During this control state the contents of the XA, XB, and XC registers are added to the contents of the AMA, AMB and AMC registers, respectively. The respective sums are then restored in the AMA, AMB and AMC registers to provide a running sum of the first processor's output probabilities.

In addition, the mean squared error computed during Control state 25 is added to the present contents of the AM register. The sum is then stored in the AM register to provide a running sum of the mean squared error.

Control state S27:

An IZED register of memory 36 is initially set equal to a value of 1 less than the contents of the IE register Control state S28:

During this control state a decision is made as to the next control state. When the contents of the IZED register is less than 1, S counter 26 is reset to Control state S54. Otherwise, S counter 26 merely advanced by time-pulse distributor logic circuitry 24 to Control state S29.

Control states S29 and S30:

During these control states an IV register of memory 36 is initialized to a value equal to the present contents of the IU register, and the I indexing register is initialized to a value of 1.

Control state S31:

During this control state the contents of the I indexing register is increased by 1.

Control state S32:

The I input key component is generated during this control state. This is accomplished by decreasing the contents of the IV register by 1 and storing in the I1 register the contents of the IVth U register divided by the contents of the RS1 register increased by 1.

Control states S33 and S34:

During these control states the maximum allowable value for the contents of the I1 register is established.

Control states S35 and S36:

The minimum allowable value for the contents of the I1 register is established during these control states.

Control state S37:

The X key component for the input to the second through last processors is computed during this control state. The key component is then stored in the I2 register.

Control state S38:

During this control state a decision is made as to the next control state. When the contents of the I and LEVEL registers are equal, the next control state is S39. When, however, the contents of the I and LEVEL registers are not the same, time-pulse distributor logic circuitry 24 will reset S counter 26 to Control state S40.

Control state S39:

When the contents of the IU register is less than the contents of the LEVEL register, time-pulse distributor logic circuitry 24 advances S counter 26 to Control state S49. Otherwise, time-pulse distributor logic circuitry 24 advances S counter 26 to Control state S42.

Control state S40:

This control state is used as a transitional state so that SYNCRO logic circuitry 31 may operate switch 34 into the E position, thereby allowing the next clock pulse to be transferred to E counter 28, providing Control state E1 to time-pulse distributor logic circuitry 24. The operations of EXCUTE logic circuitry 33 will then be taken over by counter 28.

After the operations performed by EXCUTE logic circuitry 33 have been completed, switch 34 is again operated to the S position so that S counter 26 may again take over control of the system. When this operation occurs during Control states E21 or E30, and the original transfer was made during Control state S40, S counter 26 will be set to Control state S41 as the next state.

Control states S41 – S43:

During these control states the same operations take place which occurred during Control states S24 – S26. Thus, the operation during Control state S41 corresponds to the operation performed during Control state S24, the operation during Control state S42 corresponds to the operation performed during Control state S25, and the operation during Control state S43 corresponds to the operation performed during Control state S26.

Control state S44:

This control state is merely a joining state to which various future control states may return. At this point the next control state is merely advanced to by S counter 26.

Control state S45:

A decision is made during this control state based upon the equality of the contents of the I register with the contents of the LEVEL register. When the contents of the two registers are equal, S counter 26 merely advances to next control state S46. Otherwise, time-pulse distributor logic circuitry 24 resets S counter 26 to Control state S31.

Control state S46:

During this control state the ITEST register is examined to determine whether the system is in a training or an execution mode of operation. When the contents of the ITEST register is equal to a logical TRUE, S counter 26 advances to the next Control state S47 for operation of the system in a training mode. Otherwise, time-pulse distributor logic circuitry 24 resets S counter 26 to Control state S49 so that an execution cycle may take place.

Control state S47:

This control state is used as a transitional state so that SYNCRO logic circuitry 31 may operate switch 34 into the T position, thereby allowing the next clock pulse to be transferred to T counter 27 providing Control state T1 to time-pulse distributor logic circuitry 24. The operations of TREE logic circuitry 32 will then be taken over by counter 27.

After the operations performed by TREE logic circuitry 32 have been completed, switch 34 is again operated to the S position so that S counter 26 may again take over control of the system. When such operation occurs during Control states T18, T19 or T24, and the original transfer was made during Control state S47 S counter 26 will be set to Control state S48 as the next state.

Control state S48:

A LLEVEL register of memory 36 is set equal to 1 less than the present contents of the LEVEL register.

Control state S49:

This control state is used as a transitional state so that SYNCRO logic circuitry 31 may operate switch 34 into the E position, thereby allowing the next clock pulse to be transferred to E counter 28, providing Control state E1 to time-pulse distributor logic circuitry 24. The operations of EXCUTE logic circuitry 33 will then be taken over by counter 28.

After the operations performed by EXCUTE logic circuitry 33 have been completed, switch 34 is again operated to the S position so that S counter 26 may again take over control of the system. When this operation occurs during Control states E21 or E30, and the original transfer was made during Control state S49, S counter 26 will be set to Control state S50 as the next state.

Control states S50 – S52:

During these control states the same operations take place which occurred during Control states S24 – S26. Thus, the operation during Control state S50 corresponds to the operation performed during Control state S24, the operation during Control state S51 corresponds to the operation performed during Control state S25, and the operation during Control state S52 corresponds to the operation performed during Control state S26.

Control state S53:

The contents PXA, PXB, and PXC registers, utilized in the operation os MAIN logic circuitry 30 during Control states M86, M93 and M100, are computed during this control state for the IUth data point the contents of XA, XB and XC registers of memory 36.

In addition, the contents of the LLEVEL register is set equal to the contents of the LEVEL register.

Control state S54:

When during this control state, the contents of the IU indexing register is greater than 994, S counter 26 is allowed to continue advancing to Control state S55. Otherwise, time-pulse distributor logic circuitry 24 resets S counter 26 to Control state S21.

Control state S55:

The J indexing register is again initialized to a value of zero during this control state.

Control state S56:

The contents of the J register is increased by 1 during this control state.

Control state S57:

The Jth AMA, AMB and AMC registers are divided by 990 less the contents of the J register during this control state. The average output value over the sample interval is thereby generated. In addition, the Jth AM register is set equal to the contents of the J th AM register divided by 990 minus the contents of the J register. The average value of the near squared error over the entire sample interval is thereby generated.

Control state S58:

During this control state the contents of the J register is compared to the contents of the LLEVEL register. When the contents of the J register is greater than the contents of the LLEVEL register, S counter 26 continues to Control State S59. Otherwise, time-pulse distributor logic circuitry 24 resets S counter 26 to Control state S56 so that contents of the J indexing register may be advanced by 1 and the operation performed during Control state S57 repeated.

Control state S59:

The contents of the AMA, AMB and AMC registers may be displayed by the system during this control state.

Control state S60:

During this control state a transfer is made from operation of SYNCRO logic circuitry 31 to operation of MAIN logic circuitry 30. This is accomplished when switch 34 is transferred to the M position so that clock 35 may operate M counter 25 to Control state M69 on the next clock pulse.

Control state T1:

Control state T1 and the following T control states occur when switch 34 is operated in the T position allowing clock 35 to operate T counter 27. As may be noted, the operation of switch 34 to the T position occurred during Control states S15 or S47. When the T counter is thereby controlling time-pulse distributor logic circuitry 24, arithmetic and logic operations take place on TREE logic circuitry 32. TREE logic circuitry 32 is then utilized to train each of the processors as follows.

During this control state the direct address location in the root level of the tree for a given processor is recorded and stored in an L1 register of memory 36. This is accomplished by setting the L1 register equal to the contents of the Ith NLP register.

Control state T2:

The contents of the (L1 + I1)th ID register is compared to a value of zero during this control state. When such ID register is equal to zero, indicating that the direct address location has not been previously encountered, time-pulse distributor logic circuitry 24 resets T counter 27 to Control state T12. Otherwise, T counter 27 will advance to the next sequential Control state T3.

Control state T3:

During this control state the IDUM dummy register is set equal to the contents of the (I1 + L1)th ID register thereby establishing a dummy address for the direct address location of the processor.

Control state T4:

The contents of the IDUM register is compared to a value of 32,000 during this control state. When the contents of the IDUM register is less than 32,000, T counter 27 advances to Control state T5. Otherwise, time-pulse distributor logic circuitry 24 resets T counter 27 to Control state T6 to scale the contents of the IDUM register.

Control state T5:

During this control state the IDUM register is reset to a value which is equal to 31,090 less its present contents.

Control state T6:

The contents of the IDUMth ID register is compared to the contents of the I2 register to determine whether the X key component, presently stored in the I2 register, matches the VAL of an established node of the tree. When the contents of the two registers are equal, time-pulse distributor logic circuitry 24 resets T counter 27 to Control state T19. Otherwise, T counter 27 advances to the next Control state T7.

Control state T7:

During this control state the contents of an IDUMP register is set equal to the contents of the (IDUM + 1)th ID register thereby establishing a dummy address for the X component of the tree.

Control states T8 and T9:

The contents of the IDUMP register is now compared to a value of 32,000. When the contents of the IDUMP register is greater than the value of 32,000, the contents of such register must be scaled. Therefore, T counter 27 advances to Control state T9 where the IDUMP register is reset to a value of 31,000 less the present contents of the IDUMP register.

Now, whether the contents of the IDUMP register was found less than 32,000 during Control state T8 or whether it was reset to such a value during Control state T9, T counter 27 advances to Control state T10.

Control state T10:

The contents of the IDUMP register is now compared to the contents of the IDUM register to determine whether all locations of the leaf level (as linked together by their ADP's) have been searched for the given X key component. When the contents of the IDUMP register is less than or equal to the contents of the IDUM register, time-pulse distributor logic circuitry 24 resets T counter 27 to Control state T20. Otherwise, T counter 27 advances to the next control state T11 to allow continuance of the search.

Control state T11:

The IDUM register is set equal to the contents of the IDUMP register during this control state so the search of the leaf level may continue.

Control state T12:

An ICTT dummy register of memory 36 is set equal to the contents of the ICT register during this control state.

Control states T13 and T14:

The contents of the ICT register is now compared to a value of 32,000. When the contents of the ICT register is greater than the value of 32,000, the contents of such register must be scaled. Therefore, T counter 27 advances to Control state T14 where the ICT register is reset to a value of 31,090 less the present contents of the ICT register.

Now, whether the contents of the ICT register was found less then 32,000 during Control state T13 or whether it was reset to such a value during Control state T14, T counter 27 advances to Control state 15.

Control state T15:

This control state is reached when no node corresponding to the X key component of the present key function has been previously established in the leaf level of the tree. This is determined as a result of there having been no match of the contents of the I1 (I key component) and I2 (X key component) registers in the root and leaf levels of the tree, respectively. Therefore, during this control state a new node is grown in the leaf level of the tree, extending from the directly addressed register of the root level established by the I key component stored in the I1 register.

This is accomplished by setting (I1 + L1)th ID register equal to the contents of the ICT register, setting the ICTth ID register equal to the contents of the IZ register and setting the (ICT + 1)th ID register equal to the contents of the ICT register.

Control state T16:

The desired output corresponding to the key function of the present data point is now recorded in the newly grown leaf. This is accomplished by setting the (ICT + 2)th ID register equal to the contents of the IXA register, setting the (ICT + 3)th ID register to the IXB register and setting the (ICT + 4)th ID register equal to the contents of the IXC register.

The ICT counting register is then increased by 5 so that it will contain the next node number available for the next leaf node to be gown in the tree.

Control state T17:

The contents of the ICT register is now compared with the contents of the MXICT register. When the contents of the ICT register is greater than the contents of the MXICT register, indicating that the maximum storage of the tree has been exceeded, time-pulse distributor logic circuitry 24 resets T counter 27 to Control state T24 so that the ICEED logic register may be set equal to a logical FALSE. Otherwise, T counter 27 continues to Control state T18.

Control state T18:

During this control state the contents of the LEEF counting register is increased by 1, indicating that another leaf has been grown in the tree of the processor presently being operated upon. Operation of the system is then transferred back to SYNCRO logic circuitry 31 from TREE logic circuitry 32. This is accomplished when switch 34 is transferred to the S position so that clock 35 may operate S counter 26 to Control state S16 on the next clock pulse.

Control state T19:

When there has been a path already established in the tree corresponding to the present key function, having components I and X stored in the I1 and I2 registers, respectively, the counting registers of the leaf level must be updated. This is accomplished as follows: the contents of the IXA register is added to the contents of the (IDUM + 2)th ID register and the sum stored in the (IDUM + 2)th ID register; the contents of the IXB register is added to the present contents of the (IDUM + 3) th ID register and the sum restored in the (IDUM + 3)th ID )th and the contents of the IXC register is added to the present contents of the (IDUM +4)th ID register and the sum restored in the (IDUM + 4)th ID register.

A transfer is then made from operation of TREE logic circuitry 32 to operation of SYNCRO logic circuitry 31 by transferring switch 34 to the S position so that clock 35 may operate S counter 26 to generate Control state S16 on the next clock pulse.

Control state T20:

An ICTT dummy register of memory 36 is initially set equal to the present contents of the ICT register during this control state.

Control states T21 and T22:

The contents of the ICTT register is now compared to a value of 32,000. When the contents of the ICTT register is greater than the value of 32,000, the contents of such register must be scaled. Therefore, T counter 27 advances to Control state T22 where the ICTT register is reset to a value of 31,090 less the present contents of the ICTT register.

Now, whether the contents of the ICTT register was found less than 32,000 during Control state T21 or whether it was reset to such a value during Control state T22, T counter 27 advances to Control state T23.

Control state T23:

During this control state the ADP of the last node in the leaf level of the tree, extending in a path from the register in the directly addressable portion of memory array 29 at which a match for the I key component has been found, is set equal to the node address of the newly-established leaf of the same filial set. This is accomplished by setting the (IDUM + 1)th ID register equal to the contents of an ITT register of memory 36, setting the ICTth ID register equal to the contents of the I2 register and setting the (ICT + 1)th ID register equal to the contents of the IDUMP dummy register.

Time-pulse distributor logic circuitry 24 then resets T counter 27 to Control state T16 for further operation of the system as indicated above with respect to Control state T16.

Control state E1:

During this control state a K indexing register of memory 36 is initialized to a value of 1.

Control state E2:

The I indexing register is again initialized during this control state to a value equal to the contents of the Jth NLP register to determine the direct address location in the root level of the tree.

Control state E3:

During this control state a IZAP register of memory 36 is initialized to a value of 1.

Control state E4:

During this control state the (I + I1)th ID register of memory 36 is compared to a value of zero. This determines whether any non-zero memory locations have been introduced into the direct address location of the root level of the tree during training, indicating that there is a leaf level extending therefrom. When there is such a leaf level, E counter 28 merely advances to the next control state E5. Otherwise, when no leaf level extends from such direct address memory location, time-pulse distributor logic circuitry 24 resets E counter 28 to Control state E11.

Control state E5:

An IDUM dummy register of memory 36 is set equal to the contents of the (I+I1)th ID register.

Control state E6:

The contents of the IDUMth Id register is examined during this control state, and when its contents is equal to the contents of the I2 register, time-pulse distributor logic circuitry 24 resets E counter 28 to Control state E20. Otherwise, E counter 28 merely advances to the next Control state E7.

Control state E7:

During this control state an IDUMY dummy register of memory 36 is set equal to the contents of the (IDUM + 1)th ID REGISTER.

Control state E8:

During this control state the contents of the IDUMY register is compared with the contents of the IDUM register to determine whether or not all possible nodes in the leaf level of the tree have been tested to establish a match for the X key component. When the contents of the IDUMY register is greater than the contents of the IDUM register, all nodes have not been examined and E counter 28 advances to the next Control state E9. Otherwise, time-pulse distributor logic circuitry 24 resets E counter to Control state E22.

Control state E9:

The contents of the K indexing register is increased by 1 during this control state.

Control state E10:

During this control state the IDUM register is set equal to the contents of the IDUMY register, thereby establishing a location to be tested for a match with the X key component.

Control states E11 and E12:

A test procedure is established during these control states based on the contents of the IZAP register (which is either 1, 2 or 3). Thus, during Control state E11 the contents of the IZAP register is compared with a value of 1. When such contents equal a value of 1, the contents of the I1 register is compared with the contents of the MQUANT register divided by 2 during Control state E12 to determine whether the contents of the I1 register is greater than or equal to the contents of the MQUANT register divided by 2. When it is greater, E counter 28 is reset by time-pulse distributor circuitry 24 to Control state E17. Otherwise, E counter 28 merely advances to Control state E13.

Control state E13:

During this control state the contents of the I1 indexing register is increased by 1.

Control state E14:

The contents of the I1 register is again compared to the contents of the MQUANT register during this control state. When the contents of the I1 register is greater than the contents of the MQUANT register, time-pulse distributor logic circuitry 24 resets E counter 28 to Control state E31. Otherwise E counter 28 advances to Control state E15.

Control state E15:

The contents of the IZAP register is set equal to 2 during this control state.

Control state E16:

During this control state the contents of the IZAP register is compared to a value of 2. When the contents of the IZAP register is equal to 2, time-pulse distributor logic circuitry 24 resets E counter 28 to Control state E13. Otherwise, E counter 28 merely advances to Control state E17.

Control state E17:

During this control state the contents of the I1 register is decreased by a value of 1.

Control state E18:

The contents of the I1 register is compared to a value of 1 during this control state. When the contents of the I1 register is less than the value of 1, time-pulse distributor logic circuitry 24 resets E counter 28 to Control state E31. Otherwise, E counter 28 advances to the next Control state E19.

Control state E19:

The contents of the IZAP register is set equal to a value of 3 during this control state.

Control state E20:

When there has been a match for both key components, I and X, presently stored in the I1 and I2 registers, respectively, an output is computed during this control state, and the JTRN counting register is increased by 1. The output is computed as follows: the contents of the (IDUM + 2)th ID register is inserted into an A register of memory 36; the contents of the (IDUM + 3)th ID register is inserted into a B register of memory 36; and the contents of the (IDUM + 4)th ID register is inserted into a C register of memory 36. The contents of the A, B and C registers are then added together and the sum stored in an S register of memory 36.

The contents of the A, B and C registers are then each divided by the contents of the S register and the quotients stored in the XA, XB and XC registers, respectively.

Control state E21:

During this control state a transfer is made from operation of EXCUTE logic circuitry 33 to operation of SYNCRO logic circuitry 31. This is accomplished when switch 34 is transferred to the S position so that clock 35 may operate S counter 26 to Control state S18, S24, S41 or S50 on the next clock pulse, depending upon the control state from which EXCUTE logic circuitry 33 was entered.

Control state E22:

During this control state a MAX register of memory 36 is initialized to a value of zero.

Control state E23:

During this control state the I indexing register is again initialized to a value of zero.

Control state E24:

The I indexing register is increased by 1 during this control state.

Control state E25:

During this control state the frequency of events stored in the leaf level of the tree is computed and stored in the S register. This is accomplished by inserting the contents of the (IDUM + 2)th ID register into the A register, inserting the contents of the (IDUM + 3th ID register into the B register, and inserting the contents of the (IDUM + 4)th ID register into the C register. The contents of the A, B and C registers are then added together and the sum stored in the S register.

Control state E26:

The frequency of events, now stored in the S register, is compared with the contents of the MAX register. When the contents of the S register is less than or equal to the contents of the MAX register, time-pulse distributor logic circuitry 24 resets E counter 28 to Control state E28. Otherwise, E counter 28 merely advances to the next Control state E27.

Control state E27:

During this control state the output variables are computed. Thus, the contents of the A, B and C registers are each divided by the contents of the S registers and the quotients stored in the XA, XB and XC registers, respectively.

In addition, the MAX register is set equal to the contents of the S register.

Control state E28:

The contents of the I indexing register is compared with the contents of the K indexing register during this control state. When the contents of the I register is greater than the contents of the K register, E counter 28 advances to the next Control state E29. Otherwise, time-pulse distributor logic circuitry 24 resets E counter 28 to Control state E24 so that the contents of the I indexing register may be increased by 1 and the operations performed during Control state E25 repeated for the next data point.

Control state E29:

During this control state the contents of the JUNTR counting register is increased by 1.

Control state E30:

During this control state a transfer is made from operation of EXCUTE logic circuitry 33 to operation of SYNCRO logic circuitry 31. This is accomplished when switch 34 is transferred to the S position so that clock 35 may operate S counter 26 to Control state S18, S24, S41 or S50 on the next clock pulse, depending upon the control state from which EXCUTE logic circuitry 33 was entered.

As previously discussed, a general-purpose digital computer may be regarded as a storeroom of electrical parts and when properly programmed, becomes a special purpose digital computer or special electrical circuit. The FORTRAN IV program of TABLES II*a–d* carries out essentially the same operations in a general-purpose digital computer having a compatible FORTRAN IV compiler as the operations (represented by the flow chart of FIG. 16) described above with reference to the special-purpose system of FIG. 17. TABLES III*a–d* are cross-reference charts indicating which FORTRAN statements in the program correspond to which control states of the flow chart and special-purpose system operation.

The purpose of the following additional program statements should be noted with respect to TABLES II*a–d* and III*a–d*. In the MAIN program of TABLE II*a*, Statements 1–6 are utilized for the requesting of storage space for various variables used in the program. Statement 7 is a list of the data in the order in which it will be read into the computer. Statement 8 requests storage for the logical variables ITEST and ICEED. Statements 9–17 are common statements which connect the MAIN program to the SYNCRO subroutine. In the SYNCRO program of TABLE II*b*, Statement 1 defines the subroutine. Statements 2–5 request storage space for various of the variables used in the subroutine. Statement 6 is a request for storage space for logical variables ITEST and ICEED. Statements 7–12 are common statements connecting the SYNCRO subroutine to the MAIN program and to the TREE and EXCUTE subroutines. In the TREE subroutine of TABLE II*c*, Statement 1 defines the TREE subroutine. Statements 2 and 3 request storage space for various variables utilized in the subroutines. Statements 4–7 are common connections between the TREE subroutine and the SYNCRO subroutine. In the EXCUTE subroutine of TABLE II*d* Statement 1 defines the subroutine. Statement 2 requests storage for various variables utilized in the EXCUTE subroutine. Statements 3–6 are common statements which connect the EXCUTE subroutine to the SYNCRO subroutine.

Several embodiments of the cascaded processor system of the invention have now been described in detail. It is to be noted, however, that these descriptions of specific embodiments are merely illustrative of the principles underlying the inventive concept. It is contemplated that various modifications of the disclosed embodiments, as well as other embodiments of the invention, will, without departing from the spirit and scope of the invention, be apparent to persons skilled in the art.

TABLE IIa

```
FORTRAN IV G LEVEL 1, MOD 3           MAIN

0001              INTEGER*2 ID(40000),NLP(8)
0002              DATA ID/40000*0/
0003              DIMENSION P1(1000),P2(1000)
0004              DIMENSION NR(30)
0005              DIMENSION U(3600),AVE(1000),ZERO(1000),PXA(1000),PXB(1000),
                 PXC(10100)
0006              INTEGER*2 IN(3600)
0007              DATA NR/1,11,23,2,12,24,3,13,23,4,14,24,5,11,25,6,16,25,
                 9,19,29,110,20,30,7,17,27,8,18,28/
0008              LOGICAL*4 ITEST,ICEED
0009              COMMON/LEEF/LEEF
0010              COMMON/TRAIN/JUNTR,JTRN
0011              COMMON/ICT/ICT,IXA,IXB,IXC,LEVEL,LEVELS
0012              COMMON/X/XA,XB,XC
0013              COMMON/TEST/ ITEST,ICEED
0014              COMMON/RS/RS1,RS2,RS3,RS4
0015              COMMON/MXICT/MXICT
0016              COMMON/MQUANT/MQUANT
0017              COMMON/JK/JK
0018              ITEST=.TRUE.
0019              ICEED=.TRUE.
            C
            C     INITIALIZE PARAMETERS
            C
0020              UMAX=0
0021              IEXEC=6
0022              LEVEL=1
0023              LEVELS=5
0024              LEEF=0
            C
            C     RSI QUANT U    RSII QUANT AVE    RSIII QUANT ZERO    RSIV
            C          QUANT X FEEDBACK    ALL MINUS EPSOLINE
            C
0025              RS1=.099
0026              RS2=.099
0027              RS3=.099
0028              RS4=.099
0029              MQUANT=2./RS1
            C
            C     INITIALIZE FIRST LEVELS
            C
0030              J=2./RS1
0031              NLP(1)=0
0032              JLEV=LEVELS
0033              DO 2 I=2,JLEV
0034            2 NLP(I)=NLP(I-1)+J
0035              ICT=NLP(I)+J+1
            C
            C     CHANGE LEVEL NUMBER IN FORMAT
            C
0036              MXICT=39990
0037              IK=0
```

```
   50 CONTINUE
      LEEFE=0
      NREC=0
      VM=1.7
      SCALE=VM/2048.
      IK=0
   40 CONTINUE
      LEEFE=0
      JTRE=0
      JUNTR=0
      IK=IK+1
      NEXT=NR(IK)
      NSKIP=NEXT-NREC-1
      IF(NSKIP) 3,4,5
    3 NSKIP=-NSKIP
      DO 6 I=1,NSKIP
      BACKSPACE 10
    6 NREC=NREC-1
      GO TO 4
    5 DO 7 I=1,NSKIP
      READ(10,1001) IN
 1001 FORMAT(36(100A2))
    7 NREC=NREC+1
    4 READ(10,1001) IN
      NREC=NREC+1
      DO 801 J=1,3600
      U(J)=IN(J)*SCALE-VM
      IF(U(J).LT.-VM) U(J)=-VM
      IF(U(J).GT.VM) U(J)=VM
  801 CONTINUE
      L=0
   60 L=L+1
      IF(U(L).GE.0.15) GO TO 61
      IF(L.GE.3600) GO TO 40
      GO TO 60
   61 UMAX=0.0
      LT=L+999
      DO 1 I=L,LT
      UABS=ABS(U(I))
      IF(UABS.GT.UMAX) UMAX=UABS
    1 CONTINUE
      DO 9 I=1,1000
    9 U(I)=U(I+L-1)/UMAX+1
      IF(NR(IK).GE.1.AND.NR(IK).LE.10) GO TO 20
      IF(NR(IK).GE.11.AND.NR(IK).LE.20) GO TO 21
      IF(NR(IK).GE.21.AND.NR(IK).LE.30) GO TO 22
   20 IXA=1
      IXB=0
      IXC=0
      JK=1
      GO TO 24
   21 IXA=0
      IXB=1
```

```
                IXC=0
                JK=2
                GO TO 24
           22   IXA=0
                IXB=0
                IXC=1
                JK=3
           24   DO 299 I=1,1000
                IF(I.GT.2) GO TO 277
                AVE(I)=0.
                ZERO(I)=0.
                GO TO 299
          277   IF(I.GT.12) GO TO 288
                W=I
                AVE(I)=(AVE(I-1)*(W-3.)+U(I))/(W-2.)
                W1=0
                DO 279 J=3,I
                IF((U(J)-1.)*(U(J-1)-1.)) 278,278,279
          278   W1=W1+1
          279   CONTINUE
                ZERO(I)=W1/I
                GO TO 299
          288   AVE(I)=(AVE(I-1)*10.-U(I-11)+U(I))/10.
                W1=0
                K=I-10
                DO 289 J=K,I
                IF((U(J)-1.)*(U(J-1)-1.)) 291,291,289
          291   W1=W1+1
          289   CONTINUE
                ZERO(I)=W1/10.
          299   CONTINUE
                DO 298 I=1,1000
          298   AVE(I)=AVE(I)+1
                CALL SYNCRO (U,AVE,ID,ZERO,NLP,PXA,PXB,PXC)
                IF(.NOT.ITEST) GO TO 300
                IF(ICEED) GO TO 800
                LEVELS=LEVELS-1
                GO TO 120
          800   CONTINUE
                WRITE(6,1100) LEVEL,ICT,LEEF
         1100   FORMAT(1X,' LEVEL ',I5,' ICT ',I10,' LEAVES ',I10)
                LEEFE=LEEFE+LEEF
     C
     C          TRAINING CYCLE
     C
                IF(IK.GE.21) GO TO 240
                WRITE(6,9999) IK
         9999   FORMAT(1X,'  IK  ',I4)
                GO TO 40
          240   IF(LEVEL.GE.LEVELS) GO TO 120
                LEVEL=LEVEL+1
                LEEF=0
```

```
            IK=0
            GO TO 40
      C
      C     FINISH
      C
        120 ITEST=.FALSE.
            IK=IEXEC
            WRITE(6,603) LEEFE
        603 FORMAT(1X,' FINISH CALLED '.I6,' TOTAL NUMBER OF LEAVES')
            GO TO 40
        300 CONTINUE
       1002 FORMAT(1X,' THERE IS',I5,' UNTRAINED',I5,'TRAINED POINTS IN
           SET')
            WRITE(6,1002) JUNTR,JTRN
            WRITE(6,301) IXA,IXB,IXC,NR(IK),LEVEL,LEVELS
        301 FORMAT(1X,' WORD OUT AND NUMBER',4I5,' LEVEL AND LEVELS',2I4)
            K=999-LEVELS
            B1=0.
            B2=0.
            GO TO (310,311,312),JK
        310 DO 314 J=LEVEL,K
            P1(J)=PXA(J)-PXB(J)
            P2(J)=PXA(J)-PXC(J)
            IF(J.LT.LEVELS.AND.J.GT.990) GO TO 314
            B1=B1+P1(J)
            B2=B2+P2(J)
        314 CONTINUE
            GO TO 313
        311 DO 315 J=LEVEL,K
            P1(J)=PXB(J)-PXA(J)
            P2(J)=PXB(J)-PXC(J)
            IF(J.LT.LEVELS.AND.J.GT.990) GO TO 315
            B1=B1+P1(J)
            B2=B2+P2(J)
        315 CONTINUE
            GO TO 313
        312 DO 316 J=LEVEL,K
            P1(J)=PXC(J)-PXA(J)
            P2(J)=PXC(J)-PXB(J)
            IF(J.LT.LEVELS.AND.J.GT.990) GO TO 316
            B1=B1+P1(J)
            B2=B2+P2(J)
        316 CONTINUE
        313 WRITE(6,302)(P1(I),P2(I),I=1,K)
        302 FORMAT(1X,2F8.4,5X,2F8.4,5X,2F8.4,5X,2F8.4,5X,2F8.4)
            WRITE(6,303) B1,B2
        303 FORMAT(1X,'  SUM DIFFERENCE     ',2F10.4)
            IF(IK.GE.30) GO TO 600
            GO TO 40
        600 STOP
            END
```

TABLE IIb

```
FORTRAN IV G LEVEL 1, MOD 3          SYNCRO

            SUBROUTINE SYNCRO(U,AVE,ID,ZERO,NLP,PXA,PXB,PXC)
            DIMENSION U(1000),AVE(1000),ZERO(1000),PXA( 1000 ),PXB(1000),
           1PXC(1000)
            INTEGER*2 ID(1),NLP(1)
            DIMENSION AMSE(8),AM(8)
            DIMENSION AMA(8),AMB(8),AMC(8)
            LOGICAL*4 ITEST,ICEED
            COMMON/TRAIN/JUNTR,JTRN
            COMMON/ICT/ICT,IXA,IXB,IXC,LEVEL,LEVELS
            COMMON/X/XA,XB,XC
            COMMON/TEST/ ITEST,ICEED
            COMMON/RS/ RS1,RS2,RS3,RS4
            COMMON/JK/JK
            GO TO (60,65,70),JK
         60 YA=1.
            YB=0.
            YC=0.
            GO TO 75
         65 YA=.0
            YB=1.
            YC=0.
            GO TO 75
         70 YA=.0
            YB=0.
            YC=1.
         75 CONTINUE
            DO 80 L=1,LEVELS
            AMA(L)=0.
            AMB(L)=0.
            AMC(L)=0.
         80 AM(L)=0.
      C
      C     FIRST LEVEL TEST
      C
            IF(LEVEL.GT.1) GO TO 15
            DO 10 IU=5,994
            I1=U(IU)/RS1+1.
            I21=AVE(IU)/RS2
            I22=ZERO(IU)/RS3
            IRS2=2./RS2
            I2=I21+IRS2*(I22+1)
            IF(.NOT.ITEST) GO TO 5
            CALL TREE(I,I1,I2,ID,NLP)
            GO TO 10
          5 CALL EXCUTE(I,I1,I2,ID,NLP)
            PXA(IU)=XA
            PXB(IU)=XB
            PXC(IU)=XC
         10 CONTINUE
            RETURN
```

```
FORTRAN IV G LEVEL 1, MOD 3          SYNCRO

      C
      C     FIRST LEVEL TEST  LEVEL GREATER THAN ONE
      C
         15 DO 35 IU=5,994
            I1=U(IU)/RS1+1.
            I21=AVE(IU)/RS2
            I22=ZERO(IU)/RS3
            IRS2=2./RS2
            I2=I21+IRS2*(I22+1)
            CALL EXCUTE(1,I1,I2,ID,NLP)
            IF(IU.GT.990) GO TO 650
            AMSE(1)=(XA-YA)**2+(XB-YB)**2+(XC-YC)**2
            AMA(1)=AMA(1)+XA
            AMB(1)=AMB(1)+XB
            AMC(1)=AMC(1)+XC
            AM(1)=AM(1)+AMSE(1)
        650 CONTINUE
            IZED=IU-1
            IF(IZED.LT.1) GO TO 35
            IV=IU
            DO 20 I=2,LEVEL
            IV=IV-1
            I1=6.*(U(IV+1)-U(IV)) /RS1+10.
            IF(I1.GE.MQUANT) I1=MQUANT
            IF(I1.LE.1) I1=1
            F=I
            I21=XA/RS4
            I22=XB/RS4
            IRS2=1./RS4+1
            I2=I21+IRS2*(I22+1)
            IF(I-LEVEL.EQ.0.OR.IU.LT.LEVEL) GO TO 25
            CALL EXCUTE(I,I1,I2,ID,NLP)
            IF(IU.GT.990) GO TO 660
            AMSE(I)=(XA-YA)**2+(XB-YB)**2+(XC-YC)**2
            AM(I)=AM(I)+AMSE(I)
            AMA(I)=AMA(I)+XA
            AMB(I)=AMB(I)+XB
            AMC(I)=AMC(I)+XC
        660 CONTINUE
         20 CONTINUE
         25 IF(.NOT.ITEST) GO TO 30
            IF(.NOT.ITEST) GO TO 30
            CALL TREE(LEVEL,I1,I2,ID,NLP)
            LLEVEL=LEVEL-1
            GO TO 35
         30 CALL EXCUTE(LEVEL,I1,I2,ID,NLP)
            IF(IU.GT.990) GO TO 670
            AMSE(I)=(XA-YA)**2+(XB-YB)**2+(XC-YC)**2
            AM(I)=AM(I)+AMSE(I)
            AMA(I)=AMA(I)+XA
```

FORTRAN IV G LEVEL 1, MOD 3 SYNCRO

```
             AMB(I)=AMB(I)+XB
             AMC(I)=AMC(I)+XC
         670 CONTINUE
             PXA(IU)=XA
             PXB(IU)=XB
             PXC(IU)=XC
             LLEVEL=LEVEL
          35 CONTINUE
             DO 690 J=1,LLEVEL
             AMA(J)=AMA(J)/(990-J)
             AMB(J)=AMB(J)/(990-J)
             AMC(J)=AMC(J)/(990-J)
         690 AM(J)=AM(J)/(990-J)
             WRITE(6,701) YA,YB,YC
         701 FORMAT(1X,'  EXPECTED OUTPUT   ',3F4.1)
             WRITE(6,700)(AMA(I),AMB(I),AMC(I),AMSE(I),I,I=1,LLEVEL)
         700 FORMAT(1X,' MEAN  MSE ',3F8.4,F10.7,' LEVEL ',I3)
             RETURN
             END
```

TABLE IIc

FORTRAN IV G LEVEL 1, MOD 3 TREE

```
             SUBROUTINE TREE (I,I1,I2,ID,NLP)
             INTEGER*2 ID(1),NLP(1)
             LOGICAL*4 ITEST,ICEED
             COMMON/LEEF/LEEF
             COMMON/MXICT/MXICT
             COMMON/ICT/ICT,IXA,IXB,IXC,LEVEL,LEVELS
             COMMON/TEST/ ITEST,ICEED
             L1=NLP(I)
             IF(ID(L1+I1).EQ.0) GO TO 25
             IDUM=ID(I1+L1)
             IF(IDUM.LT.0) IDUM=32000-IDUM-10
           5 IF(ID(IDUM).EQ.I2) GO TO 35
             IDUMP=ID(IDUM+1)
             IF(IDUMP.LT.0) IDUMP=32000-IDUMP-10
             IF(IDUMP.LE.IDUM) GO TO 40
             IDUM=IDUMP
             GO TO 5
C
C            GROW
C
          25 ICTT=ICT
             IF(ICT.GE.32000) ICT=32000-ICT-10
             ID(I1+L1)=ICT
             ID(ICTT)=I2
             ID(ICTT+1)=ICT
          30 ID(ICTT+2)=IXA
             ID(ICTT+3)=IXB
             ID(ICTT+4)=IXC
             ICT=ICTT+5
             IF(ICT.GT.MXICT) GO TO 50
             LEEF=LEEF+1
             RETURN
C
C            UPDATE
C
```

TABLE IIc – Continued

```
   35 ID(IDUM+2)=IXA+ID(IDUM+2)
      ID(IDUM+3)=IXB+ID(IDUM+3)
      ID(IDUM+4)=IXC+ID(IDUM+4)
      RETURN
C
C     ADD
C
   40 ICT1=ICT
      IF(ICT.GE.32000) ICT=32000-ICT-10
      ID(IDUM+1)=ICT
      ID(ICT1)=I2
      ID(ICT1+1)=IDUMP
      GO TO 30
C
C     OVERFLOW
C
   50 CONTINUE
      ICEED=.FALSE.
FORTRAN IV G LEVEL 1, MOD 3          TREE

      WRITE(6,60)
   60 FORMAT(1X,' EXCEEDED DIMENSION OF MXICT ARRAY ')
      RETURN
      END
```

TABLE IId

```
FORTRAN IV G LEVEL 1, MOD 3          EXCUTE

      SUBROUTINE EXCUTE (J,I1,I2,ID,NLP)
      INTEGER*2 ID(1),NLP(1)
      COMMON/ICT/ICT,IXA,IXB,IXC,LEVEL,LEVELS
      COMMON/X/XA,XB,XC
      COMMON/TRAIN/JUNTR,JTRN
      COMMON/MQUANT/MQUANT
      K=1
      I=NLP(J)
      IZAP=1
    1 IF(ID(I+I1).EQ.0) GO TO 10
      IDUM=ID(I+I1)
    5 IF(I2.EQ.ID(IDUM)) GO TO 20
      IDUMY=ID(IDUM+1)
      IF(IDUMY.LE.IDUM) GO TO 25
      K=K+1
      IDUM=IDUMY
      GO TO 5
C
C     UNTRAINED AT LEVEL ONE
C
   10 GO TO (111,112,15),IZAP
  111 IF(I1.GE.MQUANT/2) GO TO 15
  112 I1=I1+1
      IF(I1.GT.MQUANT) GO TO 35
      IZAP=2
      GO TO 1
   15 I1=I1-1
      IF(I1.LT.1) GO TO 35
      IZAP=3
      GO TO 1
```

TABLE IId – Continued

```
          C
          C      MATCH
          C
0028          20 A=ID(IDUM+2)
0029             B=ID(IDUM+3)
0030             C=ID(IDUM+4)
0031             S = A+B+C
0032             XA=A/S
0033             XB=B/S
0034             XC=C/S
0035             JTRN=JTRN+1
0036             RETURN
          C
          C      UNTRAINED AT LEVEL TWO MAX FREQ USED
          C
0037          25 MAX=0.
0038             DO 30 I=1,K
0039             A=ID(IDUM+2)
0040             B=ID(IDUM+3)
0041             C=ID(IDUM+4)
0042             S=A+B+C
0043             IF(S.LE.MAX) GO TO 30
0044             XA=A/S
0045             XB=B/S
FORTRAN IV G LEVEL 1, MOD 3          EXCUTE

0046             XC=C/S
0047             MAX=S
0048          30 CONTINUE
0049             JUNTR=JUNTR+1
0050             RETURN
0051          35 CONTINUE
0052             WRITE(6,40)
0053          40 FORMAT(1X,' ENDED DUE TO INSIFICIANT LEVEL ONE')
0054             STOP
0055             END
```

TABLE IIIa

MAIN

| PROGRAM LINE | CONTROL STATE | PROGRAM LINE | CONTROL STATE |
|---|---|---|---|
| 0001... | | 0017... | |
| 0002... | | 0018... | M1 |
| 0003... | | 0019... | |
| 0004... | | 0020... | |
| 0005... | | 0021... | |
| 0006... | | 0022... | |
| 0007... | | 0023... | |
| 0008... | | 0024... | |
| 0009... | | 0025... | M2 |
| 0010... | | 0026... | |
| 0011... | | 0027... | |
| 0012... | | 0028... | |
| 0013... | | 0029... | |
| 0014... | | 0030... | |
| 0015... | | 0031... | |
| 0016... | | 0032... | M3 |

TABLE IIIa – Continued

MAIN

| PROGRAM LINE | CONTROL STATE |
|---|---|
| 0033... | M4 - M5 |
| 0034... | M6 - M7 |
| 0035... | |
| 0036... | |
| 0037... | |
| 0038... | |
| 0039... | M8 |
| 0040... | |
| 0041... | |
| 0042... | |
| 0043... | |
| 0044... | M9 |
| 0045... | |
| 0046... | |
| 0047... | M10 |
| 0048... | |
| 0049... | |
| 0050... | |
| 0051... | |
| 0052... | |
| 0053... | |
| 0054... | |
| 0055... | |
| 0056... | M11 |
| 0057... | |
| 0058... | |
| 0059... | |
| 0060... | |
| 0061... | |
| 0062... | |
| 0063... | M12 - M13 |
| 0064... | M14 |
| 0065... | M15 - M16 |
| 0066... | M17 - M18 |
| 0067... | M19 |
| 0068... | M20 |
| 0069... | M21 |
| 0070... | M22 |
| 0071... | M23 |
| 0072... | |
| 0073... | M24 |
| 0074... | |
| 0075... | M25 - M26 |
| 0076... | M27 |
| 0077... | M28 - M29 |
| 0078... | M30 |
| 0079... | M31 - M32 |
| 0080... | M33 - M34 |
| 0081... | M35 - M36 |
| 0082... | M37 - M38 |
| 0083... | M39 |
| 0084... | |
| 0085... | |
| 0086... | M40 |
| 0087... | |
| 0088... | |

| PROGRAM LINE | CONTROL STATE |
|---|---|
| 0089... | |
| 0090... | |
| 0091... | M41 |
| 0092... | |
| 0093... | |
| 0094... | |
| 0095... | M42 |
| 0096... | |
| 0097... | |
| 0098... | M43 - M44 |
| 0099... | M45 |
| 0100... | |
| 0101... | M46 |
| 0102... | |
| 0103... | M47 |
| 0104... | |
| 0105... | M48 |
| 0106... | |
| 0107... | M49 - M50 |
| 0108... | M51 |
| 0109... | M52 |
| 0110... | M53 |
| 0111... | M54 |
| 0112... | |
| 0113... | M55 |
| 0114... | M56 |
| 0115... | |
| 0116... | M57 - M58 |
| 0117... | M59 |
| 0118... | M60 |
| 0119... | M61 |
| 0120... | M62 |
| 0121... | M63 |
| 0122... | M64 - M65 |
| 0123... | M66 - M67 |
| 0124... | M68 |
| 0125... | M69 |
| 0126... | M70 |
| 0127... | M71 |
| 0128... | |
| 0129... | |
| 0130... | M72 |
| 0131... | |
| 0132... | M73 |
| 0133... | M74 |
| 0134... | |
| 0135... | M75 |
| 0136... | |
| 0137... | M76 |
| 0138... | |
| 0139... | |
| 0140... | M77 |
| 0141... | |
| 0142... | M78 |
| 0143... | |

TABLE IIIa - Continued

MAIN

| PROGRAM LINE | CONTROL STATE |
|---|---|
| 0144... 0145... 0146... | M79 |
| 0147... 0148... 0149... 0150... 0151... | M80 |
| 0152... 0153... 0154... | M81 |
| 0155... | M82 - M83 |
| 0156... | M84 - M85 |
| 0157... 0158... | M86 |
| 0159... | M87 - M88 |
| 0160... 0161... | M89 |
| 0162... 0163... | M90 |
| 0164... | M91 - M92 |
| 0165... 0166... | M93 |
| 0167... | M94 - M95 |
| 0168... 0169... | M96 |
| 0170... 0171... | M97 |
| 0172... | M98 - M99 |
| 0173... 0174... | M100 |
| 0175... | M101 - M102 |
| 0176... 0177... | M103 |
| 0178... | M104 |
| 0179... 0180... 0181... 0182... | M105 |
| 0183... 0184... | M106 |
| 0185... 0186... | M107 |

TABLE IIIb

SYNCRO

| PROGRAM LINE | CONTROL STATE |
|---|---|
| 0001... | |
| 0002... | |
| 0003... | |
| 0004... | |
| 0005... | |
| 0006... | |
| 0007... | |
| 0008... | |
| 0009... | |
| 0010... | |
| 0011... | |
| 0012... | |
| 0013... | S1 - S2 |
| 0014... 0015... 0016... 0017... | S3 |
| 0018... 0019... 0020... 0021... | S4 |
| 0022... 0023... 0024... 0025... | S5 |
| 0026... | S6 - S7 |
| 0027... 0028... 0029... 0030... | S8 - S9 |
| 0031... | S10 |
| 0032... | S11 - S12 |
| 0033... 0034... 0035... 0036... 0037... | S13 |
| 0038... | S14 |
| 0039... | S15 |
| 0040... | S16 |
| 0041... | S17 |
| 0042... 0043... 0044... 0045... | S18 |
| 0046... | S19 |
| 0047... | S20 - S21 |
| 0048... 0049... 0050... 0051... 0052... | S22 |

TABLE IIIb Continued

SYNCRO

| PROGRAM LINE | CONTROL STATE |
|---|---|
| 0053... | S23 |
| 0054... | S24 |
| 0055... | S25 |
| 0056...<br>0057...<br>0058...<br>0059... | S26 |
| 0060...<br>0061... | S27 |
| 0062... | S28 |
| 0063... | S29 |
| 0064... | S30 - S31 |
| 0065...<br>0066... | S32 |
| 0067... | S33 - S34 |
| 0068... | S35 - S36 |
| 0069...<br>0070...<br>0071...<br>0072...<br>0073... | S37 |
| 0074... | S38 - S39 |
| 0075... | S40 |
| 0076... | S41 |
| 0077... | S42 |
| 0078...<br>0079...<br>0080...<br>0081... | S43 |
| 0082... | S44 |
| 0083... | S45 |
| 0084...<br>0085... | S46 |
| 0086... | S47 |
| 0087...<br>0088... | S48 |
| 0089... | S49 |
| 0090... | S50 |
| 0091... | S51 |
| 0092...<br>0093...<br>0094...<br>0095... | S52 |
| 0096...<br>0097...<br>0098...<br>0099...<br>0100... | S53 |
| 0101... | S54 |
| 0102... | S55 - S56 |
| 0103...<br>0104...<br>0105... | S57 |
| 0106... | S57 - S58 |
| 0107...<br>0108...<br>0109...<br>0110... | S59 |
| 0111...<br>0112... | S60 |

TABLE IIIc

TREE

| PROGRAM LINE | CONTROL STATE |
|---|---|
| 0001... | |
| 0002... | |
| 0003... | |
| 0004... | |
| 0005... | |
| 0006... | |
| 0007... | |
| 0008... | T1 |
| 0009... | T2 |
| 0010... | T3 |
| 0011... | T4 - T5 |
| 0012... | T6 |
| 0013... | T7 |
| 0014... | T8 - T9 |
| 0015... | T10 |
| 0016...<br>0017... | T11 |
| 0018... | T12 |
| 0019... | T13 - T14 |
| 0020...<br>0021...<br>0022... | T15 |
| 0023...<br>0024...<br>0025...<br>0026... | T16 |
| 0027... | T17 |
| 0028...<br>0029... | T18 |

TABLE IIIc Continued

TREE

| PROGRAM LINE | CONTROL STATE |
|---|---|
| 0030... | |
| 0031... | T19 |
| 0032... | |
| 0033... | |
| 0034... | T20 |
| 0035... | T21 - T22 |

| PROGRAM LINE | CONTROL STATE |
|---|---|
| 0036... | |
| 0037... | T23 |
| 0038... | |
| 0039... | |
| 0040... | |
| 0041... | |
| 0042... | T24 |
| 0043... | |
| 0044... | |
| 0045... | |

TABLE IIId

EXCUTE

| PROGRAM LINE | CONTROL STATE |
|---|---|
| 0001... | |
| 0002... | |
| 0003... | |
| 0004... | |
| 0005... | |
| 0006... | |
| 0007... | E1 |
| 0008... | E2 |
| 0009... | E3 |
| 0010... | E4 |
| 0011... | E5 |
| 0012... | E6 |
| 0013... | E7 |
| 0014... | E8 |
| 0015... | E9 |
| 0016... | E10 |
| 0017... | |
| 0018... | E11 - E12 |
| 0019... | E13 |
| 0020... | E14 |
| 0021... | E15 |
| 0022... | E16 |
| 0023... | |
| 0024... | E17 |
| 0025... | E18 |
| 0026... | E19 |
| 0027... | |

| PROGRAM LINE | CONTROL STATE |
|---|---|
| 0028... | |
| 0029... | |
| 0030... | |
| 0031... | E20 |
| 0032... | |
| 0033... | |
| 0034... | |
| 0035... | |
| 0036... | E21 |
| 0037... | E22 |
| 0038... | E23 - E24 |
| 0039... | |
| 0040... | E25 |
| 0041... | |
| 0042... | |
| 0043... | E26 |
| 0044... | |
| 0045... | E27 |
| 0046... | |
| 0047... | |
| 0048... | E28 |
| 0049... | E29 |
| 0050... | E30 |
| 0051... | |
| 0052... | |
| 0053... | E31 |
| 0054... | |
| 0055... | |

What is claimed is:

1. A trainable system of cascaded processors comprised of: a plurality of non-linear signal processors in cascade, each processor including:

a. means for applying at least one input signal provided by peripheral equipment and one probabilistic signal generated by the previous processor in the casecade thereto;

b. means for applying at least one desired output signal provided by peripheral equipment thereto when such processor is operated in a training mode;

c. a multi-level tree-arranged storage array having at least a root level and a leaf level;

d. means for defining a path through the levels of the tree from said input and probabilistic signals; said leaf level including means for accumulating and storing the number of occurrences that each desired output signal was associated with each of said defined paths during training; and
e. means for generating at least one output signal comprising the probabilistic signal for the subsequent processor in the cascade when the processor is operated in an execution mode.

2. The system of claim 1 wherein said probabilistic signal for the subsequent processor in the cascade is generated from said accumulated and stored number of occurrences when the processor is operated in an execution mode.

3. The system of claim 2 including
preprocessor means for encoding said at least one input signal into one or more key components, and each of said processors including:
means for encoding said probabilistic signal into one or more key components, all of said key components being utilized for defining said path through the levels of said tree-arranged storage array.

4. The system of claim 3 wherein said preprocessor means includes:
a. means for providing an initial signal for the first processor in the cascade taking the place in structure of the probabilistic signal generated by each of the processors for the subsequent processor in the cascade, and
b. means for encoding said initial signal into one or more key components.

5. The system of claim 4 including means for sequentially comprising the key components of the present input and probabilistic signals with the key components of input and probabilistic signals which have previously defined paths through the levels of said three-arranged storage array.

6. The system of claim 1 wherein said root level is directly addressable and said leaf level is addressable in a defined path extending from a storage unit of said root level.

7. The system of claim 6 including:
preprocessor means for encoding said at least one input signal into one I key component, and each of said processors including;
means for encoding said probabilistic signal into one X key component, said I key component providing means for directly addressing a storage unit of said root level and said X key component providing means for addressing a storage unit of said leaf level extending in a path from the addressed storage unit in said root level.

8. The system of claim 7 wherein said preprocessor means includes:
a. means for generating an initial signal for the first processor in the cascade analogous to the probabilistic signal generated by each of the processors for the subsequent processor in the cascade, and
b. means for encoding said initial signal into one X key component.

9. The system of claim 8 including means for sequentially comprising I and X key components of the present input and probabilistic signals with the I and X key components of input and probabilistic signals which have previously defined paths through the root and leaf levels of said tree-arranged storage array.

10. The system of claim 2 wherein the last processor in the cascade includes means for converting the probabilistic signal generated thereby to an actual output signal which is a best estimate of a desired response to an input signal applied to the first processor when the system is operated in an execution mode.

11. In a method of operating a trainable system of cascaded processors, the steps of:
a. training a $(k-1)^{th}$ trainable non-linear processor to store therein $(k-1)^{th}$ statistical data based upon an applied first input signal and an applied desired response to such first input signal,
b. executing said $(k-1)^{th}$ processor to generate from such stored $(k-1)^{th}$ statistical data a $(k-1)^{th}$ probabilistic signal which is a statistical estimate of the desired response to a second applied input signal,
c. training a $k^{th}$ trainable non-linear processor to store therein $k^{th}$ statistical data based upon a third input signal comprising said first probabilistic signal generated by said $(k-1)^{th}$ processor and applied desired response to such third applied input signal applied thereto,
d. executing said $(k-1)^{th}$ processor to generate from such stored $(k-1)^{th}$ statistical data a second probabilistic signal which is a statistical estimate of the desired response to a fourth applied input signal, and
e. executing said $k^{th}$ processor to generate from such stored second statistical data an actual output signal which is a lower entropy estimate of the desired response to said fourth input signal when a fifth input signal comprising said second probabilistic signal generated by said $(k-1)^{th}$ processor is applied thereto.

12. The process of claim 11 including the step of delaying at least one signal comprising said third input signal to provide at least one signal comprising said second input signal.

13. In a method of operating a trainable system of cascaded processors, the steps of:
a. storing first statistical data based upon an applied first input signal and an applied desired response to such first input signal in a first trainable non-linear processor operated in a training mode,
b. generating from such stored first statistical data a first probabilistic signal which is a statistical estimate of the desired response to a second signal applied to said first processor operated in an execution mode,
c. storing second statistical data based upon a third applied input signal comprising said first probabilistic signal generated by said first processor and applied desired response to such third input signal in a second trainable non-linear processor operated in a training mode,
d. generating from such stored first statistical data a second probabilistic signal which is a statistical estimate of the desired response to a fourth signal applied to said first processor operated in an execution mode, and
e. generating from such stored second statistical data an actual output signal which is a lower entropy estimate of the desired response to said fourth signal when a fifth input signal comprising said second probabilistic signal generated by said first processor is applied to said second processor operated in an execution mode.

14. The method of claim 13 wherein the method of storing first statistical data includes the steps of:

a. accumulating and storing the number of occurrences that each possible desired response has been associated with each same first input signal, and the method of storing second statistical data includes the steps of:

b. accumulating and storing the number of occurrences that each possible desired response has been associated with each same third input signal.

15. In a method of operating a trainable system of cascaded processors, the steps of:

a. encoding a first applied input signal into a plurality of key components, b. defining a path through the levels of a tree-arranged storage array of a first trainable non-linear signal processor said storage array having a plurality of levels and said path defined to a storage unit in the leaf level thereof in accordance with at least two of said key components of said first encoded input signal, c. storing first statistical data based upon an applied desired response to such first input signal in said storage unit at the leaf level of the tree-arranged storage array of said first processor, d. encoding a second applied input signal into a plurality of key components, e. defining a path through the levels of the tree-arranged storage array of said first processor to a storage unit in the leaf level thereof in accordance with at least two of said key components of said second encoded input signal, f. generating from such stored first statistical data a first probabilistic signal which is a statistical estimate of the desired response to said second input signal, g. encoding a third applied input signal comprising said first probabilistic signal generated by said first processor into a plurality of key components, h. defining a path through the levels of a tree-arranged storage array of a second trainable non-linear signal processor said storage array having a plurality of levels and said path defined to a storage unit in the leaf level thereof in accordance with at least two of said key components of said third encoded input signal, i. storing second statistical data based upon an applied desired response to such third input signal in said storage unit at the leaf level of the tree-arranged storage array of said second processor, j. encoding a fourth applied input signal into a plurality of key components, k. defining a path through the levels of the tree-arranged storage array of said first processor to a storage unit in the leaf level thereof in accordance with at least two of said key components of said fourth encoded input signal, l. generating from such stored first statistical data a second probabilistic signal which is a statistical estimate of the desired response to said fourth input signal, m. encoding a fifth applied input signal comprising said second probabilistic signal generated by said first processor into a plurality of key components, n. defining a path through the levels of the tree-arranged storage array of said second processor to a storage unit in the leaf level thereof in accordance with at least two of said key components of said fifth encoded input signal, and o. generating from such stored second statistical data an actual output signal which is a lower entropy estimate of the desired response to said fourth input signal.

16. The method of claim 15 wherein the method of defining a path through the levels of the tree-arranged storage arrays of said first and second processors includes the steps of:

a. directly addressing a storage unit in a first root level of the storage array, and b. addressing the storage unit in said leaf level in a defined path extending from the storage unit of said root level.

17. The method of claim 15 wherein the method of storing first statistical data includes the steps of:

a. accumulating and storing the number of occurrences that each possible desired response has been associated with each same first input signal, and the method of storing second statistical data includes the steps of:

b. accumulating and storing the number of occurrences that each possible desired response has been associated with each same third input signal.

18. In a method of operating a trainable system of cascaded processors, the steps of:

a. encoding a first applied input signal into a plurality of key components, b. defining a path through the levels of a tree-arranged storage array of a first trainable non-linear signal processor said storage array having a plurality of levels and said path defined to a storage unit in the leaf level thereof in accordance with at least two of said key components of said first encoded input signal, c. sequentially comparing the key components of said first input signal with the key components of input signals which have previously defined paths through the levels of the tree-arranged storage array of said first processor.

d. storing statistical data based upon an applied desired response to such first input signal in said storage unit at the leaf level of the tree-arranged storage array of said first processor when no such path has been previously defined.

e. updating the statistical data stored in said storage unit at the leaf level of the tree-arranged storage array of said first processor when such a path has been previously defined.

f. encoding a second applied input signal into a plurality of key components, g. defining a path through the levels of the tree-arranged storage of said first processor to a storage unit in the leaf level thereof in accordance with at least two of said key components of said second encoded input signal, h. sequentially comparing the key components of said second input signal with the key components of input signals which have previously defined paths through the levels of the tree-arranged storage array of said first processor to locate first statistical data which provides a best statistical estimate for said first processor of the desired response to said second input signal.

i. generating from such located first statistical data a first probabilistic signal, j. encoding a third applied input signal comprising said first probabilistic signal generated by said first processor into a plurality of key components, k. defining a path through the levels of a tree-arranged storage array of a second trainable non-linear signal processor said storage array having a plurality of levels and said path defined to a storage unit in the leaf level thereof in accordance with at least two of said key components of said third encoded input signal, l. sequentially comparing the key components of said third input signal with the key components of input signals which have previously defined paths through the levels of the tree-arranged storage array of said second processor.

m. storing statistical data based upon an applied desired response to such third input signal in said storage unit at the leaf level of the tree-arranged storage array of said second processor when no such path has been previously defined.

n. updating the statistical data stored in said storage unit at the leaf level of the tree-arranged storage array of said second processor when such a path has been previously defined.

o. encoding a fourth applied input signal into a plurality of key components, p. defining a path through the levels of the tree-arranged storage array of said first processor to a storage unit in the leaf level thereof in accordance with at least two of said key components of said fourth encoded input signal, q. sequentially comparing the key components of said fourth input signal with the key components of input signals which have previously defined paths through the levels of the tree-arranged storage array of said first processor to locate first statistical data which provides a best statistical estimate for said first processor of the desired response to said fourth input signal.

r. generating from such located first statistical data a second probabilistic signal, s. encoding a fifth applied input signal comprising said second probabilistic signal generated by said first processor into a plurality of key components, t. defining a path through the levels of the tree-arranged storage array of said second processor to a storage unit in the leaf level thereof in accordance with at least two of said key components of said fifth encoded input signal, u. sequentially comparing the key components of said fifth input signal with the key components of input signals which have previously defined paths through the levels of the tree-arranged storage array of said second processor to locate second statistical data which provides a lower entropy estimate of the desired response to said fourth input signal than provided by said first processor.

v. generating from such located second statistical data an actual output signal.

19. The method of claim 18 wherein the method of storing first statistical data includes the steps of:

a. accumulating and storing the number of occurrences that each possible desired response has been associated with each same first input signal, and the method of storing second statistical data includes the steps of:

b. accumulating and storing the number of occurrences that each possible desired response has been associated with each same third input signal.

20. In a method of operating a system of cascaded processors, the steps of:

a. encoding a first applied input signal into a plurality of key components, b. defining a path through the levels of a tree-arranged storage array of a first non-linear signal processor said storage array having a plurality of levels and said path defined to locate a storage unit in the leaf level thereof in accordance with at least two of said key components of said first encoded input signal, c. generating from first statistical data stored in such storage unit of the first processor a probabilistic signal which is a statistical estimate of the desired response to said first input signal, d. encoding a second applied input signal comprising said probabilistic signal generated by said first processor into a plurality of key components, e. defining a path through the levels of a tree-arranged storage array of a second trainable non-linear signal processor said storage array having a plurality of levels and said path defined to locate a storage unit in the leaf level thereof in accordance with at least two of said key components of said third encoded input signal, f. generating from such stored second statistical data stored in such storage unit of the second processor an actual output signal which is a lower entropy estimate of the desired response to said first input signal.

21. The method of claim 15 wherein the method of defining a path through the levels of the tree-arranged storage arrays of said first and second processors includes the steps of:

a. directly addressing a storage unit in a first root level of the storage array, and b. addressing the storage unit in said leaf level in a defined path extending for the storage unit of said root level.

22. In a method of operating a system of cascaded processors, the steps of:

a. encoding a first applied input signal into a plurality of key components, b. defining a path through the levels of a tree-arranged storage array of a first trainable non-linear signal processor said storage array having a plurality of levels and said path defined to a storage unit in the leaf level thereof in accordance with at least two of said key components of said first encoded input signal, c. sequentially comparing the key components of said first input signal with the key components which define paths through the levels of the tree-arranged storage array of said first processor to locate first statistical data which provides a best statistical estimate for said first processor of the desired response to said first input signal.

d. generating from such located first statistical data a probabilistic signal, e. encoding a second applied input signal comprising said probabilistic signal generated by said first processor into a plurality of key components, f. defining a path through the levels of a tree-arranged storage array of a second trainable non-linear signal processor said storage array having a plurality of levels and said path defined to a storage unit in the leaf level thereof in accordance with at least two of said key components of said encoded input signal, g. sequentially comparing the key components of said second input signal with the key components which define paths through the levels of the tree-arranged storage array of said second processor to locate second statistical data stored in such storage unit of the second processor which provides a lower entropy estimate of the desired response to said first input signal than provided by said first processor.

h. generating from such located second statistical data an actual output signal.

23. A trainable system of cascaded processors comprised of: a plurality of non-linear signal processors in cascade, each processor including:

a. means for applying at least one input signal from an external source and at least one probabilistic signal generated by the previous processor in the cascade thereto;

b. a multi-level tree-arranged storage array having at least a root level and a leaf level;

c. means for defining a path through the levels of the tree in accordance with said input and probabilistic signals; and d. means for generating at least one output signal comprising a probabilistic signal for the subsequent processor in the cascade.

24. The system of claim 23 wherein each processor is operable in a training mode additionally including means for applying at least one desired output signal from an external source thereto when such processor is operated in said training mode.

25. The system of claim 24 wherein said leaf level includes means for accumulating and storing the number of occurrences that each desired output signal was associated with each of said defined paths during training.

26. The system of claim 25 wherein said means for generating at least one output signal is responsive during execution to said means for storing the number of occurrences that each desired output signal was associated with each of said defined paths during training.

* * * * *